United States Patent
de Guzman Strong et al.

(10) Patent No.: US 12,440,537 B1
(45) Date of Patent: Oct. 14, 2025

(54) COMPOSITIONS AND METHODS FOR TREATING SKIN DISEASES, DISORDERS, OR CONDITIONS

(71) Applicants: Cristina de Guzman Strong, St. Louis, MO (US); Erin Brettmann, St. Louis, MO (US)

(72) Inventors: Cristina de Guzman Strong, St. Louis, MO (US); Erin Brettmann, St. Louis, MO (US)

(73) Assignee: Washington University, St. Louis, MO (US)

( * ) Notice: Subject to any disclaimer, the term of this patent is extended or adjusted under 35 U.S.C. 154(b) by 0 days.

(21) Appl. No.: 17/500,452

(22) Filed: Oct. 13, 2021

Related U.S. Application Data

(60) Provisional application No. 63/090,801, filed on Oct. 13, 2020.

(51) Int. Cl.
| | | |
|---|---|---|
| *A61K 38/17* | (2006.01) | |
| *A61K 31/593* | (2006.01) | |
| *A61P 17/00* | (2006.01) | |

(52) U.S. Cl.
CPC ........ *A61K 38/1709* (2013.01); *A61K 31/593* (2013.01); *A61P 17/00* (2018.01)

(58) Field of Classification Search
CPC .... A61K 38/1709; A61K 31/593; A61P 17/00
See application file for complete search history.

(56) References Cited

U.S. PATENT DOCUMENTS

| | | | |
|---|---|---|---|
| 5,453,354 A | 9/1995 | Akerlof et al. | |
| 2003/0072795 A1* | 4/2003 | Steinert | C12N 9/1044 514/558 |
| 2005/0222225 A1 | 10/2005 | De Luca | |
| 2006/0177374 A1* | 8/2006 | Curd | A61K 45/06 424/1.11 |
| 2012/0329726 A1 | 12/2012 | Taguchi et al. | |
| 2017/0246299 A1* | 8/2017 | Cornelius | A61K 31/593 |
| 2018/0153975 A1* | 6/2018 | Fritsch | A61K 39/001152 |

FOREIGN PATENT DOCUMENTS

| | | | | |
|---|---|---|---|---|
| WO | WO 2011/126163 | * | 10/2011 | A61K 8/64 |

OTHER PUBLICATIONS

Nuijens, T., et al. Tetrahedron Lett. (2012), 53; 3777-3779.*
Lucker, G., P. H., et al. Br. J. Dermatol. (1994), 131; 546-550.*
Involucrin_Document (Involucrin [Saquinus oedipus], Aug. 4, 1993, Genbank: AAA36950.1) (Year: 1993).*
Moosbrugger-Martinz (Inflammation: Methods in Molecular Biology, vol. 1559, Humana Press, New York, NY, Clausen, B., Laman, J. (eds), Jan. 7, 2017, pp. 91-101) (Year: 2017).*
Sevilla (The Journal of Cell Biology, vol. 179, No. 7, Dec. 31, 2007, 1599-1612). (Year: 2007).*
Akbari et al. (2018) Identifying the favored mutation in a positive selective sweep. Nat. Methods. vol. 15, No. 4, pp. 279-282.
Banerji et al. (1981) Expression of a β-globin gene is enhanced by remote SV40 DNA sequences. Cell. vol. 27, No. 2 Pt. 1, pp. 299-308.
Bin et al. (2016) Genetic and epigenetic studies of atopic dermatitis. Allergy, Asthma Clin. Immunol. vol. 12, No. 52, 14 pages.
Bradley (2008) Reconstructing phylogenies and phenotypes: A molecular view of human evolution. J. Anat. vol. 212, No. 4, pp. 337-353.
Brettmann et al. (2018) Recent evolution of the human skin barrier. Exp. Dermatol. vol. 27, No. 8, pp. 859-866.
Brown et al. (2012) One remarkable molecule: Filaggrin. J. Invest. Dermatol. vol. 132, No. 3 Pt. 2, pp. 751-762.
Buenrostro (2013) Transposition of native chromatin for fast and sensitive epigenomic profiling of open chromatin, DNA-binding proteins and nucleosome position. Nat. Methods. vol. 10, No. 12, pp. 1213-1218.
Cabral et al. (2001) Structural Organization and Regulation of the Small Proline-rich Family of Cornified Envelope Precursors Suggest a Role in Adaptive Barrier Function. J Biol Chem. vol. 276, No. 22, pp. 19231-19237.
Candi et al. (2005) The cornified envelope: A model of cell death in the skin. Nat. Rev. Mol. Cell Biol. vol. 6, No. 4, pp. 328-340.
Carroll et al. (1992) Characterization of the human involucrin promoter using a transient beta-galactosidase assay. J. Cell Sci. vol. 103, Pt. 4, pp. 925-930.
Cataldo et al. (1996) Developmental expression, intracellular localization, and selenium content of the cysteine-rich protein associated with the mitochondrial capsules of mouse sperm. Mol. Reprod. Dev. vol. 45, No. 3, pp. 320-331.
Corbett et al. (2018) The transition to modernity and chronic disease: Mismatch and natural selection. Nat. Rev. Genet. vol. 19, pp. 419-430.
Djian et al. (1989) The Involucrin Gene of the Orangutan: Generation of the Late Region as an Evolutionary Trend in the Hominoids. Mol. Biol. Evol. vol. 6, No. 5, pp. 469-477.
Djian et al. (1989) Vectorial expansion of the involucrin gene and the relatedness of the hominoids. Proc Natl Acad Sci U S A. vol. 86, No. 21, pp. 8447-8451.
Djian et al. (1995) Origin of the Polymorphism of the Involucrin Gene in Asians. Am. J. Hum. Genet. vol. 56, No. 6, pp. 1367-1372.
Djian et al. (2000) Targeted Ablation of the Murine Involucrin Gene. J. Cell Biol. vol. 151, No. 2, pp. 381-387.
Duester (2019) Knocking Out Enhancers to Enhance Epigenetic Research. Trends Genet. vol. 35, No. 2, p. 89.
Eaaswarkhanth et al. (2016) Atopic dermatitis susceptibility variants in filaggrin hitchhike hornerin selective sweep. Genome Biol. Evol. vol. 8, No. 10, pp. 3240-3255.

(Continued)

*Primary Examiner* — Sudhakar Katakam

(57) ABSTRACT

Among the various aspects of the present disclosure is the provision of increasing skin barrier integrity, treating atopic dermatitis, or protecting against keratinocyte cell lysis comprising: administering to a subject in need thereof a therapeutically effective amount of an involucrin (IVL) peptide or increasing IVL expression in a subject.

19 Claims, 29 Drawing Sheets

Specification includes a Sequence Listing.

(56) References Cited

OTHER PUBLICATIONS

Eckert et al. (1986) Structure and Evolution of the Human Involucrin Gene. Cell. vol. 46, No. 4, pp. 583-589.
Fagerberg et al. (2014) Analysis of the Human Tissue-specific Expression by Genome-wide Integration of Transcriptomics and Antibody-based Proteomics. Mol. Cell. Proteomics. vol. 13, No. 2, pp. 397-406.
Fu et al. (2013) Selection and Adaptation in the Human Genome. Annu. Rev. Genomics Hum. Genet. vol. 14, pp. 467-489.
Gibbs et al. (2007) Evolutionary and Biomedical Insights from the Rhesus Macaque Genome. Science. vol. 316, No. 5822, pp. 222-234.
Gittler et al. (2012) Progressive activation of TH2/TH22 cytokines and selective epidermal proteins characterizes acute and chronic atopic dermatitis. J. Allergy Clin. Immunol. vol. 130, No. 6, pp. 1344-1354.
Goodwin et al. (2016) Positive selection of Involucrin and Filaggrin-2 in the rapid evolution of the human EDC. Journal of Investigative Dermatology. vol. 136, No. 5, Supp. 1, p. S120.
Goodwin et al. (2017) Recent evolution for an involucrin/sperm mitochondria haplotype associated with epidermal function in modern humans. Journal of Investigative Dermatology. vol. 137, No. 5, Supp. 1, p. S79.
Goodwin et al. (2017) Recent Positive Selection in Genes of the Mammalian Epidermal Differentiation Complex Locus. Front. Genet. vol. 7, No. 227, 13 pages.
Grant et al. (2011) FIMO: scanning for occurrences of a given motif. Bioinformatics. vol. 27, No. 7, pp. 1017-1018.
Grossman et al. (2010) A Composite of Multiple Signals Distinguishes Causal Variants in Regions of Positive Selection. Science. vol. 327, No. 5967, pp. 883-886.
Grossman et al. (2013) Identifying recent adaptations in large-scale genomic data. Cell. vol. 152, No. 4, pp. 703-713.
Hardman et al. (1999) Barrier Formation in the Human Fetus is Patterned. J. Invest. Dermatol. vol. 113, No. 6, pp. 1106-1113.
Henry et al. (2012) Update on the epidermal differentiation complex. Front. Biosci. vol. 17, No. 4, pp. 1517-1532.
Jackson et al. (2005) Late cornified envelope family in differentiating epithelia—Response to calcium and ultraviolet irradiation. J. Invest. Dermatol. vol. 124, No. 5, pp. 1062-1070.
Jeong et al. (2014) Adaptations to local environments in modern human populations. Curr. Opin. Genet. Dev. vol. 29, pp. 1-8.
Jiang et al. (2014) The sheep genome illuminates biology of the rumen and lipid metabolism. Science. vol. 344, No. 6188, pp. 1168-1173.
Joost et al. (2016) Single-Cell Transcriptomics Reveals that Differentiation and Spatial Signatures Shape Epidermal and Hair Follicle Heterogeneity. Cell Syst. vol. 3, No. 3, pp. 221-237.e9.
Kanakis et al. (2015) Male contraception: A clinically-oriented review. Hormones. vol. 14, No. 4, pp. 598-614.
Khattri et al. (2017) Efficacy and safety of ustekinumab treatment in adults with moderate-to-severe atopic dermatitis. Exp. Dermatol. vol. 26, No. 1, pp. 28-35.
Lewinsky et al. (2005) T-13910 DNA variant associated with lactase persistence interacts with Oct-1 and stimulates lactase promoter activity in vitro. Hum. Mol. Genet. vol. 14, No. 24, pp. 3945-3953.
Liebert et al. (2016) In Vitro Functional Analyses of Infrequent Nucleotide Variants in the Lactase Enhancer Reveal Different Molecular Routes to Increased Lactase Promoter Activity and Lactase Persistence. Ann. Hum. Genet. vol. 80, No. 6, pp. 307-318.
Locke et al. (2011) Comparative and demographic analysis of orang-utan genomes. Nature. vol. 469, pp. 529-533.
Lonsdale et al. (2013) The Genotype-Tissue Expression (GTEx) project. Nat. Genet. vol. 45, pp. 580-585.
Mathyer et al. (2018) Tiled array-based sequencing identifies enrichment of loss-of-function variants in the highly homologous filaggrin gene in African-American children with severe atopic dermatitis. Exp. Dermatol. vol. 27, No. 9, pp. 989-992.
Mikkelsen et al. (2005) Initial sequence of the chimpanzee genome and comparison with the human genome. Nature. vol. 437, pp. 69-87.
Mischke et al. (1996) Genes Encoding Structural Proteins of Epidermal Cornification and S100 Calcium-Binding Proteins Form a Gene Complex ('Epidermal Differentiation Complex') on Human Chromosome 1921. J. Invest. Dermatol. vol. 106, pp. 989-992.
Moon et al. (2019). Signatures of Recent Positive Selection in Enhancers Across 41 Human Tissues. G3 (Bethesda). vol. 9, No. 8, pp. 2761-2774.
Nayernia et al. (2002) Asthenozoospermia in mice with targeted deletion of the sperm mitochondrion-associated cysteine-rich protein (Smcp) gene. Mol. Cell. Biol. vol. 22, No. 9, pp. 3046-3052.
Noda et al. (2015) The Asian atopic dermatitis phenotype combines features of atopic dermatitis and psoriasis with increased T H 17 polarization. J. Allergy Clin. Immunol. vol. 136, No. 5, pp. 1254-1264.
Oh et al. (2014) Regulation of the Dynamic Chromatin Architecture of the Epidermal Differentiation Complex Is Mediated by a c-Jun/AP-1-Modulated Enhancer. J. Invest. Dermatol. vol. 134, No. 9, pp. 2371-2380.
Oh et al. (2016) Allelic series for an EDC enhancer generated by CRISPR/Cas9 genome editing identifies an enhancer requirement for proximal gene expression and efficient wound healing. J. Invest. Dermatol. vol. 136, No. 5, Supp. 1, p. S62.
Olds et al. (2003) Lactase persistence DNA variant enhances lactase promoter activity in vitro: Functional role as a cis regulatory element. Hum. Mol. Genet. vol. 12, No. 18, pp. 2333-2340.
Osterwalder et al. (2018) Enhancer redundancy provides phenotypic robustness in mammalian development. Nature. vol. 554, pp. 239-243.
Parva et al. (2018) Prevalence of Vitamin D Deficiency and Associated Risk Factors in the US Population (2011-2012). Cureus. vol. 10, No. 6, e741, 10 pages.
Poterlowicz et al. (2017) 5C analysis of the Epidermal Differentiation Complex locus reveals distinct chromatin interaction networks between gene-rich and gene-poor TADs in skin epithelial cells. PLoS Genetics. vol. 13, No. 9, e1006966, 32 pages.
Prüfer et al. (2012) The bonobo genome compared with the chimpanzee and human genomes. Nature. vol. 486, pp. 527-531.
Quiggle et al. (2015) Low Filaggrin Monomer Repeats in African American Pediatric Patients With Moderate to Severe Atopic Dermatitis. JAMA Dermatology. vol. 151, No. 5, pp. 557-559.
Quiggle et al. (2016) Functional regulatory variants for an EDC enhancer in atopic dermatitis converge on skin developmental Kruppel-like and AP1 family transcription factor binding sites. J. Invest. Dermatol. vol. 136, No. 5, p. S66.
Rickels et al. (2018) Enhancer Logic and Mechanics in Development and Disease. Trends Cell Biol. vol. 28, No. 8, pp. 608-630.
Sanyal et al. (2012) The long-range interaction landscape of gene promoters. Nature. vol. 489, pp. 109-113.
Shlyueva et al. (2014) Transcriptional enhancers: From properties to genome-wide predictions. Nat. Rev. Genet. vol. 15, pp. 272-286.
Simon et al. (1988) The Glutamine Residues Reactive in Transglutaminase-catalyzed Cross-linking of Involucrin. The Journal of Biological Chemistry. vol. 236, No. 34, pp. 18093-18098.
Simon et al. (1989) Absence of a Single Repeat from the Coding Region of the Human Involucrin Gene Leading to RFLP. Am. J. Hum. Genet. vol. 45, No. 7, pp. 910-916.
Simon et al. (1991) Polymorphism Due to Variable Number of Repeats in the Human Involucrin Gene. Genomics. vol. 9, No. 4, pp. 576-580.
Strasser et al. (2014) Evolutionary origin and diversification of epidermal barrier proteins in amniotes. Mol. Biol. Evol. vol. 31, No. 12, pp. 3194-3205.
Strong et al. (2010) A milieu of regulatory elements in the epidermal differentiation complex syntenic block: Implications for atopic dermatitis and psoriasis. Hum. Mol. Genet. vol. 19, No. 8, pp. 1453-1460.
Teumer et al. (1989) Divergent evolution of part of the involucrin gene in the hominoids: Unique intragenic duplications in the gorilla and human. Proc Natl Acad Sci U S A. vol. 86, No. 4, pp. 1283-1286.

(56) References Cited

OTHER PUBLICATIONS

Tishkoff et al. (2007) Convergent adaptation of human lactase persistence in Africa and Europe. Nat. Genet. vol. 39, pp. 31-40.
Troelsen (2003) An Upstream Polymorphism Associated with Lactase Persistence has Increased Enhancer Activity. Gastroenterology. vol. 125, No. 6, pp. 1686-1694.
Tseng et al. (1988) Remodeling of the involucrin gene during primate evolution. Cell. vol. 54, No. 4, pp. 491-496.
Urquhart et al. (1993) Tandem-Repeat Internal Mapping (TRIM) of the Involucrin Gene : Repeat Number and Repeat-Pattern Polymorphism within a Coding Region in Human Populations. Am. J. Hum. Genet. vol. 53, No. 1, pp. 279-286.
Vitti et al. (2013) Detecting Natural Selection in Genomic Data. Annu. Rev. Genet. vol. 47, pp. 97-120.
Wong et al. (2018) Array-based sequencing of filaggrin gene for comprehensive detection of disease-associated variants. J. Allergy Clin. Immunol. vol. 141, No. 2, pp. 814-816.

* cited by examiner $* p < 0.05$

SEQUENCE LISTING

```
<160> NUMBER OF SEQ ID NOS: 83

<210> SEQ ID NO 1
<211> LENGTH: 10
<212> TYPE: PRT
<213> ORGANISM: Artificial Sequence
<220> FEATURE:
<223> OTHER INFORMATION: synthetic IVL peptide

<400> SEQUENCE: 1

Glu Leu Pro Glu Gln Gln Glu Gly Gln Leu
1               5                   10

<210> SEQ ID NO 2
<211> LENGTH: 10
<212> TYPE: PRT
<213> ORGANISM: Artificial Sequence
<220> FEATURE:
<223> OTHER INFORMATION: synthetic IVL peptide

<400> SEQUENCE: 2

Glu Leu Pro Glu Gln Ala Glu Gly Gln Leu
1               5                   10

<210> SEQ ID NO 3
<211> LENGTH: 10
<212> TYPE: PRT
<213> ORGANISM: Artificial Sequence
<220> FEATURE:
<223> OTHER INFORMATION: synthetic IVL peptide

<400> SEQUENCE: 3

Glu Leu Pro Glu Ala Gln Glu Gly Gln Leu
1               5                   10

<210> SEQ ID NO 4
<211> LENGTH: 10
<212> TYPE: PRT
<213> ORGANISM: Artificial Sequence
<220> FEATURE:
<223> OTHER INFORMATION: synthetic IVL peptide

<400> SEQUENCE: 4

Glu Leu Pro Glu Gln Gln Glu Gly Ala Leu
1               5                   10

<210> SEQ ID NO 5
<211> LENGTH: 10
<212> TYPE: PRT
<213> ORGANISM: Artificial Sequence
<220> FEATURE:
<223> OTHER INFORMATION: synthetic IVL peptide

<400> SEQUENCE: 5
```

```
Glu Leu Pro Glu Ala Ala Glu Gly Ala Leu
1               5                   10

<210> SEQ ID NO 6
<211> LENGTH: 6
<212> TYPE: PRT
<213> ORGANISM: Artificial Sequence
<220> FEATURE:
<223> OTHER INFORMATION: synthetic IVL peptide, 6 aa fragment of SEQ ID
      NO: 1

<400> SEQUENCE: 6

Glu Gln Gln Glu Gly Gln
1               5

<210> SEQ ID NO 7
<211> LENGTH: 6
<212> TYPE: PRT
<213> ORGANISM: Artificial Sequence
<220> FEATURE:
<223> OTHER INFORMATION: synthetic IVL peptide

<400> SEQUENCE: 7

Glu Gln Ala Glu Gly Gln
1               5

<210> SEQ ID NO 8
<211> LENGTH: 6
<212> TYPE: PRT
<213> ORGANISM: Artificial Sequence
<220> FEATURE:
<223> OTHER INFORMATION: synthetic IVL peptide

<400> SEQUENCE: 8

Glu Ala Gln Glu Gly Gln
1               5

<210> SEQ ID NO 9
<211> LENGTH: 6
<212> TYPE: PRT
<213> ORGANISM: Artificial Sequence
<220> FEATURE:
<223> OTHER INFORMATION: synthetic IVL peptide

<400> SEQUENCE: 9

Glu Gln Gln Glu Gly Ala
1               5

<210> SEQ ID NO 10
<211> LENGTH: 6
<212> TYPE: PRT
<213> ORGANISM: Artificial Sequence
<220> FEATURE:
<223> OTHER INFORMATION: synthetic IVL peptide

<400> SEQUENCE: 10

Glu Ala Ala Glu Gly Ala
1               5

<210> SEQ ID NO 11
<211> LENGTH: 29
<212> TYPE: DNA
<213> ORGANISM: Artificial Sequence
<220> FEATURE:
<223> OTHER INFORMATION: synthetic primer

<400> SEQUENCE: 11
```

```
ggatccgata ggttctaggg gtatagtgg                                          29

<210> SEQ ID NO 12
<211> LENGTH: 28
<212> TYPE: DNA
<213> ORGANISM: Artificial Sequence
<220> FEATURE:
<223> OTHER INFORMATION: synthetic primer

<400> SEQUENCE: 12
aagcttctta gaagctactg tcaacctg                                           28

<210> SEQ ID NO 13
<211> LENGTH: 52
<212> TYPE: DNA
<213> ORGANISM: Artificial Sequence
<220> FEATURE:
<223> OTHER INFORMATION: synthetic primer

<400> SEQUENCE: 13
ggggaccact ttgtacaaga aagctgggtg aagaacagtg aattttacga cc                52

<210> SEQ ID NO 14
<211> LENGTH: 49
<212> TYPE: DNA
<213> ORGANISM: Artificial Sequence
<220> FEATURE:
<223> OTHER INFORMATION: synthetic primer

<400> SEQUENCE: 14
ggggacaagt ttgtacaaaa aagcaggcta gacattctgc tgctggaca                   49

<210> SEQ ID NO 15
<211> LENGTH: 19
<212> TYPE: DNA
<213> ORGANISM: Artificial Sequence
<220> FEATURE:
<223> OTHER INFORMATION: synthetic sgRNA

<400> SEQUENCE: 15
gaatacatcc caggaacat                                                     19

<210> SEQ ID NO 16
<211> LENGTH: 19
<212> TYPE: DNA
<213> ORGANISM: Artificial Sequence
<220> FEATURE:
<223> OTHER INFORMATION: synthetic sgRNA

<400> SEQUENCE: 16
cagtaagcta gcgctagac                                                     19

<210> SEQ ID NO 17
<211> LENGTH: 200
<212> TYPE: DNA
<213> ORGANISM: Artificial Sequence
<220> FEATURE:
<223> OTHER INFORMATION: synthetic ssODN

<400> SEQUENCE: 17
agaagttttt cagttcccca tagttgtcct gaggagcata taatctttgt cttaagcaga        60
tttgtttaca ataattccct ataacttcgt atagcataca ttatacgaag ttatgcatgc       120
tttaaagaga tagaggactg acatgaccct ctgtcctcta aaacaagttt gccaggattt       180
ctccattccc agagccatga                                                   200
```

<210> SEQ ID NO 18
<211> LENGTH: 200
<212> TYPE: DNA
<213> ORGANISM: Artificial Sequence
<220> FEATURE:
<223> OTHER INFORMATION: synthetic ssODN

<400> SEQUENCE: 18

```
tctctgttgt tagagtccat ctcctacacc gatagagact gattctgaaa aaaaaggaag      60
ctcccactgt ccaagttcta aagcttataa cttcgtatag catacattat acgaagttat     120
tggaaaccag acaccctggc tgctgctctg aaggcaactc ttccctatca ggctccttaa     180
taggatttga tcagtgtgac                                                 200
```

<210> SEQ ID NO 19
<211> LENGTH: 1600
<212> TYPE: DNA
<213> ORGANISM: Artificial Sequence
<220> FEATURE:
<223> OTHER INFORMATION: synthetic 923 enhancer sequence

<400> SEQUENCE: 19

```
tctttagtgc tcagttaaca gcttatttta tggagttcat cattaacact ttttatgag       60
atcatacaaa ataatatagt aaaataatgg aaagataaaa ctcatttcta attagtcttg     120
agaagttttt cagttcccca tagttgtcct gaggagcata taatctttgt cttaagcaga     180
tttgtttaca ataattccct atgttcctgg gatgtattct ttaaagagat agaggactga     240
catgaccctc tgtcctctaa aacaagtttg ccaggatttc tccattccca gagccatgag     300
gcatcctgaa cactactctg aactatattt ctttcttcct ttctttcttc cttccttcct     360
tccttccttc cttccttcct tccttccttc cttccttcct tcctttcttc cttccttctt     420
ttctttttct ttctttcttt ctttctttct ttctttcttt ctttctttt ctcttttct      480
ttccttttt tgctttatt tatttttttt cttttctat tagatatttt cttcattttac     540
atttcaaatg ttatccccaa gcccctata ccctccccca gtcctgatcc ccaacccacc     600
cacacccact tcctggccct ggcactactt tctataccaa agaaagcatt ccccacccca     660
ccagaagaag taagcaagca ttctcacatg agcacttatg ctccacttct gacttcacat     720
gggaagaatc tgactctcct caacctgtga cagtgccagg gcagcagact ggtcaaaaag     780
tcacactggt cttatgggtt cccagaggct cagtatctgc tcaatctgtt cccaccagc      840
tgattcagag tatgataaga attcagaaat gatactgtgt gtgcgtgagt gtttgagcac     900
tgggaaaagc taaggtgtgg gaatgagggc ataggataga gcccagaaac ctgtgtgtag     960
ttgaaggagg ggttgaagaa gctccagact tctaatgctc aaaggtcaca tattttgccc    1020
taggattatc ccacttagcg actgggaatg catgtcaatt tggcattttt ttttcagtgt    1080
gctgtgtgac tgactttata agtctcagat ccttgtgatg aatccaagaa actatgcaat    1140
gcaaattata caaattctcc agtgtaatga aggtaacctt tcccataacc catgaagagg    1200
ccttgaccca gctcggcctc agtgtttagg aggataagag aaggtgaagg gatgaatatg    1260
accagaatgt gtgaaattgg cagagaatga attatttctg aaaacttgcc tttgaagagt    1320
ttagagtgct gcagcttctt cagagaacat catctctgtt gttagagtcc atctcctaca    1380
ccgatagaga ctgattctga aaaaaaagga agctcccact gtccaagttc tacagtaagc    1440
tagcgctaga ctggaaacca gacaccctgg ctgctgctct gaaggcaact cttccctatc    1500
```

```
aggctcctta ataggatttg atcagtgtga caggtttcac tacatgacta cagagacatc   1560
ctctaagtcc aataagttcc tgtgagaatt tggtgaggca                         1600

<210> SEQ ID NO 20
<211> LENGTH: 400
<212> TYPE: DNA
<213> ORGANISM: Artificial Sequence
<220> FEATURE:
<223> OTHER INFORMATION: synthetic 923 enhancer sequence

<400> SEQUENCE: 20
tctttagtgc tcagttaaca gcttatttta tggagttcat cattaacact tttttatgag     60
atcatacaaa ataatatagt aaaataatgg aaagataaaa ctcatttcta attagtcttg    120
agaagttttt cagttcccca tagttgtcct gaggagcata taatctttgt cttaagcaga    180
tttgtttaca ataattccca ctgtccacta aagcttataa cttcgtatag catacattat    240
acgaagttat tggaaaccag acaccctggc tgctgctctg aaggcaactc ttccctatca    300
ggctccttaa taggatttga tcagtgtgac aggtttcact acatgactac agagacatcc    360
tctaagtcca ataagttcct gtgagaattt ggtgaggcaa                          400

<210> SEQ ID NO 21
<211> LENGTH: 1038
<212> TYPE: DNA
<213> ORGANISM: Artificial Sequence
<220> FEATURE:
<223> OTHER INFORMATION: synthetic 923 enhancer sequence
<220> FEATURE:
<221> NAME/KEY: misc_feature
<222> LOCATION: (30)..(30)
<223> OTHER INFORMATION: n is a, c, g, or t

<400> SEQUENCE: 21
tcctctgaat gccctaacta tcagattgtn ttcagcttta attaactaat aaattttagt     60
tattctatct atatttattt catattattt atctgtcttc cactgaaaaa caagttatat    120
tttgagagaa atattctggg tgtgctttcc attgtctcaa ggacctatca aagtcactcc    180
atacactaaa acactatcag tattaattaa aagaataaat gacagcaaat ctcataccta    240
cagacaacaa cttcctaata ttttaatgtc aaacaatctt catgtgtttg aaaatgtgtg    300
tgctaggaaa ataaagctga attgtggctt attttgtct ttagtgctca gttaacagct    360
tattttatgg agttcatcat taacactttt ttatgagatc atacaaaata atatagtaaa    420
ataatggaaa gataaaactc atttctaatt agtcttgaga agttttttcaa tttcccatag    480 ttgtcctgag gagcatataa tctttgtctt aagcagattt gtttacaata attccctata    540
acttcgtata gcatacatta tacgaagtta tgcatgcttt aaagagatag aggactgatc    600
atggacttgg taaatagcca tataaaatag gagcaggtgg aaaaaaacat tttcatttct    660
gattctgaaa aaaaggaag ctcccactgt ccaagttcta aagcttataa cttcgtatag    720
catacattat acgaagttat tggaaaccag acaccctggc tgctgctctg aaggcaactc    780
ttccctatca ggctcctcaa taggtgttct acatgaatgt attgctatga agctacagag    840
aactgaaata caaattccca gaaatctgtc cctgagagga gaagaaccca cttgagggtc    900
ctctgcactt ctgatcaggg tctcaagaac tcacagaaat cacagttatg caccatgatc    960
aattttattg ttgttgaact gaaaggtagg ctaaagaaag aaacaagaaa tgttttttcta    1020 gccaagagag gtggaggg                                                  1038
```

<210> SEQ ID NO 22
<211> LENGTH: 22
<212> TYPE: DNA
<213> ORGANISM: Artificial Sequence
<220> FEATURE:
<223> OTHER INFORMATION: synthetic primer

<400> SEQUENCE: 22
tgggtcagtc acttaagcaa ga                                           22

<210> SEQ ID NO 23
<211> LENGTH: 20
<212> TYPE: DNA
<213> ORGANISM: Artificial Sequence
<220> FEATURE:
<223> OTHER INFORMATION: synthetic primer

<400> SEQUENCE: 23
ttctgctgct gcttctctgt                                              20

<210> SEQ ID NO 24
<211> LENGTH: 20
<212> TYPE: DNA
<213> ORGANISM: Artificial Sequence
<220> FEATURE:
<223> OTHER INFORMATION: synthetic primer

<400> SEQUENCE: 24
ggtccccagg ttcctacttc                                              20

<210> SEQ ID NO 25
<211> LENGTH: 20
<212> TYPE: DNA
<213> ORGANISM: Artificial Sequence
<220> FEATURE:
<223> OTHER INFORMATION: synthetic primer

<400> SEQUENCE: 25
tcaaagctta tcctgggcca                                              20

<210> SEQ ID NO 26
<211> LENGTH: 20
<212> TYPE: DNA
<213> ORGANISM: Artificial Sequence
<220> FEATURE:
<223> OTHER INFORMATION: synthetic primer

<400> SEQUENCE: 26
tccagaacac tgtcagccat                                              20

<210> SEQ ID NO 27
<211> LENGTH: 24
<212> TYPE: DNA
<213> ORGANISM: Artificial Sequence
<220> FEATURE:
<223> OTHER INFORMATION: synthetic primer

<400> SEQUENCE: 27
gcaccatgat caattttatt gttg                                         24

<210> SEQ ID NO 28
<211> LENGTH: 58
<212> TYPE: DNA
<213> ORGANISM: Artificial Sequence
<220> FEATURE:
<223> OTHER INFORMATION: synthetic primer

<400> SEQUENCE: 28
aatgatacgg cgaccaccga gatctacact ctttccctac acgacgctct tccgatct    58

<210> SEQ ID NO 29
<211> LENGTH: 34
<212> TYPE: DNA
<213> ORGANISM: Artificial Sequence
<220> FEATURE:
<223> OTHER INFORMATION: synthetic primer

<400> SEQUENCE: 29
gtgactggag ttcagacgtg tgctcttccg atct    34

<210> SEQ ID NO 30
<211> LENGTH: 62
<212> TYPE: DNA
<213> ORGANISM: Artificial Sequence
<220> FEATURE:
<223> OTHER INFORMATION: synthetic primer

<400> SEQUENCE: 30
caagcagaag acggcatacg agataacctc agtgactgga gttcagacgt gtgctcttcc    60
ga    62

<210> SEQ ID NO 31
<211> LENGTH: 62
<212> TYPE: DNA
<213> ORGANISM: Artificial Sequence
<220> FEATURE:
<223> OTHER INFORMATION: synthetic primer

<400> SEQUENCE: 31
caagcagaag acggcatacg agattctaag cgtgactgga gttcagacgt gtgctcttcc    60
ga    62

<210> SEQ ID NO 32
<211> LENGTH: 62
<212> TYPE: DNA
<213> ORGANISM: Artificial Sequence
<220> FEATURE:
<223> OTHER INFORMATION: synthetic primer

<400> SEQUENCE: 32
caagcagaag acggcatacg agatctgtca tgtgactgga gttcagacgt gtgctcttcc    60
ga    62

<210> SEQ ID NO 33
<211> LENGTH: 62
<212> TYPE: DNA
<213> ORGANISM: Artificial Sequence
<220> FEATURE:
<223> OTHER INFORMATION: synthetic primer

<400> SEQUENCE: 33
caagcagaag acggcatacg agatggaggt ggtgactgga gttcagacgt gtgctcttcc    60
ga    62

<210> SEQ ID NO 34
<211> LENGTH: 62
<212> TYPE: DNA
<213> ORGANISM: Artificial Sequence
<220> FEATURE:
<223> OTHER INFORMATION: synthetic primer

<400> SEQUENCE: 34
caagcagaag acggcatacg agatgctcga tgtgactgga gttcagacgt gtgctcttcc    60
ga                                                                  62

<210> SEQ ID NO 35
<211> LENGTH: 62
<212> TYPE: DNA
<213> ORGANISM: Artificial Sequence
<220> FEATURE:
<223> OTHER INFORMATION: synthetic primer

<400> SEQUENCE: 35
caagcagaag acggcatacg agattagagt agtgactgga gttcagacgt gtgctcttcc    60
ga                                                                  62

<210> SEQ ID NO 36
<211> LENGTH: 62
<212> TYPE: DNA
<213> ORGANISM: Artificial Sequence
<220> FEATURE:
<223> OTHER INFORMATION: synthetic primer

<400> SEQUENCE: 36
caagcagaag acggcatacg agattcagtc tgtgactgga gttcagacgt gtgctcttcc    60
ga                                                                  62

<210> SEQ ID NO 37
<211> LENGTH: 62
<212> TYPE: DNA
<213> ORGANISM: Artificial Sequence
<220> FEATURE:
<223> OTHER INFORMATION: synthetic primer

<400> SEQUENCE: 37
caagcagaag acggcatacg agatttccaa ggtgactgga gttcagacgt gtgctcttcc    60
ga                                                                  62

<210> SEQ ID NO 38
<211> LENGTH: 62
<212> TYPE: DNA
<213> ORGANISM: Artificial Sequence
<220> FEATURE:
<223> OTHER INFORMATION: synthetic primer

<400> SEQUENCE: 38
caagcagaag acggcatacg agattaatcg ggtgactgga gttcagacgt gtgctcttcc    60
ga                                                                  62

<210> SEQ ID NO 39
<211> LENGTH: 62
<212> TYPE: DNA
<213> ORGANISM: Artificial Sequence
<220> FEATURE:
<223> OTHER INFORMATION: synthetic primer

<400> SEQUENCE: 39
caagcagaag acggcatacg agatcgctgc cgtgactgga gttcagacgt gtgctcttcc    60
ga                                                                  62

<210> SEQ ID NO 40

```
<211> LENGTH: 62
<212> TYPE: DNA
<213> ORGANISM: Artificial Sequence
<220> FEATURE:
<223> OTHER INFORMATION: synthetic primer

<400> SEQUENCE: 40
caagcagaag acggcatacg agatatgatg ggtgactgga gttcagacgt gtgctcttcc     60
ga                                                                   62

<210> SEQ ID NO 41
<211> LENGTH: 62
<212> TYPE: DNA
<213> ORGANISM: Artificial Sequence
<220> FEATURE:
<223> OTHER INFORMATION: synthetic primer

<400> SEQUENCE: 41
caagcagaag acggcatacg agatcttgtt agtgactgga gttcagacgt gtgctcttcc     60
ga                                                                   62

<210> SEQ ID NO 42
<211> LENGTH: 21
<212> TYPE: DNA
<213> ORGANISM: Artificial Sequence
<220> FEATURE:
<223> OTHER INFORMATION: synthetic primer

<400> SEQUENCE: 42
cagttcccca tagttgtcct g                                              21

<210> SEQ ID NO 43
<211> LENGTH: 20
<212> TYPE: DNA
<213> ORGANISM: Artificial Sequence
<220> FEATURE:
<223> OTHER INFORMATION: synthetic primer

<400> SEQUENCE: 43
ggaagagttg ccttcagagc                                                20

<210> SEQ ID NO 44
<211> LENGTH: 23
<212> TYPE: DNA
<213> ORGANISM: Artificial Sequence
<220> FEATURE:
<223> OTHER INFORMATION: synthetic primer

<400> SEQUENCE: 44
tctttagtgc tcagttaaca gct                                            23

<210> SEQ ID NO 45
<211> LENGTH: 30
<212> TYPE: DNA
<213> ORGANISM: Artificial Sequence
<220> FEATURE:
<223> OTHER INFORMATION: synthetic primer

<400> SEQUENCE: 45
agtcctctat ctctttaaag catgcataac                                     30

<210> SEQ ID NO 46
<211> LENGTH: 28
<212> TYPE: DNA
<213> ORGANISM: Artificial Sequence
```

-continued

```
<220> FEATURE:
<223> OTHER INFORMATION: synthetic primer

<400> SEQUENCE: 46
gttctaaagc ttataacttc gtatagca                                          28

<210> SEQ ID NO 47
<211> LENGTH: 20
<212> TYPE: DNA
<213> ORGANISM: Artificial Sequence
<220> FEATURE:
<223> OTHER INFORMATION: synthetic primer

<400> SEQUENCE: 47
tgcctcacca aattctcaca                                                   20

<210> SEQ ID NO 48
<211> LENGTH: 23
<212> TYPE: DNA
<213> ORGANISM: Artificial Sequence
<220> FEATURE:
<223> OTHER INFORMATION: synthetic primer

<400> SEQUENCE: 48
tctttagtgc tcagttaaca gct                                               23

<210> SEQ ID NO 49
<211> LENGTH: 21
<212> TYPE: DNA
<213> ORGANISM: Artificial Sequence
<220> FEATURE:
<223> OTHER INFORMATION: synthetic primer

<400> SEQUENCE: 49
agagtagtgt tcaggatgcc t                                                 21

<210> SEQ ID NO 50
<211> LENGTH: 21
<212> TYPE: DNA
<213> ORGANISM: Artificial Sequence
<220> FEATURE:
<223> OTHER INFORMATION: synthetic primer

<400> SEQUENCE: 50
cagttcccca tagttgtcct g                                                 21

<210> SEQ ID NO 51
<211> LENGTH: 20
<212> TYPE: DNA
<213> ORGANISM: Artificial Sequence
<220> FEATURE:
<223> OTHER INFORMATION: synthetic primer

<400> SEQUENCE: 51
ggaagagttg ccttcagagc                                                   20

<210> SEQ ID NO 52
<211> LENGTH: 21
<212> TYPE: DNA
<213> ORGANISM: Artificial Sequence
<220> FEATURE:
<223> OTHER INFORMATION: synthetic primer

<400> SEQUENCE: 52
cagttcccca tagttgtcct g                                                 21
```

```
<210> SEQ ID NO 53
<211> LENGTH: 20
<212> TYPE: DNA
<213> ORGANISM: Artificial Sequence
<220> FEATURE:
<223> OTHER INFORMATION: synthetic primer

<400> SEQUENCE: 53
ggaagagttg ccttcagagc                                               20

<210> SEQ ID NO 54
<211> LENGTH: 50
<212> TYPE: DNA
<213> ORGANISM: Artificial Sequence
<220> FEATURE:
<223> OTHER INFORMATION: synthetic primer

<400> SEQUENCE: 54
aatgatacgg cgaccaccga gatctacact cgtcggcagc gtcagatgtg              50

<210> SEQ ID NO 55
<211> LENGTH: 53
<212> TYPE: DNA
<213> ORGANISM: Artificial Sequence
<220> FEATURE:
<223> OTHER INFORMATION: synthetic primer

<400> SEQUENCE: 55
caagcagaag acggcatacg agattcgcct tagtctcgtg ggctcggaga tgt          53

<210> SEQ ID NO 56
<211> LENGTH: 53
<212> TYPE: DNA
<213> ORGANISM: Artificial Sequence
<220> FEATURE:
<223> OTHER INFORMATION: synthetic primer

<400> SEQUENCE: 56
caagcagaag acggcatacg agatctagta cggtctcgtg ggctcggaga tgt          53

<210> SEQ ID NO 57
<211> LENGTH: 53
<212> TYPE: DNA
<213> ORGANISM: Artificial Sequence
<220> FEATURE:
<223> OTHER INFORMATION: synthetic primer

<400> SEQUENCE: 57
caagcagaag acggcatacg agatttctgc ctgtctcgtg ggctcggaga tgt          53

<210> SEQ ID NO 58
<211> LENGTH: 53
<212> TYPE: DNA
<213> ORGANISM: Artificial Sequence
<220> FEATURE:
<223> OTHER INFORMATION: synthetic primer

<400> SEQUENCE: 58
caagcagaag acggcatacg agatgctcag gagtctcgtg ggctcggaga tgt          53

<210> SEQ ID NO 59
<211> LENGTH: 53
<212> TYPE: DNA
<213> ORGANISM: Artificial Sequence
<220> FEATURE:
<223> OTHER INFORMATION: synthetic primer
```

```
<400> SEQUENCE: 59
caagcagaag acggcatacg agataggagt ccgtctcgtg ggctcggaga tgt              53

<210> SEQ ID NO 60
<211> LENGTH: 53
<212> TYPE: DNA
<213> ORGANISM: Artificial Sequence
<220> FEATURE:
<223> OTHER INFORMATION: synthetic primer

<400> SEQUENCE: 60
caagcagaag acggcatacg agatcatgcc tagtctcgtg ggctcggaga tgt              53

<210> SEQ ID NO 61
<211> LENGTH: 53
<212> TYPE: DNA
<213> ORGANISM: Artificial Sequence
<220> FEATURE:
<223> OTHER INFORMATION: synthetic primer

<400> SEQUENCE: 61
caagcagaag acggcatacg agatgtagag aggtctcgtg ggctcggaga tgt              53

<210> SEQ ID NO 62
<211> LENGTH: 53
<212> TYPE: DNA
<213> ORGANISM: Artificial Sequence
<220> FEATURE:
<223> OTHER INFORMATION: synthetic primer

<400> SEQUENCE: 62
caagcagaag acggcatacg agatcctctc tggtctcgtg ggctcggaga tgt              53

<210> SEQ ID NO 63
<211> LENGTH: 54
<212> TYPE: DNA
<213> ORGANISM: Artificial Sequence
<220> FEATURE:
<223> OTHER INFORMATION: synthetic primer

<400> SEQUENCE: 63
caagcagaag acggcatacg agatccatta catgtctcgt gggctcggag atgt             54

<210> SEQ ID NO 64
<211> LENGTH: 54
<212> TYPE: DNA
<213> ORGANISM: Artificial Sequence
<220> FEATURE:
<223> OTHER INFORMATION: synthetic primer

<400> SEQUENCE: 64
caagcagaag acggcatacg agattacgca caggtctcgt gggctcggag atgt             54

<210> SEQ ID NO 65
<211> LENGTH: 54
<212> TYPE: DNA
<213> ORGANISM: Artificial Sequence
<220> FEATURE:
<223> OTHER INFORMATION: synthetic primer

<400> SEQUENCE: 65
caagcagaag acggcatacg agatacttac tcagtctcgt gggctcggag atgt             54

<210> SEQ ID NO 66
```

```
<211> LENGTH: 54
<212> TYPE: DNA
<213> ORGANISM: Artificial Sequence
<220> FEATURE:
<223> OTHER INFORMATION: synthetic primer

<400> SEQUENCE: 66
caagcagaag acggcatacg agatggtggg taggtctcgt gggctcggag atgt        54

<210> SEQ ID NO 67
<211> LENGTH: 54
<212> TYPE: DNA
<213> ORGANISM: Artificial Sequence
<220> FEATURE:
<223> OTHER INFORMATION: synthetic primer

<400> SEQUENCE: 67
caagcagaag acggcatacg agatacgtgt gacgtctcgt gggctcggag atgt        54

<210> SEQ ID NO 68
<211> LENGTH: 54
<212> TYPE: DNA
<213> ORGANISM: Artificial Sequence
<220> FEATURE:
<223> OTHER INFORMATION: synthetic primer

<400> SEQUENCE: 68
caagcagaag acggcatacg agatacgcaa agtgtctcgt gggctcggag atgt        54

<210> SEQ ID NO 69
<211> LENGTH: 260
<212> TYPE: DNA
<213> ORGANISM: Artificial Sequence
<220> FEATURE:
<223> OTHER INFORMATION: synthetic amplicon

<400> SEQUENCE: 69
tgggtcagtc acttaagcaa gagaaagctt caaggaaaca gcagctagat tactcacatc    60
tagaacagga gaaggagctc tcagaccagc cactggatca agcactagta agaagggta   120 aacaactgga aggaagaaa cacgaattgg agaaccggac acagcaggag aagtagatag   180
agcaattagt accaagcact gactaagcca gtccaaccag tgaaaggaga cgtgctcact   240
acagagaagc agcagcagaa                                              260

<210> SEQ ID NO 70
<211> LENGTH: 263
<212> TYPE: DNA
<213> ORGANISM: Artificial Sequence
<220> FEATURE:
<223> OTHER INFORMATION: synthetic amplicon

<400> SEQUENCE: 70
tccagaacac tgtcagccat aaggaaattc atcacccaca acctcgctgt cttagggta    60 gtaccaccta ccactgcaaa gaagaagagt gctaagaaac tgggcacaaa cgagggtaaa  120
tagctacaac aacctttcca gataaactca tgaatttcac caggaaggcc aggccctcca  180
cctctcttgg ctagaaaaac atttcttgtt tctttcttta gcctacccctt tcagttcaac  240 aacaataaaa ttgatcatgg tgc                                          263

<210> SEQ ID NO 71
<211> LENGTH: 6
<212> TYPE: PRT
<213> ORGANISM: Artificial Sequence
```

```
<220> FEATURE:
<223> OTHER INFORMATION: 6 aa fragment of SEQ ID NO: 1

<400> SEQUENCE: 71

Glu Leu Pro Glu Gln Gln
1               5

<210> SEQ ID NO 72
<211> LENGTH: 6
<212> TYPE: PRT
<213> ORGANISM: Artificial Sequence
<220> FEATURE:
<223> OTHER INFORMATION: 6 aa fragment of SEQ ID NO: 1

<400> SEQUENCE: 72

Leu Pro Glu Gln Gln Glu
1               5

<210> SEQ ID NO 73
<211> LENGTH: 6
<212> TYPE: PRT
<213> ORGANISM: Artificial Sequence
<220> FEATURE:
<223> OTHER INFORMATION: 6 aa fragment of SEQ ID NO: 1

<400> SEQUENCE: 73

Pro Glu Gln Gln Glu Gly
1               5

<210> SEQ ID NO 74
<211> LENGTH: 6
<212> TYPE: PRT
<213> ORGANISM: Artificial Sequence
<220> FEATURE:
<223> OTHER INFORMATION: 6 aa fragment of SEQ ID NO: 1

<400> SEQUENCE: 74

Gln Gln Glu Gly Gln Leu
1               5

<210> SEQ ID NO 75
<211> LENGTH: 7
<212> TYPE: PRT
<213> ORGANISM: Artificial Sequence
<220> FEATURE:
<223> OTHER INFORMATION: 7 aa fragment of SEQ ID NO: 1

<400> SEQUENCE: 75

Glu Leu Pro Glu Gln Gln Glu
1               5

<210> SEQ ID NO 76
<211> LENGTH: 7
<212> TYPE: PRT
<213> ORGANISM: Artificial Sequence
<220> FEATURE:
<223> OTHER INFORMATION: 7 aa fragment of SEQ ID NO: 1

<400> SEQUENCE: 76

Leu Pro Glu Gln Gln Glu Gly
1               5

<210> SEQ ID NO 77
<211> LENGTH: 7
<212> TYPE: PRT
<213> ORGANISM: Artificial Sequence
<220> FEATURE:
```

<223> OTHER INFORMATION: 7 aa fragment of SEQ ID NO: 1

<400> SEQUENCE: 77

Pro Glu Gln Gln Glu Gly Gln
1               5

<210> SEQ ID NO 78
<211> LENGTH: 7
<212> TYPE: PRT
<213> ORGANISM: Artificial Sequence
<220> FEATURE:
<223> OTHER INFORMATION: 7 aa fragment of SEQ ID NO: 1

<400> SEQUENCE: 78

Glu Gln Gln Glu Gly Gln Leu
1               5

<210> SEQ ID NO 79
<211> LENGTH: 8
<212> TYPE: PRT
<213> ORGANISM: Artificial Sequence
<220> FEATURE:
<223> OTHER INFORMATION: 8 aa fragment of SEQ ID NO: 1

<400> SEQUENCE: 79

Glu Leu Pro Glu Gln Gln Glu Gly
1               5

<210> SEQ ID NO 80
<211> LENGTH: 8
<212> TYPE: PRT
<213> ORGANISM: Artificial Sequence
<220> FEATURE:
<223> OTHER INFORMATION: 8 aa fragment of SEQ ID NO: 1

<400> SEQUENCE: 80

Leu Pro Glu Gln Gln Glu Gly Gln
1               5

<210> SEQ ID NO 81
<211> LENGTH: 8
<212> TYPE: PRT
<213> ORGANISM: Artificial Sequence
<220> FEATURE:
<223> OTHER INFORMATION: 8 aa fragment of SEQ ID NO: 1

<400> SEQUENCE: 81

Pro Glu Gln Gln Glu Gly Gln Leu
1               5

<210> SEQ ID NO 82
<211> LENGTH: 9
<212> TYPE: PRT
<213> ORGANISM: Artificial Sequence
<220> FEATURE:
<223> OTHER INFORMATION: 9 aa fragment of SEQ ID NO: 1

<400> SEQUENCE: 82

Glu Leu Pro Glu Gln Gln Glu Gly Gln
1               5

<210> SEQ ID NO 83
<211> LENGTH: 9
<212> TYPE: PRT
<213> ORGANISM: Artificial Sequence
<220> FEATURE:
<223> OTHER INFORMATION: 9 aa fragment of SEQ ID NO: 1

-continued

```
<400> SEQUENCE: 83

Leu Pro Glu Gln Gln Glu Gly Gln Leu
1               5
```

COMPOSITIONS AND METHODS FOR TREATING SKIN DISEASES, DISORDERS, OR CONDITIONS

CROSS-REFERENCE TO RELATED APPLICATIONS

This application claims priority from U.S. Provisional Application Ser. No. 63/090,801 filed on 13 Oct. 2020, which is incorporated herein by reference in its entirety.

STATEMENT REGARDING FEDERALLY SPONSORED RESEARCH OR DEVELOPMENT

This invention was made with government support under AR068012, AR065523, GM007067, and HG000045 awarded by the National Institutes of Health. The government has certain rights in the invention.

MATERIAL INCORPORATED-BY-REFERENCE

The Sequence Listing, which is a part of the present disclosure, includes a computer readable form comprising nucleotide and/or amino acid sequences of the present invention (file name "017564-US-NP_2024-07-09_Updated-Sequence-Listing_ST25.txt" created on Jul. 11, 2024; 22,023 bytes). The subject matter of the Sequence Listing is incorporated herein by reference in its entirety.

FIELD OF THE INVENTION

The present disclosure generally relates to methods and compositions for improving or protecting the skin barrier.

SUMMARY OF THE INVENTION

Among the various aspects of the present disclosure is the provision of increasing skin barrier integrity, treating atopic dermatitis, or protecting against keratinocyte cell lysis comprising: administering to a subject in need thereof a therapeutically effective amount of an involucrin (IVL) peptide or increasing IVL expression in a subject. An aspect of the present disclosure provides for a method of increasing skin barrier or epidermis integrity. In some embodiments, the method comprises administering to a subject in need thereof a therapeutically effective amount of an involucrin (IVL) peptide or increasing IVL expression in a subject. In some embodiments, the therapeutically effective amount of the IVL peptide is an amount effective to regulate or increase vitamin D receptor function; regulate or increase Csnk1e (casein kinase 1e); increase involucrin expression; improve keratinocyte barrier function; protect against keratinocyte cell lysis; or improve epithelial barrier function. In some embodiments, the IVL peptide comprises ELPEQQEGQL (SEQ ID NO: 1); ELPEQAEGQL (SEQ ID NO: 2); ELPEAQEGQL (SEQ ID NO: 3); ELPEQQEGAL (SEQ ID NO: 4); ELPEAAEGAL (SEQ ID NO: 5); EQQEGQ (SEQ ID NO: 6); EQAEGQ (SEQ ID NO: 7); EAQEGQ (SEQ ID NO: 8); EQQEGA (SEQ ID NO: 9); or EAAEGA (SEQ ID NO: 10); or a therapeutically active variant thereof (e.g., at least about 80% identical, truncated, substituted, mutant, variant, or combinations thereof). In some embodiments, the IVL peptide comprises an amine N-terminus. In some embodiments, the IVL peptide comprises an amide C-terminus. In some embodiments, the method comprises topical administration of the IVL peptide. In some embodiments, the method comprises administering a vitamin D receptor agonist, vitamin D, or analog thereof. In some embodiments, the method comprises the analog is a vitamin D analog, MC903.

Another aspect of the present disclosure provides for a method of treating atopic dermatitis in a subject. In some embodiments, the method comprises administering to a subject in need thereof a therapeutically effective amount of an involucrin (IVL) peptide or increasing IVL expression in the subject. In some embodiments, the therapeutically effective amount of the IVL peptide is an amount effective to regulate or increase vitamin D receptor function; regulate or increase Csnk1e (casein kinase 1e); increase involucrin expression; improve keratinocyte barrier function; protect against keratinocyte cell lysis; or improve epithelial barrier function. In some embodiments, the IVL peptide comprises ELPEQQEGQL (SEQ ID NO: 1); ELPEQAEGQL (SEQ ID NO: 2); ELPEAQEGQL (SEQ ID NO: 3); ELPEQQEGAL (SEQ ID NO: 4); ELPEAAEGAL (SEQ ID NO: 5); EQQEGQ (SEQ ID NO: 6); EQAEGQ (SEQ ID NO: 7); EAQEGQ (SEQ ID NO: 8); EQQEGA (SEQ ID NO: 9); or EAAEGA (SEQ ID NO: 10); or a therapeutically active variant thereof (e.g., at least about 80% identical, truncated, substituted, mutant, variant, or combinations thereof). In some embodiments, the IVL peptide comprises an amine N-terminus. In some embodiments, the IVL peptide comprises an amide C-terminus. In some embodiments, the method comprises topical administration of the IVL peptide. In some embodiments, the method comprises administering a vitamin D receptor agonist, vitamin D, or analog thereof. In some embodiments, the method comprises the analog is a vitamin D analog, MC903. Yet another aspect of the present disclosure provides for a pharmaceutical composition comprising an IVL peptide in a cream, emulsion, gel, liposome, nanoparticle, or ointment carrier. In some embodiments, the IVL peptide comprises ELPEQQEGQL (SEQ ID NO: 1); ELPEQAEGQL (SEQ ID NO: 2); ELPEAQEGQL (SEQ ID NO: 3); ELPEQQEGAL (SEQ ID NO: 4); ELPEAAEGAL (SEQ ID NO: 5); EQQEGQ (SEQ ID NO: 6); EQAEGQ (SEQ ID NO: 7); EAQEGQ (SEQ ID NO: 8); EQQEGA (SEQ ID NO: 9); or EAAEGA (SEQ ID NO: 10); or a therapeutically active variant thereof (e.g., at least about 80% identical, truncated, substituted, mutant, variant, or combinations thereof). In some embodiments, the IVL peptide comprises an amine N-terminus. In some embodiments, the IVL peptide comprises an amide C-terminus. In some embodiments, the IVL peptide comprises a sequence at least 80% identical to SEQ ID NO: 1 and having involucrin activity. In some embodiments, the IVL peptide improves vitamin D receptor function; increases involucrin expression; improves keratinocyte barrier function; protects against keratinocyte cell lysis; or improves epithelial barrier function. In some embodiments, the IVL peptide comprises one or more Q to A substitutions. In some embodiments, the pharmaceutical composition further comprises a vitamin D receptor agonist, vitamin D, or an analog thereof. In some embodiments, the analog is a vitamin D analog, MC903.

Other objects and features will be in part apparent and in part pointed out hereinafter.

DESCRIPTION OF THE DRAWINGS

Those of skill in the art will understand that the drawings, described below, are for illustrative purposes only. The drawings are not intended to limit the scope of the present teachings in any way.

DETAILED DESCRIPTION OF THE INVENTION

Figure 1:
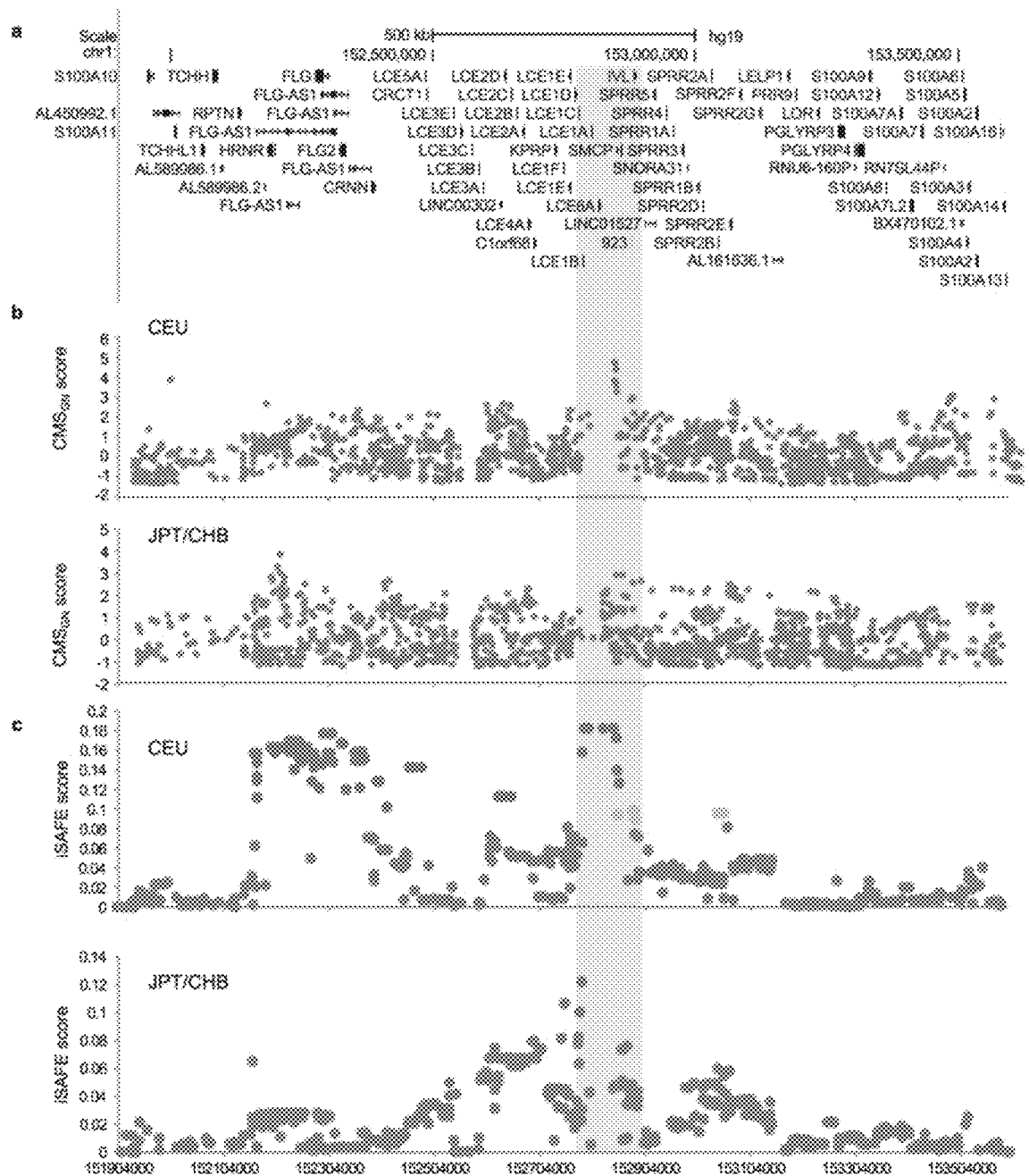
FIG. 1. Human evolution in the skin barrier as evidenced by multiple population-specific signals for positive selection in the epidermal differentiation complex. a Positive selection within the EDC (hg19 [human genome]; chr1:151,904,000-153,593,700) was determined by: b) clusters of SNPs with genome-normalized (GN) composite of multiple signals (CMSGN) score>2 with a FDR<0.05, and c) SNPs with iSAFE scores>0.10, all shown as red dots. Orange dots indicate SNPs 0.095<iSAFE score<0.10. The gray shaded region indicates the region of shared evidence of positive selection in CEU (Utah of European descent) near LCE1B-IVL. CMS scores were previously calculated for 1KGP HapMap II SNPs in CEU and JPT/CHB (Japanese in Tokyo, Japan and Han Chinese in Beijing) populations and iSAFE scores were calculated for 1 KGP Phase 3 SNPs in CEU and JPT/CHB. Here, 923 enhancer is shown as orange bar in panel (a). kb, kilobase.

The present disclosure is based, at least in part, on the discovery of a new mechanism by which gene expression for skin gene Involucrin is activated and functional.

As shown herein, a genomic enhancer named 923 was found in the Epidermal Differentiation Complex that is required to functionally drive transcriptional activation of this target gene. Furthermore, we also discovered that increased involucrin is positively selected in modern human evolution. Thus it was found that addition of involucrin peptide protects skin keratinocytes from cell lysis.

It was discovered, here, that the 923 enhancer in the EDC (coordinates) is required for the gene expression of lvl.

The 923 enhancer was specifically deleted in mice and it was found that loss of the enhancer leads to an allele-specific and dose-dependent decrease in lvl gene expression in the skin epidermis. These findings are the first to discover that a noncoding enhancer sequence is required for transcriptional activation for a proximal gene.

Moreover, it is the first to identify an enhancer that directly affects the skin epidermis. Here, the significance of these findings are linked to humans. Statistical analyses of genetic EDC variation in 3 geographically distinct human populations identifies strong positive selection for both the 923 enhancer and IVL gene (specific haplotype) in human populations that live in northern latitudes.

Specifically, we found increased allele-specific expression for IVL for individuals who genotype for this haplotype. Together, our data implicates increased IVL expression for enhanced skin barrier function in modern day human evolution.

It was further identified that the "late" repeat of IVL continues to expand in modern humans. We capitalized on this new knowledge of increased IVL and ongoing expansion of IVL late repeats and hypothesized that IVL late peptide treatment improves skin barrier function for keratinocytes. The data described herein identifies that treatment of the IVL late repeat peptide protects the keratinocyte from detergent lysis.

It was discovered that increased involucrin expression and use could be commercially useful to improve skin barrier function. Increased and allele-specific expression for an IVL haplotype that includes the 923 enhancer and its variants are associated with the haplotype that has been positively selected in modern human populations. The allele frequency has risen from 30% in African populations to almost 95% in northern European populations. There is a direct and positive correlation ($r^2$=0.89) between the allele frequency and the northern latitude position for a given population suggesting a selective advantage for individuals who possess the allele for increased involucrin expression in these northern geographical locations. Furthermore, we find that the "late" repeat in IVL continues to expand in number and is specific to humans only. Keratinocytes that have been treated with the "late" repeat IVL peptide are resistant to detergent lysis suggesting a protective advantage for keratinocytes with increased involucrin.

A custom peptide was developed. IVL Late Region Monomer: ELPEQQEGQL(SEQ ID NO: 1)-NH$_2$, 5 mg, Purity>95%). Involucrin is a protein component of human skin and in humans is encoded by the IVL gene. In binding the protein loricrin, involucrin contributes to the formation of a cell envelope that protects corneocytes in the skin.

Methods can be according to Mathyer et al. Selective sweep for an enhancer involucrin allele identifies skin barrier adaptation out of Africa, Nat Commun. 2021 May 7; 12(1):2557, incorporated herein by reference.

Molecular Engineering

The following definitions and methods are provided to better define the present invention and to guide those of ordinary skill in the art in the practice of the present invention. Unless otherwise noted, terms are to be understood according to conventional usage by those of ordinary skill in the relevant art.

The terms "heterologous DNA sequence", "exogenous DNA segment" or "heterologous nucleic acid," as used herein, each refers to a sequence that originates from a source foreign to the particular host cell or, if from the same source, is modified from its original form. Thus, a heterologous gene in a host cell includes a gene that is endogenous to the particular host cell but has been modified through, for example, the use of DNA shuffling. The terms also include non-naturally occurring multiple copies of a naturally occurring DNA sequence. Thus, the terms refer to a DNA segment that is foreign or heterologous to the cell, or homologous to the cell but in a position within the host cell nucleic acid in which the element is not ordinarily found. Exogenous DNA segments are expressed to yield exogenous polypeptides. A "homologous" DNA sequence is a DNA sequence that is naturally associated with a host cell into which it is introduced.

Expression vector, expression construct, plasmid, or recombinant DNA construct is generally understood to refer to a nucleic acid that has been generated via human intervention, including by recombinant means or direct chemical synthesis, with a series of specified nucleic acid elements that permit transcription or translation of a particular nucleic acid in, for example, a host cell. The expression vector can be part of a plasmid, virus, or nucleic acid fragment. Typically, the expression vector can include a nucleic acid to be transcribed operably linked to a promoter.

A "promoter" is generally understood as a nucleic acid control sequence that directs transcription of a nucleic acid. An inducible promoter is generally understood as a promoter that mediates transcription of an operably linked gene in response to a particular stimulus. A promoter can include necessary nucleic acid sequences near the start site of transcription, such as, in the case of a polymerase II type promoter, a TATA element. A promoter can optionally include distal enhancer or repressor elements, which can be located as much as several thousand base pairs from the start site of transcription.

A "transcribable nucleic acid molecule" as used herein refers to any nucleic acid molecule capable of being transcribed into a RNA molecule. Methods are known for introducing constructs into a cell in such a manner that the transcribable nucleic acid molecule is transcribed into a functional mRNA molecule that is translated and therefore expressed as a protein product. Constructs may also be constructed to be capable of expressing antisense RNA molecules, in order to inhibit translation of a specific RNA molecule of interest. For the practice of the present disclosure, conventional compositions and methods for preparing and using constructs and host cells are well known to one skilled in the art (see e.g., Sambrook and Russel (2006) Condensed Protocols from Molecular Cloning: A Laboratory Manual, Cold Spring Harbor Laboratory Press, ISBN-10: 0879697717; Ausubel et al. (2002) Short Protocols in Molecular Biology, 5th ed., Current Protocols, ISBN-10: 0471250929; Sambrook and Russel (2001) Molecular Cloning: A Laboratory Manual, 3d ed., Cold Spring Harbor Laboratory Press, ISBN-10: 0879695773; Elhai, J. and Wolk, C. P. 1988. Methods in Enzymology 167, 747-754).

The "transcription start site" or "initiation site" is the position surrounding the first nucleotide that is part of the transcribed sequence, which is also defined as position +1. With respect to this site all other sequences of the gene and its controlling regions can be numbered. Downstream sequences (i.e., further protein encoding sequences in the 3' direction) can be denominated positive, while upstream sequences (mostly of the controlling regions in the 5' direction) are denominated negative.

"Operably-linked" or "functionally linked" refers preferably to the association of nucleic acid sequences on a single nucleic acid fragment so that the function of one is affected by the other. For example, a regulatory DNA sequence is said to be "operably linked to" or "associated with" a DNA sequence that codes for an RNA or a polypeptide if the two sequences are situated such that the regulatory DNA sequence affects expression of the coding DNA sequence (i.e., that the coding sequence or functional RNA is under the transcriptional control of the promoter). Coding sequences can be operably-linked to regulatory sequences in sense or antisense orientation. The two nucleic acid molecules may be part of a single contiguous nucleic acid molecule and may be adjacent. For example, a promoter is operably linked to a gene of interest if the promoter regulates or mediates transcription of the gene of interest in a cell.

A "construct" is generally understood as any recombinant nucleic acid molecule such as a plasmid, cosmid, virus, autonomously replicating nucleic acid molecule, phage, or linear or circular single-stranded or double-stranded DNA or RNA nucleic acid molecule, derived from any source, capable of genomic integration or autonomous replication, comprising a nucleic acid molecule where one or more nucleic acid molecule has been operably linked.

Constructs of the present disclosure can contain a promoter operably linked to a transcribable nucleic acid molecule operably linked to a 3' transcription termination nucleic acid molecule. In addition, constructs can include but are not limited to additional regulatory nucleic acid molecules from, e.g., the 3'-untranslated region (3' UTR). Constructs can include but are not limited to the 5' untranslated regions (5' UTR) of an mRNA nucleic acid molecule which can play an important role in translation initiation and can also be a genetic component in an expression construct. These additional upstream and downstream regulatory nucleic acid molecules may be derived from a source that is native or heterologous with respect to the other elements present on the promoter construct.

The term "transformation" refers to the transfer of a nucleic acid fragment into the genome of a host cell, resulting in genetically stable inheritance. Host cells containing the transformed nucleic acid fragments are referred to as "transgenic" cells, and organisms comprising transgenic cells are referred to as "transgenic organisms".

"Transformed," "transgenic," and "recombinant" refer to a host cell or organism such as a bacterium, cyanobacterium, animal or a plant into which a heterologous nucleic acid molecule has been introduced. The nucleic acid molecule can be stably integrated into the genome as generally known in the art and disclosed (Sambrook 1989; Innis 1995; Gelfand 1995; Innis & Gelfand 1999). Known methods of PCR include, but are not limited to, methods using paired primers, nested primers, single specific primers, degenerate primers, gene-specific primers, vector-specific primers, partially mismatched primers, and the like. The term "untransformed" refers to normal cells that have not been through the transformation process.

"Wild-type" refers to a virus or organism found in nature without any known mutation.

Design, generation, and testing of the variant nucleotides, and their encoded polypeptides, having the above required percent identities and retaining a required activity of the expressed protein is within the skill of the art. For example, directed evolution and rapid isolation of mutants can be according to methods described in references including, but not limited to, Link et al. (2007) Nature Reviews 5(9), 680-688; Sanger et al. (1991) Gene 97(1), 119-123; Ghadessy et al. (2001) Proc Natl Acad Sci USA 98(8) 4552-4557. Thus, one skilled in the art could generate a large number of nucleotide and/or polypeptide variants having, for example, at least 95-99% identity to the reference sequence described herein and screen such for desired phenotypes according to methods routine in the art.

Nucleotide and/or amino acid sequence identity percent (%) is understood as the percentage of nucleotide or amino acid residues that are identical with nucleotide or amino acid residues in a candidate sequence in comparison to a reference sequence when the two sequences are aligned. To determine percent identity, sequences are aligned and if necessary, gaps are introduced to achieve the maximum percent sequence identity. Sequence alignment procedures to determine percent identity are well known to those of skill in the art. Often publicly available computer software such as BLAST, BLAST2, ALIGN2 or Megalign (DNASTAR) software is used to align sequences. Those skilled in the art can determine appropriate parameters for measuring alignment, including any algorithms needed to achieve maximal alignment over the full-length of the sequences being compared. When sequences are aligned, the percent sequence identity of a given sequence A to, with, or against a given sequence B (which can alternatively be phrased as a given sequence A that has or comprises a certain percent sequence identity to, with, or against a given sequence B) can be calculated as: percent sequence identity=X/Y100, where X is the number of residues scored as identical matches by the sequence alignment program's or algorithm's alignment of A and B and Y is the total number of residues in B. If the length of sequence A is not equal to the length of sequence B, the percent sequence identity of A to B will not equal the percent sequence identity of B to A.

Generally, conservative substitutions can be made at any position so long as the required activity is retained. So-called conservative exchanges can be carried out in which the amino acid which is replaced has a similar property as the original amino acid, for example the exchange of Glu by Asp, Gln by Asn, Val by Ile, Leu by Ile, and Ser by Thr. For example, amino acids with similar properties can be Aliphatic amino acids (e.g., Glycine, Alanine, Valine, Leucine, Isoleucine); Hydroxyl or sulfur/selenium-containing amino acids (e.g., Serine, Cysteine, Selenocysteine, Threonine, Methionine); Cyclic amino acids (e.g., Proline); Aromatic amino acids (e.g., Phenylalanine, Tyrosine, Tryptophan); Basic amino acids (e.g., Histidine, Lysine, Arginine); or Acidic and their Amide (e.g., Aspartate, Glutamate, Asparagine, Glutamine). Deletion is the replacement of an amino acid by a direct bond. Positions for deletions include the termini of a polypeptide and linkages between individual protein domains. Insertions are introductions of amino acids into the polypeptide chain, a direct bond formally being replaced by one or more amino acids. Amino acid sequence can be modulated with the help of art-known computer simulation programs that can produce a polypeptide with, for example, improved activity or altered regulation. On the basis of this artificially generated polypeptide sequences, a corresponding nucleic acid molecule coding for such a modulated polypeptide can be synthesized in-vitro using the specific codon-usage of the desired host cell.

"Highly stringent hybridization conditions" are defined as hybridization at 65° C. in a 6×SSC buffer (i.e., 0.9 M sodium chloride and 0.09 M sodium citrate). Given these conditions, a determination can be made as to whether a given set of sequences will hybridize by calculating the melting temperature ($T_m$) of a DNA duplex between the two sequences. If a particular duplex has a melting temperature lower than 65° C. in the salt conditions of a 6×SSC, then the two sequences will not hybridize. On the other hand, if the melting temperature is above 65° C. in the same salt conditions, then the sequences will hybridize. In general, the melting temperature for any hybridized DNA:DNA sequence can be determined using the following formula: $T_m=81.5°$ C.$+16.6(\log_{10}[Na^+])+0.41$ (fraction G/C content)$-0.63$(% formamide)$-(600/I)$. Furthermore, the $T_m$ of a DNA:DNA hybrid is decreased by 1-1.5° C. for every 1% decrease in nucleotide identity (see e.g., Sambrook and Russel, 2006).

Host cells can be transformed using a variety of standard techniques known to the art (see e.g., Sambrook and Russel (2006) Condensed Protocols from Molecular Cloning: A Laboratory Manual, Cold Spring Harbor Laboratory Press, ISBN-10: 0879697717; Ausubel et al. (2002) Short Protocols in Molecular Biology, 5th ed., Current Protocols, ISBN-10: 0471250929; Sambrook and Russel (2001) Molecular Cloning: A Laboratory Manual, 3d ed., Cold Spring Harbor Laboratory Press, ISBN-10: 0879695773; Elhai, J. and Wolk, C. P. 1988. Methods in Enzymology 167, 747-754). Such techniques include, but are not limited to, viral infection, calcium phosphate transfection, liposome-mediated transfection, microprojectile-mediated delivery, receptor-mediated uptake, cell fusion, electroporation, and the like. The transfected cells can be selected and propagated to provide recombinant host cells that comprise the expression vector stably integrated in the host cell genome.

An involucrin (IVL) peptide, as described herein, can be a peptide or mutant thereof having IVL activity or loricrin binding activity. For example, the peptide can comprise a sequence ELPEQQEGQL (SEQ ID NO: 1), or a variant, fragment, mutant, or mutated fragment thereof. A mutant peptide can be a 6 amino acid fragment of SEQ ID NO: 1, such as: ELPEQQ (SEQ ID NO: 71); LPEQQE (SEQ ID NO: 72); PEQQEG (SEQ ID NO: 73); EQQEGQ (SEQ ID NO: 6); QQEGQL (SEQ ID NO: 74); or a mutant thereof. A mutant peptide can be a 7 amino acid fragment of SEQ ID NO: 1, such as: ELPEQQE (SEQ ID NO: 75); LPEQQEG (SEQ ID NO: 76); PEQQEGQ (SEQ ID NO: 77); EQQEGQL (SEQ ID NO: 78), or a mutant thereof. A mutant peptide can be an 8 amino acid fragment of SEQ ID NO: 1, such as: ELPEQQEG (SEQ ID NO: 79); LPEQQEGQ (SEQ ID NO: 80); PEQQEGQL (SEQ ID NO: 81), or a mutant thereof. A mutant peptide can be a 9 amino acid fragment of SEQ ID NO: 1, such as: ELPEQQEGQ (SEQ ID NO: 82); LPEQQEGQL (SEQ ID NO: 83); or a mutant thereof. For example the mutant can comprise one or more conservative substitution or one or more non-conservative substitution.

| Conservative Substitutions I | |
|---|---|
| Side Chain Characteristic | Amino Acid |
| Aliphatic Non-polar | G A P I L V |
| Polar-uncharged | C S T M N Q |
| Polar-charged | D E K R |
| Aromatic | H F W Y |
| Other | N Q D E |

| Conservative Substitutions II | |
|---|---|
| Side Chain Characteristic | Amino Acid |
| Non-polar (hydrophobic) | |
| A. Aliphatic: | A L I V P |
| B. Aromatic: | F W |
| C. Sulfur-containing: | M |
| D. Borderline: | G |
| Uncharged-polar | |
| A. Hydroxyl: | S T Y |
| B. Amides: | N Q |
| C. Sulfhydryl: | C |
| D. Borderline: | G |
| Positively Charged (Basic): | K R H |
| Negatively Charged (Acidic): | D E |

| Conservative Substitutions III | |
|---|---|
| Original Residue | Exemplary Substitution |
| Ala (A) | Val, Leu, Ile |
| Arg (R) | Lys, Gln, Asn |
| Asn (N) | Gln, His, Lys, Arg |
| Asp (D) | Glu |
| Cys (C) | Ser |
| Gln (Q) | Asn |
| Glu (E) | Asp |
| His (H) | Asn, Gln, Lys, Arg |
| Ile (I) | Leu, Val, Met, Ala, Phe, |
| Leu (L) | Ile, Val, Met, Ala, Phe |
| Lys (K) | Arg, Gln, Asn |
| Met (M) | Leu, Phe, Ile |
| Phe (F) | Leu, Val, Ile, Ala |
| Pro (P) | Gly |
| Ser (S) | Thr |
| Thr (T) | Ser |
| Trp (W) | Tyr, Phe |
| Tyr (Y) | Trp, Phe, Tur, Ser |
| Val (V) | Ile, Leu, Met, Phe, Ala |

Exemplary nucleic acids which may be introduced to a host cell include, for example, DNA sequences or genes from another species, or even genes or sequences which originate with or are present in the same species, but are incorporated into recipient cells by genetic engineering methods. The term "exogenous" is also intended to refer to genes that are not normally present in the cell being transformed, or perhaps simply not present in the form, structure, etc., as found in the transforming DNA segment or gene, or genes which are normally present and that one desires to express in a manner that differs from the natural expression pattern, e.g., to over-express. Thus, the term "exogenous" gene or DNA is intended to refer to any gene or DNA segment that is introduced into a recipient cell, regardless of whether a similar gene may already be present in such a cell. The type of DNA included in the exogenous DNA can include DNA which is already present in the cell, DNA from another individual of the same type of organism, DNA from a different organism, or a DNA generated externally, such as a DNA sequence containing an antisense message of a gene, or a DNA sequence encoding a synthetic or modified version of a gene.

Host strains developed according to the approaches described herein can be evaluated by a number of means known in the art (see e.g., Studier (2005) Protein Expr Purif. 41(1), 207-234; Gellissen, ed. (2005) Production of Recombinant Proteins: Novel Microbial and Eukaryotic Expression Systems, Wiley-VCH, ISBN-10: 3527310363; Baneyx (2004) Protein Expression Technologies, Taylor & Francis, ISBN-10: 0954523253).

Methods of down-regulation or silencing genes are known in the art. For example, expressed protein activity can be down-regulated or eliminated using antisense oligonucleotides (ASOs), protein aptamers, nucleotide aptamers, and RNA interference (RNAi) (e.g., small interfering RNAs (siRNA), short hairpin RNA (shRNA), and micro RNAs (miRNA) (see e.g., Rinaldi and Wood (2017) Nature Reviews Neurology 14, describing ASO therapies; Fanning and Symonds (2006) Handb Exp Pharmacol. 173, 289-303G, describing hammerhead ribozymes and small hairpin RNA; Helene, et al. (1992) Ann. N.Y. Acad. Sci. 660, 27-36; Maher (1992) Bioassays 14(12): 807-15, describing targeting deoxyribonucleotide sequences; Lee et al. (2006) Curr Opin Chem Biol. 10, 1-8, describing aptamers; Reynolds et al. (2004) Nature Biotechnology 22(3), 326-330, describing RNAi; Pushparaj and Melendez (2006) Clinical and Experimental Pharmacology and Physiology 33(5-6), 504-510, describing RNAi; Dillon et al. (2005) Annual Review of Physiology 67, 147-173, describing RNAi; Dykxhoorn and Lieberman (2005) Annual Review of Medicine 56, 401-423, describing RNAi). RNAi molecules are commercially available from a variety of sources (e.g., Ambion, TX; Sigma Aldrich, MO; Invitrogen). Several siRNA molecule design programs using a variety of algorithms are known to the art (see e.g., Cenix algorithm, Ambion; BLOCK-iT™ RNAi Designer, Invitrogen; siRNA Whitehead Institute Design Tools, Bioinformatics & Research Computing). Traits influential in defining optimal siRNA sequences include G/C content at the termini of the siRNAs, $T_m$ of specific internal domains of the siRNA, siRNA length, position of the target sequence within the CDS (coding region), and nucleotide content of the 3' overhangs.

Genome Editing

As described herein, IVL expression can be modulated (e.g., reduced, eliminated, or enhanced) using genome editing. Processes for genome editing are well known; see e.g. Aldi 2018 Nature Communications 9(1911). Except as otherwise noted herein, therefore, the process of the present disclosure can be carried out in accordance with such processes.

For example, genome editing can comprise CRISPR/Cas9, CRISPR-Cpf1, TALEN, or ZFNs. Adequate expression of IVL by genome editing can result in protection against skin diseases, disorders, or conditions, such as protection against keratinocyte cell lysis.

As an example, clustered regularly interspaced short palindromic repeats (CRISPR)/CRISPR-associated (Cas) systems are a new class of genome-editing tools that target desired genomic sites in mammalian cells. Recently published type II CRISPR/Cas systems use Cas9 nuclease that is targeted to a genomic site by complexing with a synthetic guide RNA that hybridizes to a 20-nucleotide DNA sequence and immediately preceding an NGG motif recognized by Cas9 (thus, a $(N)_{20}$NGG target DNA sequence). This results in a double-strand break three nucleotides upstream of the NGG motif. The double strand break instigates either non-homologous end-joining, which is error-prone and conducive to frameshift mutations that knock out gene alleles, or homology-directed repair, which can be exploited with the use of an exogenously introduced double-strand or single-strand DNA repair template to knock in or correct a mutation in the genome. Thus, genomic editing, for example, using CRISPR/Cas systems (e.g., CRISPRa) could be useful tools for therapeutic applications for skin diseases, disorders, or conditions to target cells by the enhancement of lvl.

For example, the methods as described herein can comprise a method for altering a target polynucleotide sequence in a cell comprising contacting the polynucleotide sequence with a clustered regularly interspaced short palindromic repeats-associated (Cas) protein.

Formulation

The agents and compositions described herein can be formulated by any conventional manner using one or more pharmaceutically acceptable carriers or excipients as described in, for example, Remington's Pharmaceutical Sciences (A. R. Gennaro, Ed.), 21st edition, ISBN: 0781746736 (2005), incorporated herein by reference in its entirety. Such formulations will contain a therapeutically effective amount of a biologically active agent described herein, which can be in purified form, together with a suitable amount of carrier so as to provide the form for proper administration to the subject.

The term "formulation" refers to preparing a drug in a form suitable for administration to a subject, such as a human. Thus, a "formulation" can include pharmaceutically acceptable excipients, including diluents or carriers.

The term "pharmaceutically acceptable" as used herein can describe substances or components that do not cause unacceptable losses of pharmacological activity or unacceptable adverse side effects. Examples of pharmaceutically acceptable ingredients can be those having monographs in United States Pharmacopeia (USP 29) and National Formulary (NF 24), United States Pharmacopeial Convention, Inc, Rockville, Maryland, 2005 ("USP/NF"), or a more recent edition, and the components listed in the continuously updated Inactive Ingredient Search online database of the FDA. Other useful components that are not described in the USP/NF, etc. may also be used.

The term "pharmaceutically acceptable excipient," as used herein, can include any and all solvents, dispersion media, coatings, antibacterial and antifungal agents, isotonic, or absorption delaying agents. The use of such media and agents for pharmaceutical active substances is well known in the art (see generally Remington's Pharmaceutical Sciences (A. R. Gennaro, Ed.), 21st edition, ISBN: 0781746736 (2005)). Except insofar as any conventional media or agent is incompatible with an active ingredient, its use in the therapeutic compositions is contemplated. Supplementary active ingredients can also be incorporated into the compositions.

A "stable" formulation or composition can refer to a composition having sufficient stability to allow storage at a convenient temperature, such as between about 0° C. and about 60° C., for a commercially reasonable period of time, such as at least about one day, at least about one week, at least about one month, at least about three months, at least about six months, at least about one year, or at least about two years.

The formulation should suit the mode of administration. The agents of use with the current disclosure can be formulated by known methods for administration to a subject using several routes which include, but are not limited to, parenteral, pulmonary, oral, topical, intradermal, intranasal, inhalation (e.g., in an aerosol), intramuscular, intraperitoneal, intravenous, subcutaneous, intranasal, epidural, ophthalmic, transdermal, buccal, and rectal. Preferably, the mode of administration is topical. The individual agents may also be administered in combination with one or more additional agents or together with other biologically active or biologically inert agents. Such biologically active or inert agents may be in fluid or mechanical communication with the agent(s) or attached to the agent(s) by ionic, covalent, Van der Waals, hydrophobic, hydrophilic or other physical forces.

Controlled-release (or sustained-release) preparations may be formulated to extend the activity of the agent(s) and reduce dosage frequency. Controlled-release preparations can also be used to effect the time of onset of action or other characteristics, such as blood levels of the agent, and consequently affect the occurrence of side effects. Controlled-release preparations may be designed to initially release an amount of an agent(s) that produces the desired therapeutic effect, and gradually and continually release other amounts of the agent to maintain the level of therapeutic effect over an extended period of time. In order to maintain a near-constant level of an agent in the body, the agent can be released from the dosage form at a rate that will replace the amount of agent being metabolized or excreted from the body. The controlled-release of an agent may be stimulated by various inducers, e.g., change in pH, change in temperature, enzymes, water, or other physiological conditions or molecules.

Agents or compositions described herein can also be used in combination with other therapeutic modalities, as described further below. Thus, in addition to the therapies described herein, one may also provide to the subject other therapies known to be efficacious for treatment of the disease, disorder, or condition.

Therapeutic Methods

Also provided is a process of treating or preventing a skin disease, disorder, or condition in a subject in need of administration of a therapeutically effective amount of an IVL modulating agent (such as an IVL peptide or variant thereof), so as to treat, prevent, or protect against a skin disease, disorder, or condition.

Methods described herein are generally performed on a subject in need thereof. A subject in need of the therapeutic methods described herein can be a subject having, diagnosed with, suspected of having, or at risk for developing a skin disease, disorder, or condition. A determination of the need for treatment will typically be assessed by a history, physical exam, or diagnostic tests consistent with the disease or condition at issue. Diagnosis of the various conditions treatable by the methods described herein is within the skill of the art. The subject can be an animal subject, including a mammal, such as horses, cows, dogs, cats, sheep, pigs, mice, rats, monkeys, hamsters, guinea pigs, and humans or chickens. For example, the subject can be a human subject.

Generally, a safe and effective amount of an IVL modulating agent is, for example, that amount that would cause the desired therapeutic effect in a subject while minimizing undesired side effects. In various embodiments, an effective amount of an IVL modulating agent described herein can substantially protect against cell lysis, slow the progress of a skin disease, disorder, or condition, or limit the development of a skin disease, disorder, or condition.

According to the methods described herein, administration can be parenteral, pulmonary, oral, topical, intradermal, intramuscular, intraperitoneal, intravenous, subcutaneous, intranasal, epidural, ophthalmic, buccal, or rectal administration.

When used in the treatments described herein, a therapeutically effective amount of an IVL modulating agent can be employed in pure form or, where such forms exist, in pharmaceutically acceptable salt form and with or without a pharmaceutically acceptable excipient. For example, the compounds of the present disclosure can be administered, at a reasonable benefit/risk ratio applicable to any medical treatment, in a sufficient amount to protect against cell lysis, slow the progress of a skin disease, disorder, or condition, or limit the development of a skin disease, disorder, or condition.

The amount of a composition described herein that can be combined with a pharmaceutically acceptable carrier to produce a single dosage form will vary depending upon the host treated and the particular mode of administration. It will be appreciated by those skilled in the art that the unit content of agent contained in an individual dose of each dosage form need not in itself constitute a therapeutically effective amount, as the necessary therapeutically effective amount could be reached by administration of a number of individual doses.

Toxicity and therapeutic efficacy of compositions described herein can be determined by standard pharmaceutical procedures in cell cultures or experimental animals for determining the $LD_{50}$ (the dose lethal to 50% of the population) and the $ED_{50}$, (the dose therapeutically effective in 50% of the population). The dose ratio between toxic and therapeutic effects is the therapeutic index that can be expressed as the ratio $LD_{50}/ED_{50}$, where larger therapeutic indices are generally understood in the art to be optimal.

The specific therapeutically effective dose level for any particular subject will depend upon a variety of factors including the disorder being treated and the severity of the disorder; activity of the specific compound employed; the specific composition employed; the age, body weight, general health, sex and diet of the subject; the time of administration; the route of administration; the rate of excretion of the composition employed; the duration of the treatment; drugs used in combination or coincidental with the specific compound employed; and like factors well known in the medical arts (see e.g., Koda-Kimble et al. (2004) Applied Therapeutics: The Clinical Use of Drugs, Lippincott Williams & Wilkins, ISBN 0781748453; Winter (2003) Basic Clinical Pharmacokinetics, $4^{th}$ ed., Lippincott Williams & Wilkins, ISBN 0781741475; Sharqel (2004) Applied Biopharmaceutics & Pharmacokinetics, McGraw-Hill/Appleton & Lange, ISBN 0071375503). For example, it is well within the skill of the art to start doses of the composition at levels lower than those required to achieve the desired therapeutic effect and to gradually increase the dosage until the desired effect is achieved. If desired, the effective daily dose may be divided into multiple doses for purposes of administration. Consequently, single dose compositions may contain such amounts or submultiples thereof to make up the daily dose. It will be understood, however, that the total daily usage of the compounds and compositions of the present disclosure will be decided by an attending physician within the scope of sound medical judgment.

Again, each of the states, diseases, disorders, and conditions, described herein, as well as others, can benefit from compositions and methods described herein. Generally, treating a state, disease, disorder, or condition includes preventing or delaying the appearance of clinical symptoms in a mammal that may be afflicted with or predisposed to the state, disease, disorder, or condition but does not yet experience or display clinical or subclinical symptoms thereof. Treating can also include inhibiting the state, disease, disorder, or condition, e.g., arresting or reducing the development of the disease or at least one clinical or subclinical symptom thereof. Furthermore, treating can include relieving the disease, e.g., causing regression of the state, disease, disorder, or condition or at least one of its clinical or subclinical symptoms. A benefit to a subject to be treated can be either statistically significant or at least perceptible to the subject or to a physician.

Administration of an IVL modulating agent can occur as a single event or over a time course of treatment. For example, an IVL modulating agent can be administered daily, weekly, bi-weekly, or monthly. For treatment of acute conditions, the time course of treatment will usually be at least several days. Certain conditions could extend treatment from several days to several weeks. For example, treatment could extend over one week, two weeks, or three weeks. For more chronic conditions, treatment could extend from several weeks to several months or even a year or more.

Treatment in accord with the methods described herein can be performed prior to, concurrent with, or after conventional treatment modalities for a skin disease, disorder, or condition.

An IVL modulating agent can be administered simultaneously or sequentially with another agent, such as an antibiotic, an anti-inflammatory, or another agent. For example, an IVL modulating agent can be administered simultaneously with another agent, such as an antibiotic or an anti-inflammatory. Simultaneous administration can occur through administration of separate compositions, each containing one or more of an IVL modulating agent, an antibiotic, an anti-inflammatory, or another agent. Simultaneous administration can occur through administration of one composition containing two or more of an IVL modulating agent, an antibiotic, an anti-inflammatory, or another agent. An IVL modulating agent can be administered sequentially with an antibiotic, an anti-inflammatory, or another agent. For example, an IVL modulating agent can be administered before or after administration of an antibiotic, an anti-inflammatory, or another agent.

Administration

Agents and compositions described herein can be administered according to methods described herein in a variety of means known to the art. The agents and composition can be used therapeutically either as exogenous materials or as endogenous materials. Exogenous agents are those produced or manufactured outside of the body and administered to the body. Endogenous agents are those produced or manufactured inside the body by some type of device (biologic or other) for delivery within or to other organs in the body.

As discussed above, administration can be parenteral, pulmonary, oral, topical, intradermal, intramuscular, intraperitoneal, intravenous, subcutaneous, intranasal, epidural, ophthalmic, buccal, or rectal administration.

Agents and compositions described herein can be administered in a variety of methods well known in the arts. Administration can include, for example, methods involving oral ingestion, direct injection (e.g., systemic or stereotactic), implantation of cells engineered to secrete the factor of interest, drug-releasing biomaterials, polymer matrices, gels, permeable membranes, osmotic systems, multilayer coatings, microparticles, implantable matrix devices, mini-osmotic pumps, implantable pumps, injectable gels and hydrogels, liposomes, micelles (e.g., up to 30 µm), nanospheres (e.g., less than 1 µm), microspheres (e.g., 1-100 µm), reservoir devices, a combination of any of the above, or other suitable delivery vehicles to provide the desired release profile in varying proportions. Other methods of controlled-release delivery of agents or compositions will be known to the skilled artisan and are within the scope of the present disclosure.

Delivery systems may include, for example, an infusion pump which may be used to administer the agent or composition in a manner similar to that used for delivering insulin or chemotherapy to specific organs or tumors. Typically, using such a system, an agent or composition can be administered in combination with a biodegradable, biocompatible polymeric implant that releases the agent over a controlled period of time at a selected site. Examples of polymeric materials include polyanhydrides, polyorthoesters, polyglycolic acid, polylactic acid, polyethylene vinyl acetate, and copolymers and combinations thereof. In addition, a controlled release system can be placed in proximity of a therapeutic target, thus requiring only a fraction of a systemic dosage.

Agents can be encapsulated and administered in a variety of carrier delivery systems. Examples of carrier delivery systems include microspheres, hydrogels, polymeric implants, smart polymeric carriers, and liposomes (see generally, Uchegbu and Schatzlein, eds. (2006) Polymers in Drug Delivery, CRC, ISBN-10: 0849325331). Carrier-based systems for molecular or biomolecular agent delivery can: provide for intracellular delivery; tailor biomolecule/agent release rates; increase the proportion of biomolecule that reaches its site of action; improve the transport of the drug to its site of action; allow colocalized deposition with other agents or excipients; improve the stability of the agent in vivo; prolong the residence time of the agent at its site of action by reducing clearance; decrease the nonspecific delivery of the agent to nontarget tissues; decrease irritation caused by the agent; decrease toxicity due to high initial doses of the agent; alter the immunogenicity of the agent; decrease dosage frequency, improve taste of the product; or improve shelf life of the product.

Definitions and methods described herein are provided to better define the present disclosure and to guide those of ordinary skill in the art in the practice of the present disclosure. Unless otherwise noted, terms are to be understood according to conventional usage by those of ordinary skill in the relevant art.

In some embodiments, numbers expressing quantities of ingredients, properties such as molecular weight, reaction conditions, and so forth, used to describe and claim certain embodiments of the present disclosure are to be understood as being modified in some instances by the term "about." In some embodiments, the term "about" is used to indicate that a value includes the standard deviation of the mean for the device or method being employed to determine the value. In some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable. The numerical values presented in some embodiments of the present disclosure may contain certain errors necessarily resulting from the standard deviation found in their respective testing measurements. The recitation of ranges of values herein is merely intended to serve as a shorthand method of referring individually to each separate value falling within the range. Unless otherwise indicated herein, each individual value is incorporated into the specification as if it were individually recited herein. The recitation of discrete values is understood to include ranges between each value.

In some embodiments, the terms "a" and "an" and "the" and similar references used in the context of describing a particular embodiment (especially in the context of certain of the following claims) can be construed to cover both the singular and the plural, unless specifically noted otherwise. In some embodiments, the term "or" as used herein, including the claims, is used to mean "and/or" unless explicitly indicated to refer to alternatives only or the alternatives are mutually exclusive.

The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and can also cover other unlisted steps. Similarly, any composition or device that "comprises," "has" or "includes" one or more features is not limited to possessing only those one or more features and can cover other unlisted features.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the present disclosure and does not pose a limitation on the scope of the present disclosure otherwise claimed. No language in the specification should be construed as indicating any non-claimed element essential to the practice of the present disclosure.

Groupings of alternative elements or embodiments of the present disclosure disclosed herein are not to be construed as limitations. Each group member can be referred to and claimed individually or in any combination with other members of the group or other elements found herein. One or more members of a group can be included in, or deleted from, a group for reasons of convenience or patentability. When any such inclusion or deletion occurs, the specification is herein deemed to contain the group as modified thus fulfilling the written description of all Markush groups used in the appended claims.

All publications, patents, patent applications, and other references cited in this application are incorporated herein by reference in their entirety for all purposes to the same extent as if each individual publication, patent, patent application or other reference was specifically and individually indicated to be incorporated by reference in its entirety for all purposes. Citation of a reference herein shall not be construed as an admission that such is prior art to the present disclosure.

Having described the present disclosure in detail, it will be apparent that modifications, variations, and equivalent embodiments are possible without departing the scope of the present disclosure defined in the appended claims. Furthermore, it should be appreciated that all examples in the present disclosure are provided as non-limiting examples.

Examples

The following non-limiting examples are provided to further illustrate the present disclosure. It should be appreciated by those of skill in the art that the techniques disclosed in the examples that follow represent approaches the inventors have found function well in the practice of the present disclosure, and thus can be considered to constitute examples of modes for its practice. However, those of skill in the art should, in light of the present disclosure, appreciate that many changes can be made in the specific embodiments that are disclosed and still obtain a like or similar result without departing from the spirit and scope of the present disclosure.

Example 1: Enhancer Regulation of Involucrin and their Functions

Abstract

The genetic modules that contribute to human evolution are poorly understood. Here we investigate positive selection in the Epidermal Differentiation Complex locus for skin barrier adaptation in diverse HapMap human populations (CEU, JPT/CHB, and YRI). Using Composite of Multiple Signals and iSAFE, we identify selective sweeps for LCE1A-SMCP and involucrin (IVL) haplotypes associated with human migration out-of-Africa, reaching near fixation in European populations. CEU-IVL is associated with increased IVL expression and a known epidermis-specific enhancer. CRISPR/Cas9 deletion of the orthologous mouse enhancer in vivo reveals a functional requirement for the enhancer to regulate lvl expression in cis. Reporter assays confirm increased regulatory and additive enhancer effects of CEU-specific polymorphisms identified at predicted IRF1 and NFIC binding sites in the IVL enhancer (rs4845327) and its promoter (rs1854779). Together, our results identify a selective sweep for a cis regulatory module for CEU-IVL, highlighting human skin barrier evolution for increased IVL expression out-of-Africa.

INTRODUCTION

Modern humans (*Homo sapiens*) have evolved by adapting to local environments and niches, under constant pressure to survive. Our current understanding of human evolution has been founded on visual phenotypic changes and the underlying genetic variation. However, whole-genome sequencing and downstream methodology have facilitated a reverse genomics approach, allowing researchers to more accurately pinpoint significant genetic differences and thus reveal additional adaptive traits. In particular, the availability of multiple and diverse human genomes has revolutionized the field, enabling the identification of loci undergoing selection in different populations and their impact on human health. Here we investigate human skin barrier adaptation by examining signatures of positive selection within the epidermal differentiation complex (EDC) locus from a diverse set of human genomes. The EDC (located on human 1q21, mouse 3q) exhibited the highest rate of non-synonymous substitutions in the human genome and was ranked as the most rapidly diverging gene cluster in the human-chimp genome comparison. The EDC spans approximately 1.6 Mb and contains 64 genes representing four gene families, including the filaggrin (FLG)-like or SFTP (S100-fused-type protein), late cornified envelope (LCE), small proline repeat-rich (SPRR), and S100-domain (S100) family members. The expression of many of these EDC genes is a hallmark feature of the terminally differentiated epidermal cells (keratinocytes) that comprise the interfollicular epidermis and form the first line of defense at the skin surface. Many EDC proteins, including involucrin (IVL) and many SPRRs and LCEs, are covalently cross-linked to form the cornified envelope that surrounds the keratinocyte. Identification of EDC orthologs across many mammalian genomes led to the discovery of the observed linearity and synteny of the EDC in both mammals and vertebrates. We previously identified positive selection in the EDC for specific genes across the mammalian phylogeny, and specifically in primates and humans. Motivated by these studies, we hypothesized ongoing evolution within the EDC for skin barrier adaptation among the geographically diverse group of modern-day human populations.

Here, we show selective sweeps for LCE1A-SMCP and IVL haplotypes associated with human migration out-of-Africa. The European CEU-IVL haplotype is associated with increased IVL expression and includes an epidermis-specific enhancer. Deletion of the enhancer in mice using CRISPR/Cas9 genome editing results in a significant decrease in lvl expression in cis. We translate this new knowledge of the enhancer to regulate IVL in humans and examine human population-specific alleles for IVL. We find increased regulatory activity specific to CEU-IVL with an additive effect by the enhancer that includes predicted binding for IRF1 at enhancer rs4845327 and NFIC binding at promoter rs1854779. Together, the findings highlight recent human skin barrier evolution for increased IVL expression and its enhancer, as humans migrated out-of-Africa.

Results

Selective Sweeps for the CEU-LCE1A-SMCP and CEU-IVL Haplotypes Out-of-Africa

We sought to determine positive selection in the EDC using two independent algorithms, composite of multiple signals (CMS) and the integrated selection of allele favored by evolution (iSAFE) (see e.g., FIG. 1a). CMS comprehensively identifies sites that are most likely to have undergone a positive selective sweep, reporting a composite probability score from multiple selection tests for a given SNP. iSAFE incorporates coalescent structures surrounding regions under selective sweep to further rank and pinpoint sites of positive selection. CMS scores for all EDC HapMap II SNPs were extracted for each of the following populations: individuals from (1) Utah of European descent (CEU), (2) Yoruba from Ibadan, Nigeria (YRI), and pooled Japanese in Tokyo, Japan and Han Chinese in Beijing (JPT/CHB). Signals of positive selection using CMS were not detected in YRI (false discovery rate, FDR<0.05). However, rs4511111 near HRNR was positively selected in JPT/CHB (see e.g., FIG. 1b) and is in strong linkage disequilibrium (LD) ($r^2 \geq 0.8$) with the positively selected HRNR-FLG "Huxian haplogroup" previously reported in the Han Chinese population which further validates the significance of the Huxian haplogroup sweep. By contrast, evidence of positive selection in CEU was found in two genomic regions: rs3007674 nearby S100A11 and a cluster of four SNPs near SMCP (rs12022319, rs4845490, rs4845491, and rs3737861) that collectively exhibited the strongest signal in CEU ($3.64 \leq CMS_{GN} \leq 4.75$; $CMS_{GN}$, genome-normalized composite of multiple signals). Thus, our findings using CMS identifies selective sweeps for HRNR-FLG in JPT/CHB and near S100A11 and SMCP in CEU.

Figure 5:
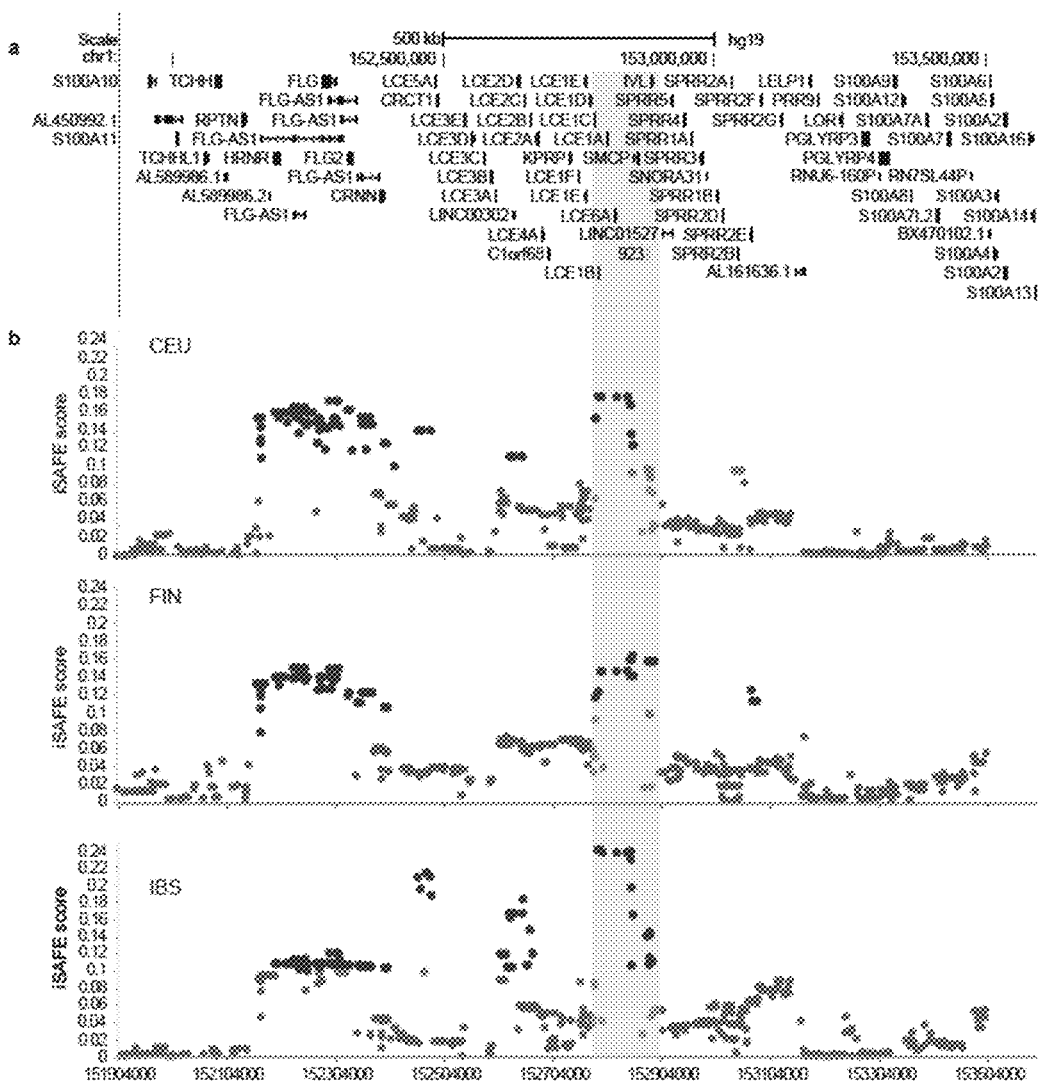
FIG. 5. Positive selection signals in the Epidermal Differentiation Complex in multiple European populations identify human evolution in the skin barrier. Positive selection within the a) EDC (hg19; chr1:151,904,000-153,593,700) was determined by b) SNPs with iSAFE scores>0.10, all shown as red dots. Orange dots indicate SNPs 0.095<iSAFE score<0.10. The gray shaded region indicates the region of shared evidence of positive selection in CEU near LCE1B-IVL. iSAFE scores were calculated for 1 KGP Phase 3 SNPs in CEU, FIN, and IBS.

We sought to validate and refine the positively selected regions identified by CMS using iSAFE. iSAFE incorporates the "shoulders" that are proximal to the region under selective sweep and ranks the signals to further identify the favored mutation. iSAFE scores were calculated for 1000 Genomes Project (1 KGP) Phase 3 SNPs within the EDC in YRI, JPT/CHB, and CEU populations, with evidence of positive selection defined as an iSAFE score greater than 0.1 (empirical $p<1\times10^{-4}$). We found no evidence of positive selection in YRI using iSAFE consistent with the CMS negative findings. However, iSAFE revealed positive selection in JPT/CHB between LCE1F and LCE1B (rs10157301, rs1930127, and rs11804609), but did not replicate the CMS finding for HRNR-FLG (see e.g., FIG. 1c). iSAFE also identified three genomic regions under positive selection in CEU. Signals for the HRNR-CRNN and LCE2D regions were newly discovered (see e.g., FIG. 1c). The HRNR-CRNN signals span multiple genes in the S100-fused family, including HRNR, FLG, FLG2, CRNN, and the noncoding RNA FLG-AS1. More importantly, iSAFE validated the same SMCP region identified by CMS with evidence of a relatively broader region under selection (see e.g., FIG. 1c). The same four CMS SNPs near SMCP were among a cluster of iSAFE signals (13 SNPs) between LCE1B, LCE1A, and LCE6A. To the right of this LCE1B-SMCP region, a shoulder of iSAFE signals (7 SNPs) upstream and within IVL was also newly detected with scores at 0.097. Similar signals were not observed in the shoulders of other positively selected regions, suggesting either a strong hitchhiking effect of this shoulder or perhaps a very recent driver for the positively selected LCE1B-SMCP region. iSAFE signals (0.095) in CEU were also detected near SPRR1B but were isolated indicative of a relatively soft selective sweep. Thus, our iSAFE results reveal additional findings for selective sweeps near LCE1F and LCE1B in JPT/CHB and HRNR-CRNN and LCE2D in CEU. iSAFE provided higher resolution and further validation of CMS signal surrounding the LCE1B-SMCP region and elucidation of the positively selected IVL shouldering region in CEU that we also found to be positively selected in European 1KGP populations, FIN (Finnish in Finland) and IBS (Iberian population in Spain) (see e.g., FIG. 5). Together, both CMS and iSAFE findings identify population-specific signatures of positive selection in the EDC with notable selective sweeps that span the LCE1B-IVL region, highlighting human evolution associated with the skin barrier.

Figure 2:
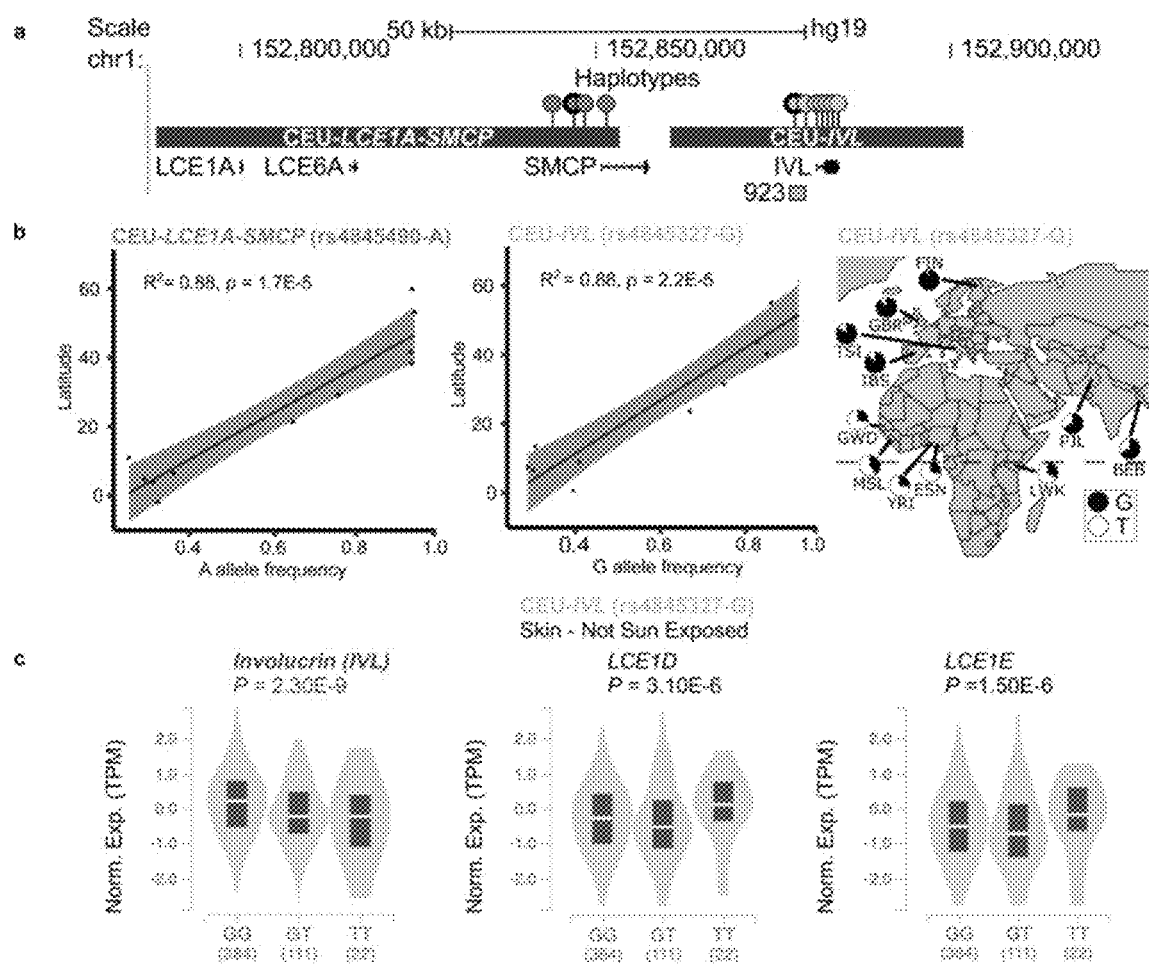
FIG. 2. Selective sweeps for CEU-LCE1A-SMCP and CEU-IVL out-of-Africa. a Phasing reveals CEU-LCE1A-SMCP and CEU-IVL haplotypes (green bars) in CEU based on SNPs in linkage disequilibrium ($r^2$>0.8) with the high CMS/iSAFE (red; rs12022319, rs4845490 [bolded], rs4845491, & rs3737861) and iSAFE (orange; rs4845327 [bolded], rs1854779, rs7539232, rs11205132, rs2229496, rs7535306, & rs7545520) SNPs (lollipops). CEU-IVL includes IVL and the epidermis-specific 923 enhancer, whereas CEU-LCE1A-SMCP includes LCE1A, LCE6A, and SMCP. b) Direct and positive correlations between the frequencies of rs4845490-A & rs4845327-G, and Northern latitudes reveal associations of the CEU-LCE1A-SMCP and CEU-IVL selective sweeps with out-of-Africa migration ($\rho$=1.7E-5 and 2.2E-5), respectively. Black line indicates a linear relationship (Pearson's correlation) between allele frequency and geographic latitude, two-sided t-test (9 degrees of freedom) with gray area surrounding the regression line representing 95% confidence intervals for the group mean values of the latitude for each allele frequency. Pie charts of rs4845327-G allele frequency for each population are indicated on the map. C) Violin plots for rs4845327-G for CEU-IVL, an eQTL for increased IVL and decreased LCE1D and LCE1E expressions shown in not sun-exposed skin (GTEx [V8]). Box in violin plot represents interquartile range with median (white line). Numbers in parenthesis indicate number of individuals for each genotype. Norm. Exp., normalized expression; TPM, transcripts per million. Chi-Square p-value was calculated based on Mahalanobis distance and Bonferroni corrected.
Figure 6:
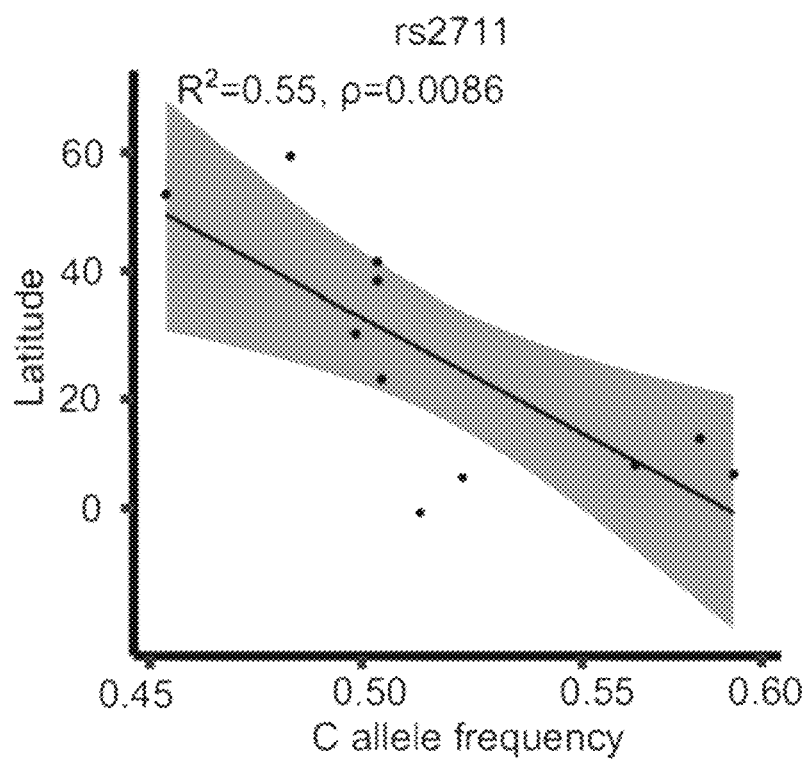
FIG. 6. No correlation between latitude and allele frequency for rs2711-C. The black line indicates a linear relationship (Pearson's correlation) between allele frequency and geographic latitude. Gray area surrounding the regression line represents the 95% confidence intervals for the group mean values of the latitude for each allele frequency. Two-sided t-test (11 degrees of freedom), 95% confidence intervals, p=0.0086.

We next determined the haplotype structure(s) for the positively selected signals found in the LCE1B-SMCP and IVL regions in CEU. The LCE1B-SMCP region is marked by a 65.2 kb haplotype, referred to as CEU-LCE1A-SMCP, whereas the IVL region is marked by 41.2 kb haplotype including the IVL gene, referred to as CEU-IVL (see e.g., FIG. 2a). The same haplotypes were also found in FIN and IBS. As the SNPs found in the CEU-LCE1A-SMCP and CEU-IVL haplotypes are globally distributed, we hypothesized recent selective sweeps for CEU-LCE1A-SMCP and CEU-IVL that correlate with an out-of-Africa migration. To test this hypothesis, we examined the relationships between the allele frequencies for the CEU-LCE1A-SMCP (rs4845490-A) and CEU-IVL (rs4845327-G) haplotypes in a given 1 KGP population to the population's latitude used as a proxy for human migration. We found a direct and positive correlation for the SNP frequency to northern latitude (rs4845490-A, $R^2=0.88$, $\rho=1.7\times10^{-5}$; rs4845327-G, $R^2=0.88$, $\rho=2.2\times10^{-5}$; FIG. 2b) with near-fixation allele frequency (0.96) observed in FIN. These findings are in contrast to a globally common EDC SNP, rs2711, which was not positively correlated ($R^2=0.55$, $\rho=8.6\times10^{-3}$, FIG. 6). Together, these data reveal selective sweeps for the CEU-LCE1A-SMCP and CEU-IVL haplotypes in European populations that are associated with migration out-of-Africa.

CEU-IVL Haplotype is Associated with Increased IVL Gene Expression

Figure 7:
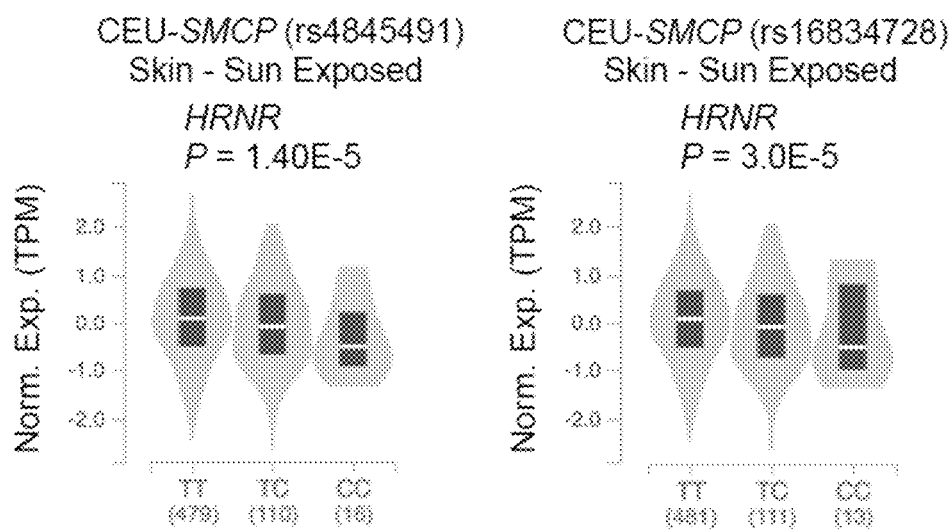
FIG. 7. Association of increased HRNR for CEU-LCE1A-SMCP. Violin plots for rs4845491-T and rs16834728-T in CEU-LCE1A-SMCP, eQTLs for increased HRNR expression in sun exposed skin (GTEx [V8]). Box in violin plot represents interquartile range with median (white line). Numbers in parentheses indicate number of individuals for each genotype. TPM, transcripts per million. Chi-Square p-value was calculated based on Mahalanobis distance and Bonferroni corrected.
Figure 8A:
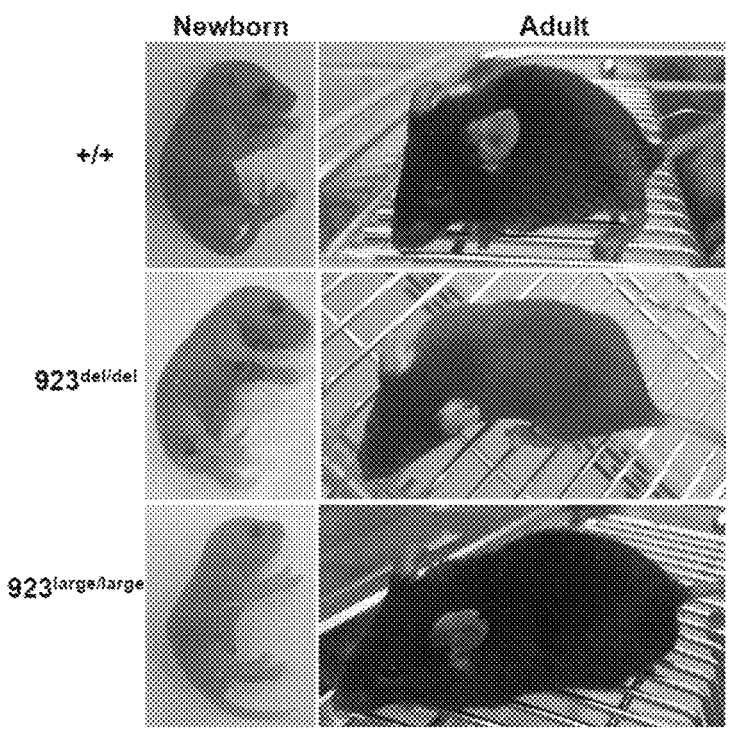
FIG. 8A-FIG. 8E. Both 923 deletion mouse lines exhibit normal morphology under barrier-housed homeostatic conditions. a) Homozygous 923del/del and 923large/large mice are viable and appear normal in barrier-housed conditions at newborn or 8 weeks when compared to aged matched control WT (+/+) mice. b) H&E staining of WT, 923$^{del/del}$, and 923$^{large/large}$ epidermal sections from newborn and 8-week-old (adult) mice appear normal in 3 independent experiments per genotype. Scale bar, 150 μm. c) Normal cornified envelope morphology observed in homozygous 923$^{del/del}$ and 923$^{large/large}$ keratinocytes compared to WT littermates in 3 independent experiments per genotype. Similar quantities of angular and balloon shaped cornified envelopes with smooth edges were isolated from newborn skin of homozygous deletion and wildtype littermates of 923del and 923large mice. Scale bar, 500 μm. d) Normal inside-out skin barrier function in 923 deletion mice. Barrier function was measured by transepidermal water loss (TEWL) (+/+, n=16; 923$^{large/large}$, n=4; 923$^{del/del}$, n=2). Mean+SEM. e) Normal patterning of skin barrier development in 923 deletion mice. The extent of skin barrier formation was assessed by an outside-in X-gal dye penetration assay. Blue stain indicates X-gal reactivity with endogenous β-galactosidase where the X-gal solution has penetrated the epidermis where the skin barrier has not formed.
Figure 8B:
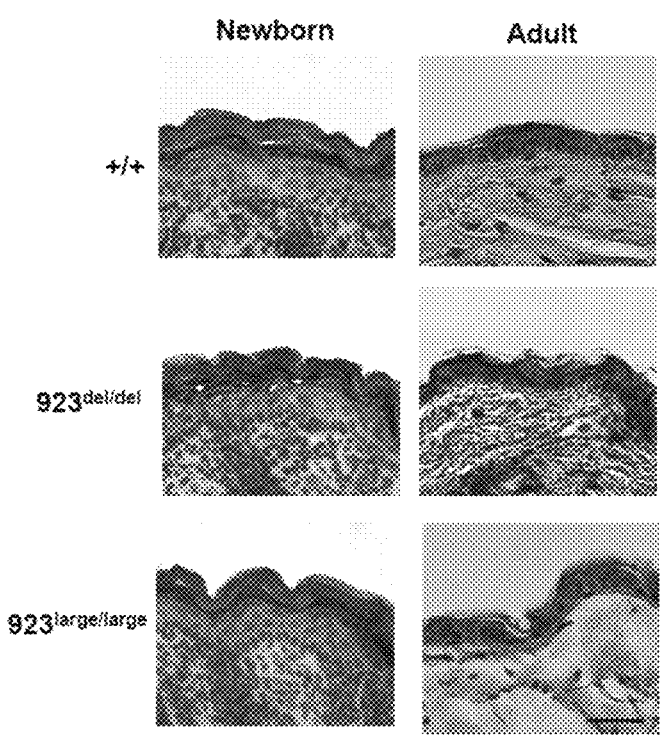
Figure 8C:
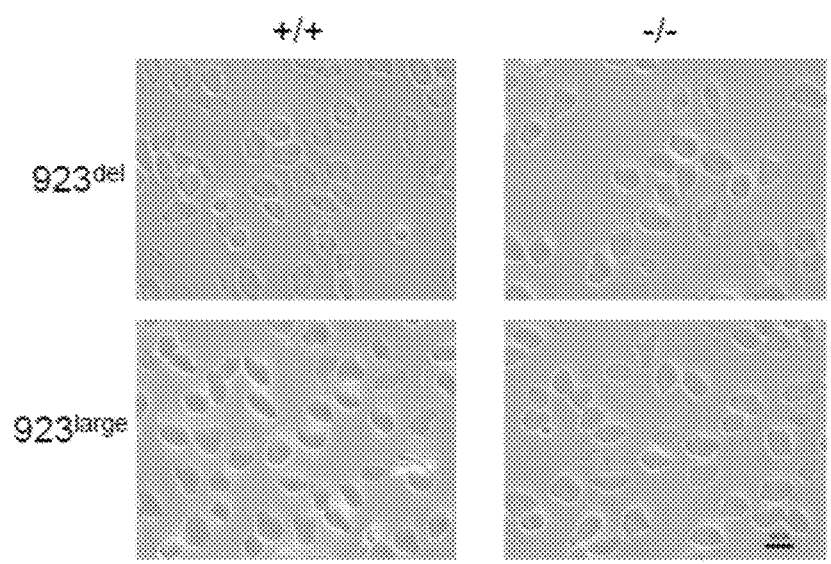
Figure 8D:
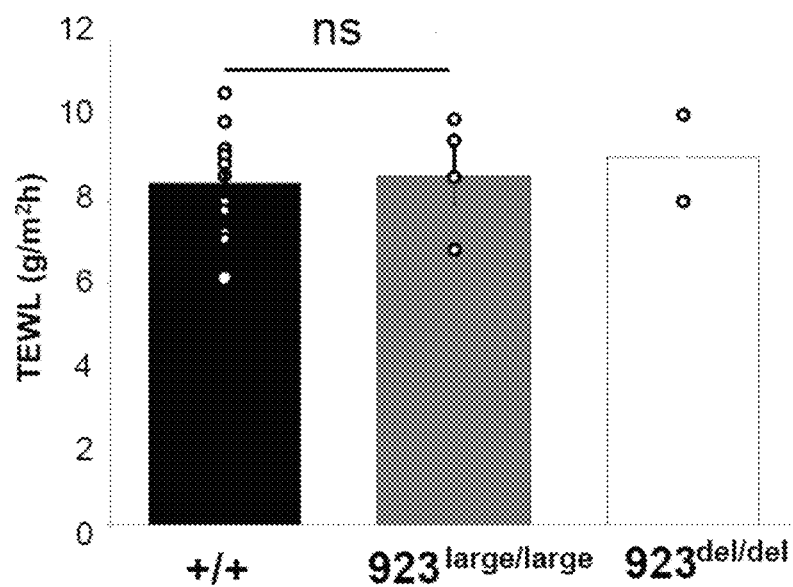
Figure 8E:
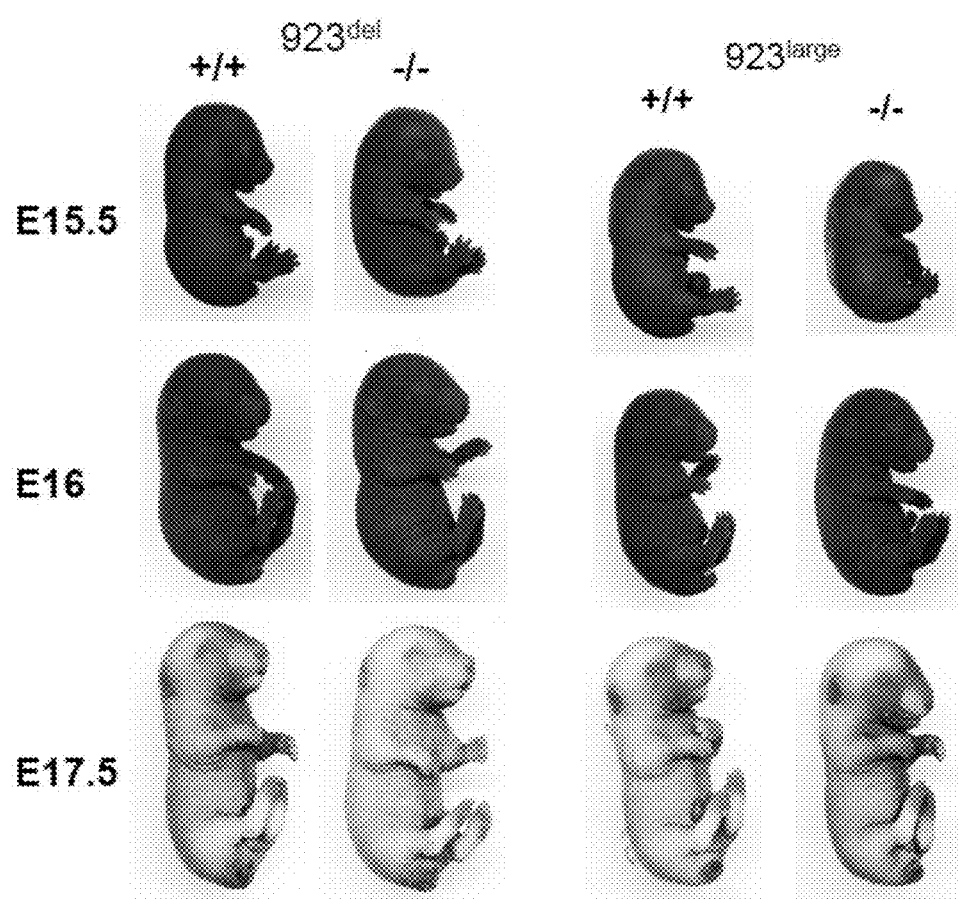

We next determined the functional significance of the CMS/iSAFE SNPs for the positively selected CEU-LCE1A-SMCP and CEU-IVL haplotypes using the Genotype-Tissue Expression (GTEx) project. Of the four CMS/iSAFE SNPs on the CEU-LCE1A-SMCP haplotype, only rs4845491 and rs16834728 were identified as expression quantitative trait loci (eQTLs) that were specific to sun-exposed skin. Their T alleles for CEU-LCE1A-SMCP were associated with increased expression for HRNR, a gene located outside of the haplotype (see e.g., FIG. 7). By contrast, all seven iSAFE SNPs for the CEU-IVL haplotype were annotated as eQTLs associated with increased IVL expression in both sun-exposed and not sun-exposed skin (see e.g., FIG. 2c, representative SNP rs4845327-G shown; and TABLE 1). The SNPs were also eQTLs for decreased expression of LCE1E and LCE1D, genes located outside the CEU-IVL haplotype. The findings for differential IVL expression suggest a role for enhancer regulation with population-specific variation.

Figure 3:
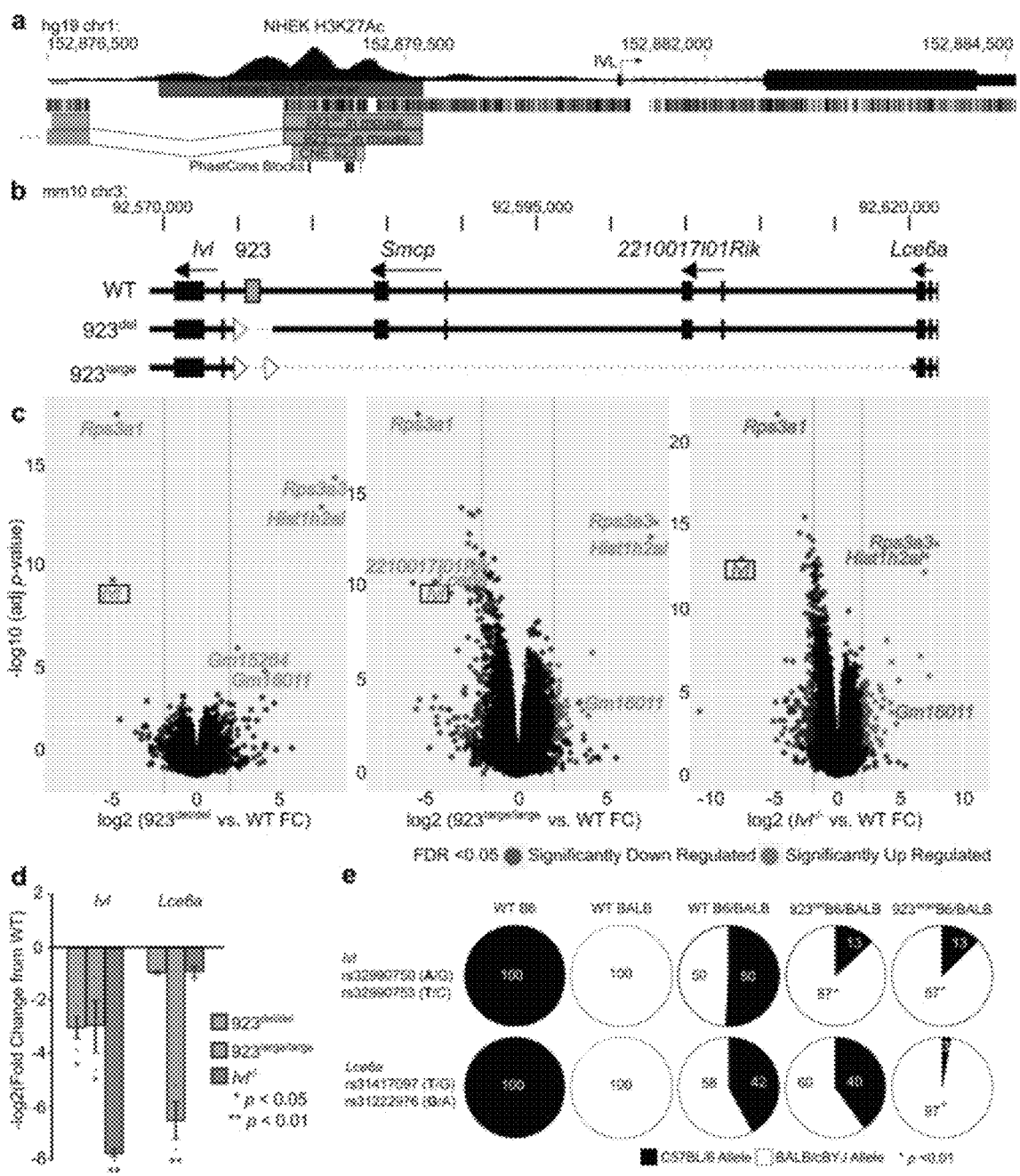
FIG. 3. Deletion of the 923 enhancer in vivo identifies involucrin as a target gene via cis regulation. a) Schematic of the human 923 enhancer (red) as defined by H3K27Ac marks in NHEK (Normal Human Epidermal Keratinocytes); hg19; chr1:152,877,349-152,879,610, the conserved non-coding element (CNE) 923 with PhastCons blocks (gray); hg19; chr1:152,878,419-152,879,075 and the orthologous deleted enhancer sequence (923del; orange) and larger deletion ($923^{large}$; blue) in the mouse with alignments to human as shown. b) Generation of two 923 enhancer deletion alleles by CRISPR/Cas9 genome editing in mice shown as dotted lines, $923^{del}$ (mm10 [Mus musculus]; chr3: 92,575,843-92,577,094): Deletion of mouse orthologous 923 enhancer; $923^{large}$: ~40 kb deletion (mm10; chr3: 90,575,863-92,577,075) that includes 923 enhancer, Smcp, and 2210017/01Rik annotations. Intact flanking loxP sites (triangles) were also successfully introduced via homologous recombination. c) Volcano plots of ribosomal-zero RNA-seq differential gene expression analyses of $923^{del/del}$ (orange text), $923^{large/large}$ (light blue text), and $lvl^{-/-}$ (purple text) newborn mouse skins each compared to wild-type (WT) reveal significant decreased expressions for lvl. n=3/genotype. FC, fold change. Statistical analysis using Limma's generalized linear model moderated two-sided t-tests with 22 degrees of freedom and Benjamini-Hochberg false discovery rate (FDR) corrections. Significant data points with FDR≤0.05 in blue are log 2 fold down-regulated≤-2 and red are up-regulated≥2. d Confirmatory qPCR validation for decreased lvl expression for $923^{del/del}$ (p=0.030), $923^{large/large}$ (p=0.034), and $lvl^{-/-}$ (p=0.001), and additional decreased Lce6a expression specific to $923^{large/large}$ newborn mouse skins (p=0.001) all compared to WT mice; n=3/genotype; Error bars±SEM. One-way ANOVA followed by Tukey's HSD displayed. e Proportions of allele-specific (SNP) lvl and Lce6a expression shown in pie charts for each mouse strain. Two SNPs per allele were measured and showed identical allele frequencies. B6 SNP bolded, *p<0.01, one-way ANOVA compared to WT B6/BALB mice.

We previously identified and characterized a strong epidermis-specific enhancer located upstream of IVL (see e.g., FIG. 2a and FIG. 3a). This enhancer, termed "923" is located 923 kb from the most centromeric EDC gene S100A10 and is associated with the dynamic chromatin remodeling of the EDC and cJun/AP1 binding concomitant with EDC gene expression. The CEU-IVL haplotype contains the 923 enhancer and IVL. This led us to hypothesize that the 923 enhancer modulates IVL expression associated with positive selection.

Figure 9:
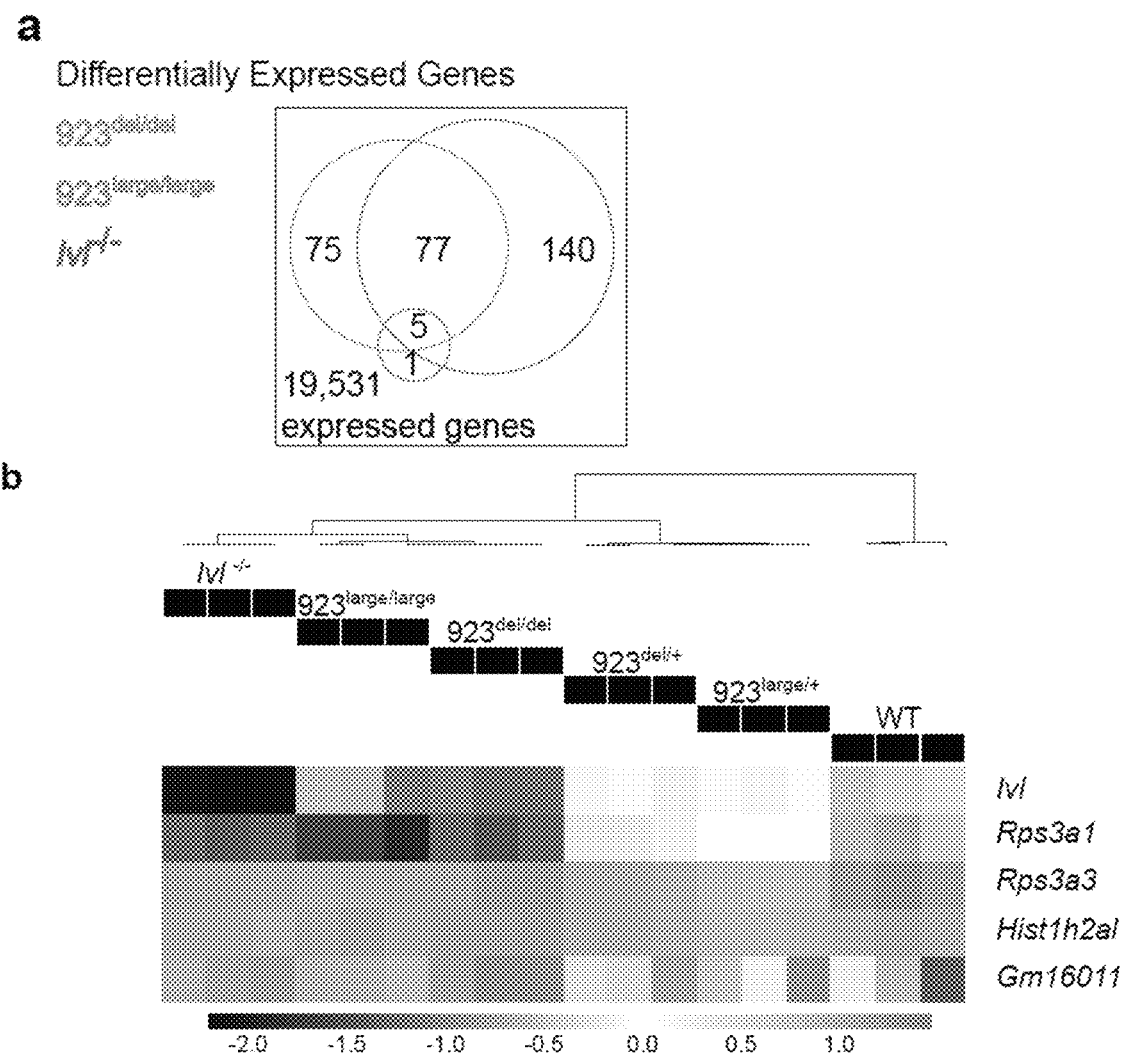
FIG. 9. RNA-seq comparison of differentially expressed genes in 923$^{del/del}$ 923$^{large/large}$ and lvl$^{-/-}$ mice. a) Venn diagram of differentially expressed genes between 923$^{del/del}$, 923$^{large/large}$ and lvl$^{-/-}$ compared to WT, respectively (FDR |2|). b) Heatmap of 5 differentially expressed genes in 923$^{del/del}$, 923$^{large/large}$ and lvl$^{-/-}$ mice skin RNA-seq compared to WT (n=3/genotype).

Deletion of the 923 Enhancer in Mice Results in Decreased Expression of the Proximal Gene Involucrin in the Epidermis To determine the function of the 923 enhancer, we generated knockout mice for the orthologous 923 enhancer using CRISPR/Cas9 genome editing (see e.g., FIG. 3a). Our strategy aimed to delete the conserved noncoding element 923 with known epidermis-specific regulatory activity and epigenetically marked by H3K27ac histone acetylation observed in ENCODE human keratinocytes. We targeted a larger 923 enhancer region given the H3K27ac epigenetic mark. Two independent deletions were successfully generated, resulting in a specific deletion of the 923 enhancer ($923^{del}$) and a large 40 kb deletion that included the 923 enhancer and proximal genes Smcp and 2210017101Rik ($923^{large}$) (see e.g., FIG. 3a, FIG. 3b). At birth, $923^{del}$ and $923^{large}$ C57BL/6 (B6) knockout mice were viable and did not deviate from the expected genotype ratios for both heterozygous parental crosses ($X^2$ test, α=0.05) (TABLE 2). We also observed no morphological differences or defects in barrier function under homeostatic conditions (see e.g., FIG. 8A-FIG. 8E). We next examined the molecular impact of the 923 enhancer deletion on the skin transcriptome. RNA-seq on $923^{del}$ and $923^{large}$ homozygous, heterozygous, and wild-type (WT) newborn skins was performed (TABLE 3 and TABLE 4). Given the close proximity of the 923 enhancer to involucrin (lvl), we included the lvl B6 knockout mouse in our analyses to distinguish the direct effect of the loss of the enhancer from the hypothesized loss of lvl. Analysis of the skin transcriptomes identified 6 significantly differentially expressed genes (DEGs) in $923^{del/del}$ skins, in contrast to 157 and 222 genes in $923^{large/large}$ and lvl$^{-/-}$ skins, respectively (FDR<0.05, log 2(FC)≥|2|; FC, fold change) (see e.g., FIG. 3c, FIG. 9a). Strikingly, 5 of the 6 DEGs in $923^{del/del}$ (Rps3a3, Hist1h2a1, Gm16011, Rsp3a1, and lvl) were also differentially expressed in the same directions in $923^{large/large}$ skins (see e.g., FIG. 3c and FIG. 9b). Gm15264 was only differentially expressed in $923^{del/del}$ mice. As Rps3a1, Rps3a3, Hist1h2a1, and Gm16011 were also differentially expressed in the same directions in lvl$^{-/-}$ skins, their observed differential expression in the 923 deletion lines are likely secondary effects associated with decreased lvl expression in the two enhancer deletion skins. Together, our in vivo results identify a functional role for the 923 enhancer in the regulation of lvl target gene expression.

Figure 10:
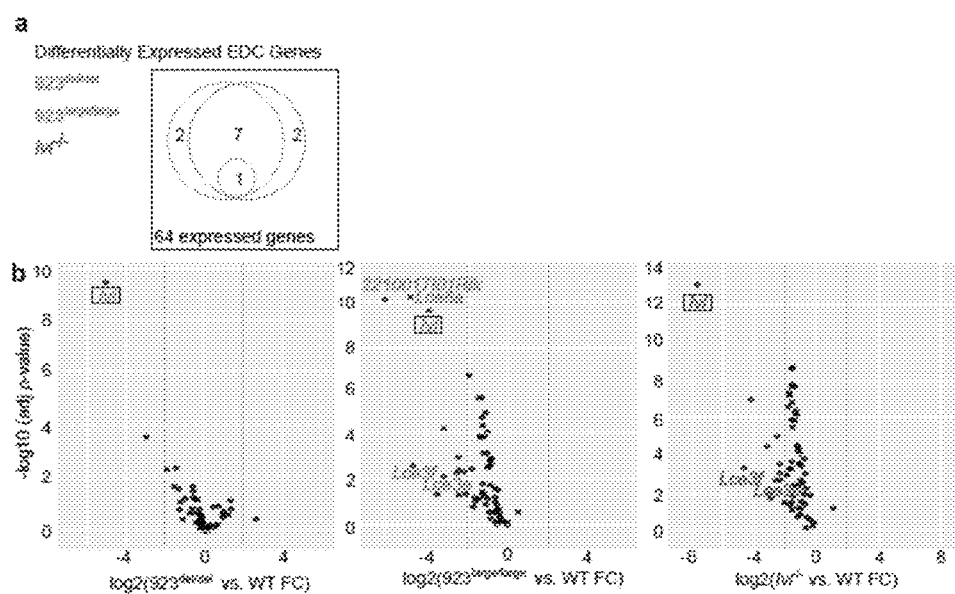
FIG. 10. RNA-seq comparison of differentially expressed genes in the EDC in 923$^{del/del}$, 923$^{large/large}$ and lvl$^{-/-}$ mice. a) Venn diagram of differentially expressed EDC genes (FDR |2|) and b) volcano plots of EDC subset from differential gene expression analyses in 923$^{del/del}$, 923$^{large/large}$ and lvl$^{-/-}$ newborn mouse skin each compared to WT (n=3/genotype). Statistical analysis was done via Limma's generalized linear model moderated two-sided t-tests with 22 degrees of freedom and BenjaminiHochberg false discovery rate (FDR) corrections.

The effect of the enhancer deletion on the expression of its most proximal gene, lvl, motivated us to further examine local transcriptional effects with respect to only the EDC. RNA-seq analyses of the EDC loci identified one DEG (lvl) in $923^{del/del}$, 10 in $923^{large/large}$ and 10 in lvl$^{-/-}$ skin (see e.g., FIG. 10) (FDR<0.05, log 2(FC)≥|2|). Smcp, the most proximal gene 3' of 923 (see e.g., FIG. 3b), was below our detection limits for this assay, consistent with the low numbers of transcripts detected in whole-skin scRNA-seq. We validated the significance of decreased lvl expression in all 3 mouse lines compared to WT via qPCR (ANOVA; Tukey post hoc, p<0.05) (see e.g., FIG. 3d). By contrast, $923^{large/large}$ mouse skins also exhibited significantly decreased expression of Lce6a, the most proximal gene 3' of the deletion, which was not observed in the other 2 mouse lines. This suggests the presence of an additional as yet uncharacterized enhancer region for Lce6a that was also deleted in the 9231ar9e allele.

Figure 11:
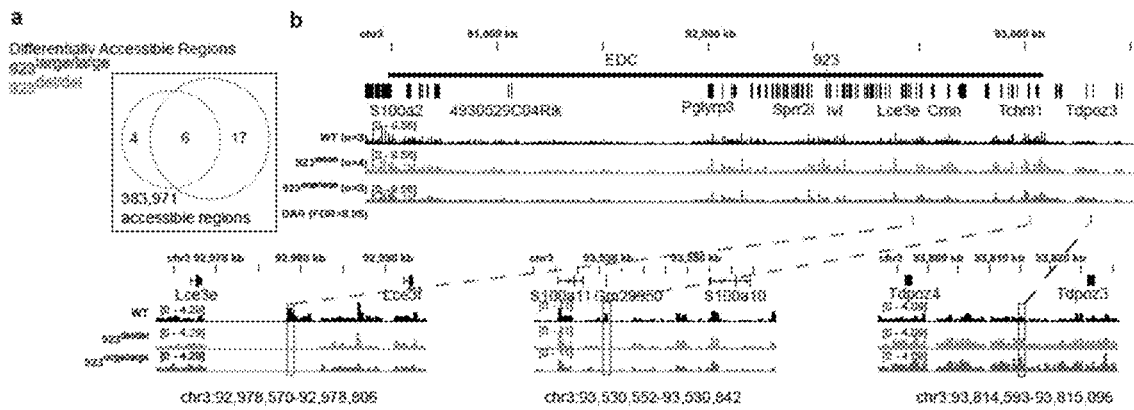
FIG. 11. Chromatin accessibility is altered in and around the EDC in 923$^{del/del}$ and 923$^{large/large}$ newborn epidermis. a) Venn diagram (FDR<0.05) of all differentially accessible regions (DARs) using comparative ATAC-seq in 923$^{del/del}$ and 923$^{large/large}$ newborn epidermis that were each compared to WT with b) an enrichment of shared DARs in the EDC. Peaks shown as fold change signal per genotype (WT, n=3; 923$^{del/del}$, n=4; 923large/large, n=3) with shared less accessible (red) and more accessible (blue) DARs indicated in the 923 deletion lines compared to WT.

Deletion of 923 enhancer affects the chromatin landscape in the EDC We next sought to determine the effect of the 923 enhancer deletion on the EDC chromatin landscape using ATAC-seq (assay for transposase accessible chromatin using sequencing). Six differentially accessible regions (DARs) were found in both $923^{del/del}$ and $923^{large/large}$ keratinocytes compared to WT. Interestingly, three of these shared DARs were within or near (<250 kb) the EDC with two less-accessible DARs and one more-accessible DAR found in both $923^{del/del}$ and $923^{large/large}$ keratinocytes (see e.g., FIG. 11 and TABLE 5 and TABLE 6) (FDR<0.05, log 2(FC)≥|2|). Although none of the shared DARs correspond to differential changes in gene expression as determined by RNA-seq, our findings demonstrate an effect for the loss of the 923 enhancer on opening local EDC chromatin accessibility in newborn keratinocytes. Together, both enhancer deletion lines demonstrate a requirement for the enhancer to positively regulate lvl, and additionally for the $923^{large}$ allele for Lce6a expression, and facilitate local chromatin accessibility.

923 Enhancer Regulates Lvl Target Gene Expression in an Allele-Specific (Cis) Manner We next determined if the 923 enhancer regulates gene expression in cis. To do this, we performed allele-specific gene expression assays for lvl and Lce6a in hybrid mouse skin. Allele-specific lvl and Lce6a transcripts were distinguished using two informative SNPs for either B6 or BALB/cBYJ (or BALB) allele in hybrid B6; BALB mouse tissue. Targeted sequencing of lvl cDNA from $923^{del}$ B6/BALB and $923^{large}$B6/BALB hybrid mouse skin revealed a significantly lower proportion of B6 transcripts from the $923^{del}$ and $923^{large}$ alleles (13%) compared to the proportion of B6 transcripts from the WT allele observed in hybrid control B6/BALB mice (50%) (see e.g., FIG. 3e) (ANOVA, Tukey post hoc, p<0.01). Moreover, a significantly lower proportion of Lce6a B6 transcripts (3%) was observed in $923^{large}$B6/BALB hybrid skin compared to 42% and 40% observed in the hybrid control B6/BALB and the $923^{del}$B6/BALB skin, respectively (ANOVA, Tukey post hoc, p<0.01). This further supports the hypothesis for the loss of an additional regulatory enhancer in the $923^{large}$ allele to regulate allele-specific Lce6a expression. Together, our genetic findings identify cis regulation by the 923 enhancer for lvl, thus establishing a 923 enhancer:lvl regulatory module for the epidermis.

Figure 4:
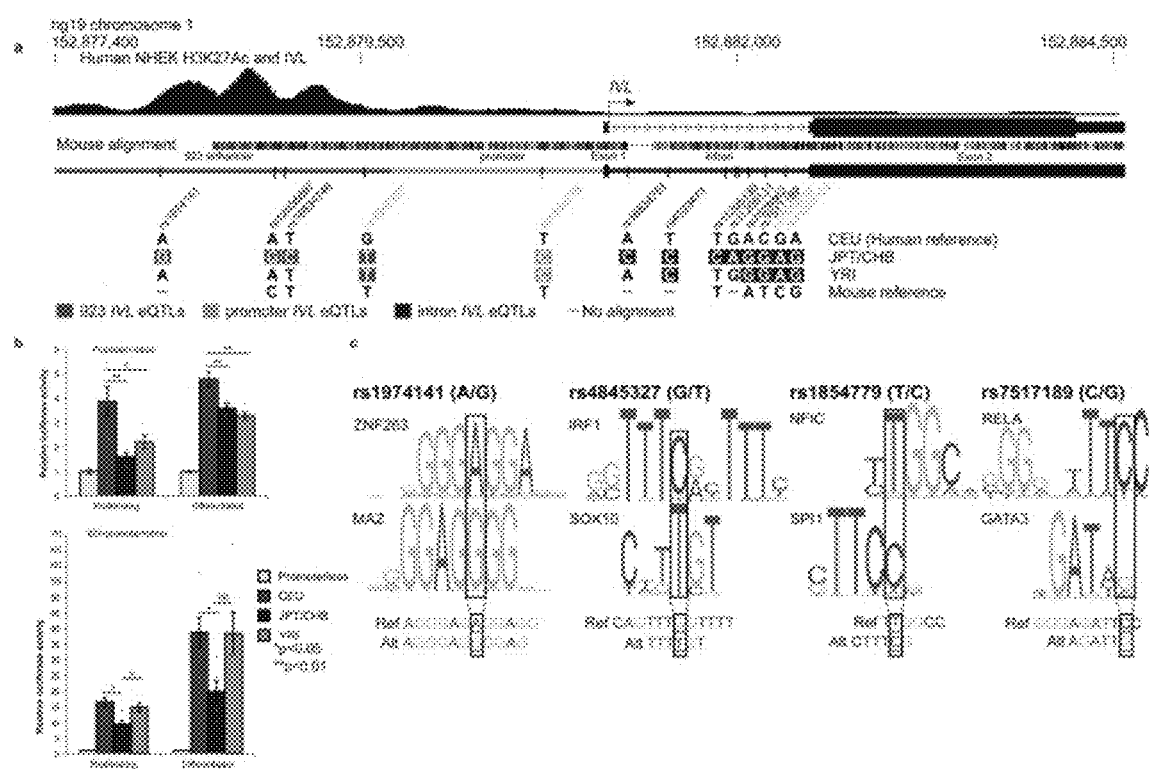
FIG. 4. Population-specific 923 enhancer: IVL promoter/intron alleles and eQTLs impact regulatory activity. a) Schematic of population-specific human 923 enhancer (red), IVL promoter (light blue), 1st exon, and intron (dark blue) alleles with IVL eQTLs. Positions of variants not to scale. Colored boxed variants are associated with relatively lower IVL expression levels to human reference. Positively selected iSAFE SNPs for CEU in orange. b) Luciferase assays of population-specific alleles for the IVL promoter/intron+respective enhancer reveals that the CEU promoter/intron allele has the highest regulatory activity (Proliferating: p=0.003 vs. JPT/CHB; p=0.025 vs. YRI; Differentiated: p=0.008 vs. JPT/CHB; p=0.001 vs. YRI). The addition of the enhancer confers higher reporter expression with more activity in CEU (p=0.003) and YRI (p=0.024) than JPT/CHB and especially in differentiated cells for CEU vs. JPT/CHB (p=0.047). Mean±SEM of n independent experiments (n=3, IVL promoter/intron) and (n=4, 923 enhancer+IVL promoter/intron), one-way ANOVA followed by Tukey's HSD. c) Position weight matrices (PWM) for candidate transcription factor binding motifs in reference and alternate alleles at rs1974141, rs4845327, rs1854779, & rs7517189 associated with population-specific regulatory activity. Strand sequence with SNP included for comparison to PWM.
Figure 12:
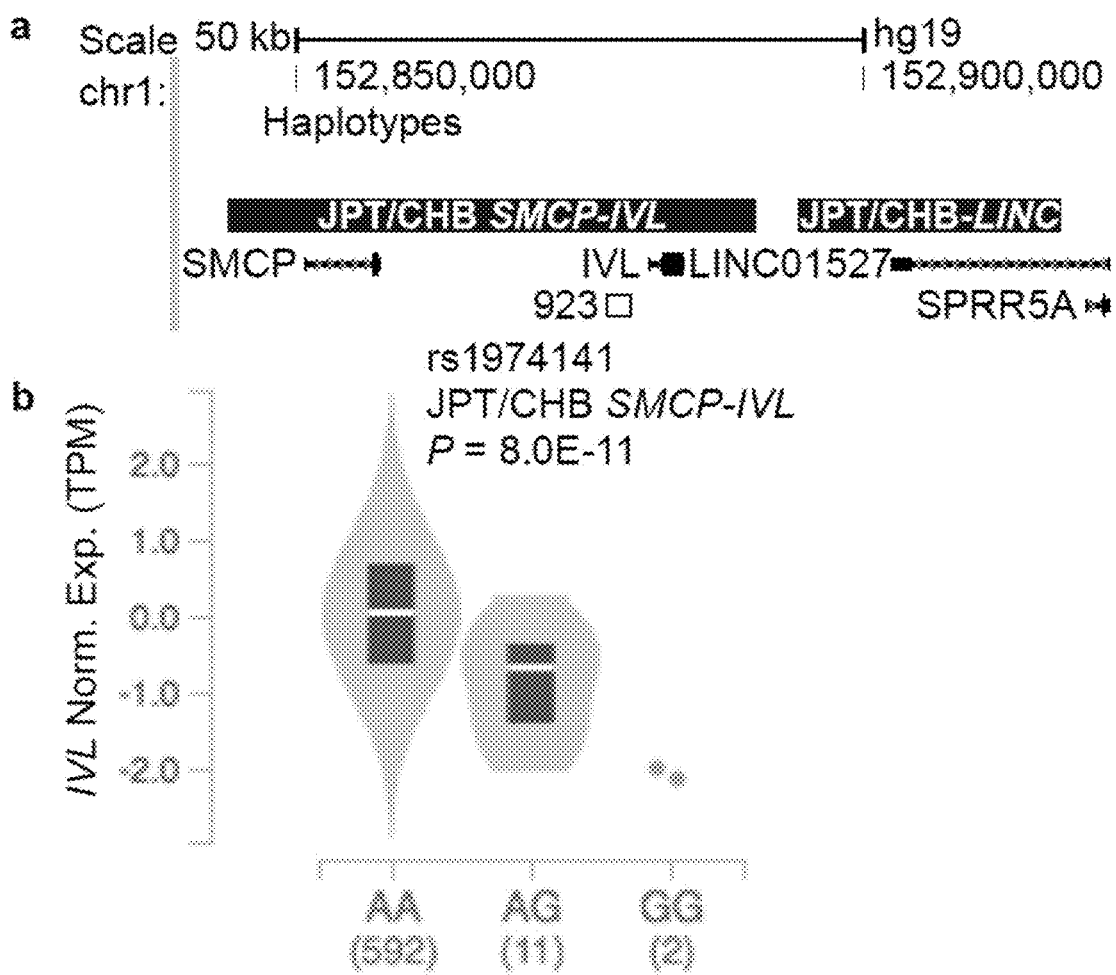
FIG. 12. JPT/CHB-SMCP-IVL is associated with relatively decreased IVL expression. a) Phasing reveals JPT/CHB- SMCP-IVL haplotype (blue bar) based on SNPs in linkage disequilibrium (r$^2$>0.8) with rs6668295. b) Violin plots for rs1974141-G in JPT/CHB- SMCP-IVL, eQTL for decreased IVL expression in sun exposed skin (GTEx [V8]). Box in violin plot represents interquartile range with median (white line). Numbers in parentheses indicate number of individuals for each genotype. TPM, transcripts per million. Chi-Square p-value was calculated based on Mahalanobis distance and Bonferroni corrected.

The Human 923 Sequence Enhances Expression from the IVL Promoter with Both Elements Exhibiting Population-Specific Regulatory Activities We next translated this new functional knowledge of the 923 enhancer:lvl regulatory module found in mice to determine the genomic sequences and variants that drive increased IVL expression in the positively selected CEU-IVL human haplotype. Enhancer rs4845327, promoter rs1854779, and intronic rs7539232 and rs11205132 were identified as positively selected signals by iSAFE and are IVL eQTL alleles specific to CEU-IVL (see e.g., FIG. 4a and TABLE 1). We hypothesized increased regulatory activity within the promoter and enhancer for CEU-IVL in comparison to common JPT/CHB and YRI haplotypes. We performed luciferase assays to assess regulatory activities for population-specific IVL promoters with and without the enhancer for CEU-, JPT/CHB-, and YRI-IVL. Clones for IVL promoter alleles included the first noncoding exon and intron of known collective regulatory activity. The CEU-IVL promoter/intron allele exhibited significantly higher luciferase activity than the JPT/CHB and YRI alleles in both proliferating and differentiated keratinocyte cell culturing conditions (Proliferating: CEU vs. JPT/CHB p=0.003, CEU vs. YRI p=0.025; Differentiated: CEU vs. JPT/CHB p=0.008, CEU vs. YRI p=0.001), consistent with the GTEx annotated SNPs for increased IVL expression (see e.g., FIG. 4b and FIG. 2c). The addition of the respective population-specific 923 enhancer resulted in a further increase in luciferase reporter activities for all tested alleles compared to the promoter/intron only, and higher in differentiated cells where IVL is endogenously expressed in skin tissue (see e.g., FIG. 4b). However, decreased luciferase activity for the cloned JPT/CHB enhancer/promoter/intron allele was observed in comparisons to CEU and YRI alleles (Proliferating: CEU-JPT/CHB, p=0.003; YRI-JPT/CHB, p=0.024; Differentiated: CEU-JPT/CHB, p=0.047; YRI-JPT/CHB, p=0.051) (see e.g., FIG. 4b). The JPT/CHB allele is associated with relatively decreased IVL expression as shown in GTEx (see e.g., FIG. 12 and TABLE 7). Together, our results identify increased regulatory activity for the IVL promoter/intron allele with an additive effect by the enhancer for the positively selected CEU-IVL haplotype.

Figure 13:
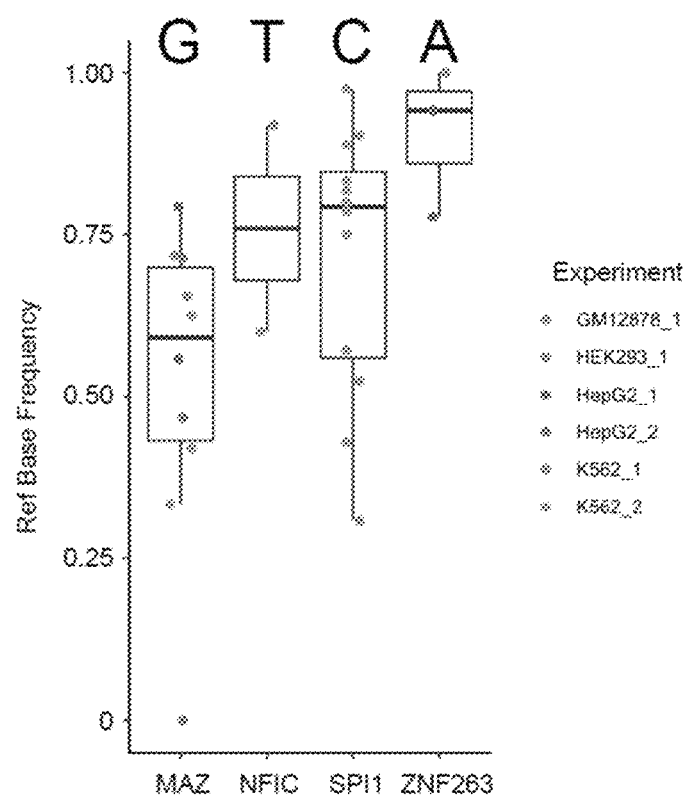
FIG. 13. Preferential binding in vivo for transcription factor at predicted allele. MAZ (G), NFIC (T), and SPI1 (C), and ZNF263 (A) at polymorphic sites for ENCODE ChIP-seq datasets. Center line, median; box limits, upper and lower quartiles; whiskers, 1.5× interquartile range or largest or smallest point. The following independent cell experiments were used for each transcription factor: MAZ (n=9), NFIC (n=2), SPI1 (n=12), and ZNF263 (n=3).

We next sought to determine differential transcription factor binding for the reference and alternate SNP alleles that underlie the observed regulatory activities for the population-specific IVL alleles (TABLE 8). Using multiple transcription factor motif analyses, we identified four SNPs that were predicted to impact differential binding by keratinocyte-specific transcription factors. The SNPs included the two positively selected iSAFE SNPs, IVL enhancer (rs4845327) and the IVL promoter (rs1854779), as well as two additional SNPs in the IVL enhancer (rs1974141) and first intron (rs7517189) (see e.g., FIG. 4c). ZNF263 is predicted to bind to CEU 923 enhancer rs1974141-A in contrast to MAZ binding to the alternate rs1974141-G (JPT/CHB), suggesting either higher activation by ZNF263 or loss of a MAZ-mediated repressive effect for the relative increased IVL expression and enhancer activity observed in the CEU cloned allele. IRF1 is predicted to bind to the positively selected enhancer SNP, rs4845327-G, and negatively affect SOX10 binding for the alternate T allele, whereas NFIC is predicted to bind to the positively selected promoter SNP, rs1854779-T, in contrast to SPI1 for the alternate rs1854779-C allele. RELA is predicted to bind to intronic rs7517189-C compared to GATA3 for the G allele. Using publicly available ENCODE ChIP-seq datasets, we demonstrated preferential binding in vivo for ZNF263 (A), MAZ (G), NFIC (T), and SPI1 (C) to the predicted alleles with polymorphic sites (see e.g., FIG. 13 and TABLE 9). These findings for allele-specific, transcription factor binding at several loci in different cell types are consistent with the following allele-specific findings that we observe for the positively selected CEU-IVL haplotype: (1) increased IVL expression, (2) increased regulatory activities for the enhancer and promoter, and (3) preferential ZNF263 and IRF1 predicted binding to rs1974141-A and rs4845327-G in the enhancer and NFIC binding to rs1854779-in the promoter. In summary, we identify positive selection for a cis-regulatory module for increased IVL that underwent a selective sweep out-of-Africa and highlights human skin barrier adaptation.

DISCUSSION

Our work thus far has identified recent skin barrier evolution in modern human populations, having discovered several population-specific signals of positive selection within the EDC and selection for two neighboring haplotypes, LCE1A-SMCP and IVL in CEU. The association of the CEU-IVL haplotype with relatively increased IVL gene expression and the overlap to the known epidermis-specific enhancer 923 led us to examine a functional role for the 923 enhancer to regulate lvl expression in vivo. Deletion of the orthologous mouse 923 enhancer via CRISPR/Cas9 genome editing identified lvl as the primary target gene of 923 with regulation in cis, thus establishing a 923 enhancer-lvl gene regulatory module. The functional significance of this genetic module in humans was further revealed with our discoveries of population-specific 923 enhancers that "boosted" regulatory activity. Together, we establish the significance of a paradigmatic regulatory module for a cis-regulatory enhancer/target gene in human evolution.

Our understanding of the molecular mechanisms that drive enhancer activity and the comprehensive genomic elucidation of putative enhancers for a vast array of tissue types, as well as single cells, has exponentially grown since the inception of the "enhancer" concept in 1981. Yet, we are challenged to embark on more rigorous investigations to functionally validate enhancers and correctly assign their predicted target genes. Even more challenging is the growing body of recent reports demonstrating a lack of phenotypes for enhancer deletions, even for putative developmental enhancers, suggesting enhancer redundancy consistent with the ENCODE findings of 2-3 enhancers per target gene. As lvl expression was not completely lost in our enhancer knockout mice, there is likely redundancy in regulation of lvl yet we have firmly established the 923 enhancer as a prominent proximal enhancer. In keratinocytes, 5C studies identified physical interactions between the lvl promoter and enhancers located in the first topologically associated domain (TAD) of the EDC, presenting additional putative regulators. Our discovery for the 923 enhancer to regulate lvl expression was premised on extensive previous analyses of the 923 enhancer, where we identified its sequence conservation across mammalian phylogeny, DNaseI hypersensitivity in primary keratinocytes, regulatory activity observed in reporter assays, tissue-specific (epidermis) activity using transgenic mice, and physical chromatin looping contacts determined by chromatin conformation capture studies. Such studies provide a framework to prioritize such ongoing and future enhancer in vivo deletion studies. Furthermore, our CRISPR/Cas9 methodology led to the serendipitous generation of a larger deletion ($923^{large}$) which displayed decreased Lce6a expression that generates the hypothesis for additional enhancers that were deleted in the $923^{large}$ allele.

Interestingly, the backbone of the CEU-IVL haplotype appears to have emerged in Africa and rose to near-fixation frequency in CEU and other European populations. This selective sweep for CEU-IVL is associated with increased IVL expression, which we tied to the promoter/intron variants with an additive effect upon the inclusion of the enhancer allele. The effects were further predicted to impact preferential transcription factor binding for ZNF263, IRF1, and NFIC in contrast to MAZ, SOX10, and SPI1 binding in the alternative alleles for rs1974141 and rs4845327 enhancer, and rs1854779 promoter SNPs, and for which preferential binding for these TFs (transcription factors) at single polymorphic sites have been observed in ENCODE ChIP-seq data. Future experiments are needed to isolate and further determine the functional effects of each SNP on IVL expression and even on other cell types. In fact, rs1854779 was recently determined to be associated with white blood cell count and was discovered by including diverse human populations to comprehensively determine phenotypic traits. This, together with our human evolutionary findings, generates a hypothesis for a human skin diversity SNP to rapidly evolve and modulate the functional interface of the skin and immune systems.

Our discovery of enhancer variation for human skin barrier function further contributes to a growing body of research that highlights selective events in human history targeted at enhancers, such as lactase persistence and immune function. Furthermore, our finding for enhancer evolution further supports genetic innovation for human skin evolution that until now has been reported for only a few genes in the EDC, including IVL. IVL has undergone extensive evolution in primates, with recent and continuing expansion of the number of repeats in human IVL. However, targeted deletion of the lvl gene in mice revealed no overt phenotype in barrier-housed conditions, similar to our $923^{del/del}$ and $923^{large/large}$ homozygous mice (see e.g., FIG. 8A-FIG. 8E). Together, this supports a tolerance for decreased, and even lack of, lvl in barrier-housed conditions, consistent with human population-specific selection for differential IVL expression that warrants further investigation. The findings for a selective sweep for increased IVL observed in European populations that live in Northern latitudes suggests a possible link between cutaneous vitamin D production and IVL expression as a mechanism of environmental adaptation for the skin barrier. Vitamin D is known to stimulate the differentiation of keratinocytes and promote the expression of IVL, it is possible that high rates of vitamin D deficiency in modern populations could contribute to reduced skin barrier integrity and, subsequently, disease states including asthma.

Selective sweeps for haplotypes, CEU-LCE1A-SMCP with increased HRNR and CEU-IVL with increased IVL expressions, suggest a benefit for higher protein dosage for the evolving skin barrier. This notion is supported by (1) the absence of common deleterious (albeit truncating) variants in strong linkage within these haplotypes and (2) the highly repetitive nature of HRNR and IVL that lengthens the protein structures observed across mammalian and primate phylogenies and anticipated trajectories in humans. The functional benefits for increased HRNR and IVL have yet to be functionally determined, yet it can be speculated that protein dosage modulation provides an innovative strategy to calibrate skin barrier function, i.e., permeability, to the environment. Indeed, weakened epidermal barrier function is a hallmark of atopic dermatitis, a common inflammatory disease, owing to the discovery for >100 loss-of-function variants for the highly repetitive FLG gene that are population-specific, and an increase in prevalence worldwide.

In summary, our results highlight the significance of genetic variation attributed to differential gene expression in a population-specific manner and heighten our awareness for human population-specific evolution of the epidermis. Furthermore, our work provides a framework with which we can examine genetic variation in enhancer:target gene modules for recent adaptive traits.

Materials and Methods

CMS and iSAFE Analyses

CMS scores for all SNPs in the EDC (hgl8; chr1:150, 198,268-151,892,013) in CEU, YRI, and JPT/CHB populations (n=90 individuals per population) were downloaded (https://www.broadinstitute.org/cms/results; download date Aug. 17, 2015). p-values were calculated for the genome-normalized CMS scores using pnorm in R. Benjamini-Hochberg FDR was calculated for each population using the p.adjust function, method="BH" in the fdrtool package in R. iSAFE (https://github.com/alek0991/iSAFE) was used to identify positive selection in 1 KGP Phase 3 phased data (http://ftp.1000genomes.ebi.ac.uk/vol1/ftp/release/20130502) (hg19; chr1:151,896,000-153,612,000). Sample cases were defined as all subjects belonging to the population of interest (CEU, FIN, IBS, YRI or JPT, and CHB) and sample controls defined as subjects belonging to all other superpopulations. All other arguments were run using default settings.

Haplotype Block Construction and LD Analysis

Haplotypes were identified using LDLink (https://ldlink.nci.nih.gov) by querying the LDproxy module for the SNP with the highest CMS score in the relevant population(s). Haplotypes were defined as the set of proxy variants with $r^2 \geq 0.8$. Pairwise and small-scale analyses of LD were performed using the LDpair module, again defining LD as $R^2 > 0.8$.

Global Allele Frequency and eQTL Analysis

Allele frequencies of EDC SNPs from the twenty-six 1 KGP populations were obtained from Ensembl v. 81. Geographical latitude for each population was determined by the latitude of the city from which 1 KGP, ACPOP (Northern Sweden), Genome of the Netherlands release 5, Genetic variation in the Estonian population, and the Danish reference pan genome population data for tagging SNP rs4845327 were collected. The relationship between latitudes and allele frequencies was analyzed using linear regression using the lm function in R. The direction and strength of the correlation between allele frequency and latitude was determined using Pearson's correlation coefficient (ρ) using the cor function in R. Geographic plots for the global distribution of allele frequency was generated using ggplot2 in R. SNPs were queried as eQTLs in sun-exposed or not sun-exposed skins using GTEx portal (http://www.gtexportal.org, V8 release).

Generation of 923 Enhancer Knockout Alleles in Mice by CRISPR/Cas9 Genome Editing Deletion of the 923 enhancer was targeted using two small guide RNAs to facilitate Cas9-mediated double-stranded breaks on either side of the orthologous mouse 923 enhancer sequence. LoxP insertions at these flanking sgRNA-targeted sites were generated using two single-stranded oligodeoxynucleotides (ssODNs), containing loxP sites with specific 80 bp homology arms on either side of loxP and restriction enzyme sites (Sphl for 5' end, Hindlll at 3' end), which were simultaneously introduced via site-directed homologous recombination (Integrated DNA Technologies, Coralville, IA). Sequences of sgRNAs, ssODNs, and mouse alleles are listed in (TABLE 10). Three rounds of injection in 779 zygotes were performed having confirmed target specificity using in vitro pilot studies prior to zygote injection. Founders were initially screened for large deletions via PCR using flanking primers designed outside the homology arms and 5' and 3' loxP-specific primers that were resolved on 1% agarose gel electrophoresis. Of the 779 C57BL6/6XCBA hybrid zygotes injected, 80 $F_0$ newborns were recovered, of which 75 survived to weaning age. Seven out of 80 mice whose 923 allele size deviated from the WT allele were identified via PCR (8.75% targeting efficiency) with further analysis by Sanger sequencing. Two 923 enhancer knockout alleles were confirmed. The $923^{del}$ allele contains an ~1250 bp deletion of the 923 enhancer and the 5' loxP site. The $923^{large}$ allele includes the 923 deletion flanked by both 5' and 3' loxP sites and a 40 kb deletion between proximal genes Lce6a and 923, including the genes Smcp and 2210017/01Rik. All mice were group-housed in cages with bedding and nesting material in pathogen-free, barrier facilities (65-75° C. and 40-60% humidity) with a 12 h light/dark cycle at Washington University School of Medicine (St. Louis, MO). All animal procedures were approved by the Division of Comparative Medicine Animal Studies Committee at Washington University in St. Louis School of Medicine. All animal work was conducted in accordance with the Guide for the Care and Use of Laboratory Animals of the National Institutes of Health. Morning observation of a vaginal plug was designated as embryonic day (E) 0.5. Both $923^{del}$ and $923^{large}$ mouse lines were backcrossed at least 7 times to the C57BL/6 background to generate isogenic strains and to exclude potential off-target effects arising from CRISPR/Cas9 editing. Measurements for each of the molecular assays for the mice were taken from distinct samples. A list of all primers used throughout this study are provided in TABLE 11.

Histology

Dorsal skin was excised from 8-week-old mice and preserved in 4% paraformaldehyde (Electron Microscopy Sciences, Hatfield, PA) prior to paraffin sectioning. Sections were stained with hematoxylin and eosin by the Washington University Developmental Biology Histology Core. Slides were imaged on a Nikon Eclipse 80i brightfield microscope (Nikon, Tokyo, Japan).

Dye Penetration Barrier Assays

Barrier assays were performed with X-gal solution incubations for at least 4 h at 37° C. Images were captured on a CanoScan 5600 F scanner (Canon, Melville, NY).

Cornified Envelope Preparations

Epidermis (cut into 1 $cm^2$ pieces) was incubated at 95° C. in a solution of 2% SDS to obtain cornified envelopes in a single-cell suspension. The suspension was placed on a slide and inspected using phase contrast light microscopy.

Trans-Epidermal Water Loss Assay

TEWL was measured on the abdominal skin surface of newborn mice using the nail attachment of a VapoMeter (Delfin Technologies, Kuopio, Finland, courtesy of Jeff Miner).

Immunofluorescence

Fresh sections were fixed in 4% paraformaldehyde (Electron Microscopy Sciences, Hatfield, PA) prior to permeabilization with 0.1% Triton X-100 and subsequent antibody incubation. The following antibodies were used for immunofluorescence: rabbit IVL (4b-KSCN, 1:200) and chicken K14 (5560, 1:500) custom antibodies (courtesy of J. Segre), goat anti-rabbit (Alexa Fluor 488 #A-11008, 1:500), and goat anti-chicken (Alexa Fluor 594 #A-11042, 1:500) IgG antibodies (Life Technologies, Frederick, MD), and DAPI counterstained (SlowFade Gold antifade reagent) (Life Technologies). Fluorescent microscopy was performed on Zeiss Axiolmager Z1 and captured with AxioCam MRc and Axiovision software (Carl Zeiss, Stockholm, Sweden), or imaged on a DM13000 B (Leica, Wetzlar, Germany) and captured with the QIClick camera (QImaging, Surrey, BC, Canada).

RNA-Seq

Total RNA from whole skin was isolated by TriZol extraction (Life Technologies, Frederick, MD). Ribo-zero (ribosome-depleted) RNA sequencing libraries were prepped according to the manufacturer's library kit protocol, indexed, pooled, and sequenced on Illumina HiSeq 3000 (1×50 bp) by the Washington University Genome Technology Access Center.

Basecalls and demultiplexing were performed with Illumina's bcl2fastq software v2.20 with a maximum of one mismatch in the indexing read. RNA-seq reads were then aligned to the Ensembl release 96 top-level assembly with STAR version 2.0.4b. Gene counts were derived from the number of uniquely aligned unambiguous reads by Subread: featureCounts version 1.4.5. Sequencing performance was assessed for the total number of aligned reads, total number of uniquely aligned reads, and features detected. The ribosomal fraction, known junction saturation, and read distribution over known gene models were quantified with RSeQC version 2.3. All gene counts were then imported into the R/Bioconductor package EdgeR version 3.22.0, and TMM normalization size factors were calculated to adjust for samples for differences in library size. Ribosomal genes and genes not expressed in the smallest group size minus one samples greater than one count-per-million were excluded from further analysis. The TMM size factors and the matrix of counts were then imported into the R/Bioconductor package Limma version 3.36.5. Performance of the samples was assessed with Spearman correlations, a multi-dimensional scaling plot, and hierarchical clustering. Weighted likelihoods based on the observed mean-variance relationship of every gene and sample were then calculated for all samples with the voomWithQualityWeights. The performance of all genes was assessed with plots of the residual standard deviation of every gene to their average log-count with a robustly fitted trend line of the residuals. Differential expression analysis was then performed to analyze for differences between conditions and the results were filtered for only those genes with Benjamini-Hochberg false-discovery rate adjusted p-values≤0.05, and a log $2(FC)≥|2|$.

The R/Bioconductor package heatmap3 version 1.1.6 and Pathview version 1.18.2 was used to display heatmaps or annotated KEGG graphs across groups of samples for each GO term or KEGG pathway, respectively, with a Benjamini-Hochberg false-discovery rate adjusted p-value less than or equal to 0.05.

Real-time qPCR on cDNA (generated using SuperScript II reverse transcriptase (Thermo Fisher Scientific) using TaqMan Gene Expression Assay was performed in triplicate (Applied Biosystems, Life Technologies, Carlsbad, CA) and normalized to P2-microglobulin. Only CT values with single peaks on melt-curve analyses were included.

ATAC-Seq

ATAC-seq was performed on 75,000 epidermal cells from each mouse with variations. Cells were lysed for 5 min in 37.5 µl ice-cold buffer (10 mM TrisHCI, 10 mM NaCl, 2 mM $MgCl_2$, 0.5% IGEPAL CA-630). Cells were then pelleted at 500 g (4° C.) for 15 min. Lysis buffer was replaced with transposition reaction mix (12.5 µl TD (2× reaction buffer from Nextera Kit, Illumina, San Diego California, USA), 2.5 µl TDE1 (Nextera Tn5 Transposase from Nextera kit, Illumina), and 10 µl $H_2O$) and samples were incubated for 1 h at 37° C. Samples were purified using Qiagen MinElute PCR Purification Kit (Qiagen, Valencia, CA) and PCR-amplified. Adapter dimer bands were removed using AMPure XP bead treatment (Beckman Coulter, Brea, CA). All Samples exhibited the expected nucleosome periodicity as assayed by High Sensitivity ScreenTape (Agilent Technologies, Santa Clara, CA). Samples were sequenced via Illumina HiSeq2500 (2×50 bp). An average of 93.4% of the reads were mapped with 14.3-39.8 million qualified reads per sample with only an average of 6.8% mitochondrial reads. Prior to sequencing, all samples exhibited the expected periodicity of insert length and were enriched for reads at transcription start sites.

ATAC-seq data were processed using the ENCODE ATAC-seq processing pipeline, using Caper with Conda (https://github.com/ENCODE-DCC/atac-seq-pipeline). Reads were mapped using Bowtie2 version 2.3.5.1, and filtered to remove unmapped reads, duplicates, and reads mapping to chrM. Peaks were called on each replicate using MACS2. Biological replicates were included if both the rescue and self-consistency IDR values per genotype were below (or very near to) 2 (TABLE 12). Differential accessibility was assessed using EdgeR within the DiffBind R package version 2.12.0 (http://bioconductor.org/packages/DiffBind/) (FDR<0.5, log $2(FC)≥|2|$).

Allele-Specific Gene Expression

RNA from newborn whole skins was isolated as described above from C57B16 and BALB/cBYJ wild-type mice and from [C57B16]/[BALB/cBYJ], [$923^{del}$]/[BALB/cBYJ], and

[923$^{large}$/[BALB/cBYJ] hybrid mice. RNA was DNaseI treated and reverse transcribed into cDNA using Invitrogen SuperscriptII Reverse Transcriptase (Invitrogen, Carlsbad, CA); 260 bp amplicons targeting the Ivl, 2210017/01Rik, and Lce6a genes were amplified from cDNA using NEB-Phusion High Fidelity PCR 2× master mix (New England BioLabs, Ipswich, MA) (Amplicon Sequences in TABLE 11). PCR products were purified on Qiagen QIAquick PCR columns (Hilden, Germany), A-tailed with 1 mM dATP and NEB Taq polymerase for 20 min at 72° C. (New England BioLabs, Ipswich, MA) followed by an additional column purification on Qiagen MinElute columns. Next-generation sequencing-compatible adapters were ligated to A-tailed PCR products in molar excess using the LigaFast DNA ligase kit (Promega, Madison, WI) at room temperature for 20 min. Products were size-selected using Agencourt AMPure XP beads (Beckman Coulter, Brea, CA) at 1.2× product volume to remove excess adapter. Adapter-ligated products were quantitated using Qubit dsDNA High Sensitivity Assay kit (Life Technologies, Carlsbad, CA). To determine appropriate PCR amplification cycle number to avoid over amplification, quantitative PCR was performed using 2× NEB Phusion High Fidelity PCR master mix, 0.5 µM PCR primer1, 0.01 µM PCR primer2, 0.5 µM unique Index Primer, 100× SYBR Green and 50× ROX Dye, and 2 ng DNA in 10 µl. PCR cycle number for each template was determined by identifying the cycle where % max fluorescence was reached, 10 ng of each library was amplified using the same reaction, without SYBR and ROX, scaled up to 50 µl. Amplified libraries were size-selected again to remove any remaining adapter dimer using 1× concentration of AmPure beads. All libraries were pooled at equal molar ratio and sequenced as a spike-in to a 2×150 bp MiSeq sequencing run, averaging 154,000 reads per sample. Demultiplexed reads were mapped using Bowtie2 version 2.3.5.1 and visualized using the IGV viewer. The proportion of nucleotides at each informative SNP in the amplicon was calculated by IGV. Primers are listed in TABLE 11.

Luciferase Assays

Population-specific alleles for the IVL promoter, noncoding first exon, and intron were cloned from human gDNA by PCR using primers 5'-GGATCCGA-TAGGTTCTAGGGGTATAGTGG (SEQ ID NO: 11)/5'-AAGCTTCTTAGAAGCTACTGTCAACCTG (SEQ ID NO: 12). PCR products were digested with BamHI and HindIII and cloned into the BglII/HindIII site in pGL3 (Promega) to yield pGL3-IVLpromoter and confirmed by Sanger sequencing. The Gateway cassette B was then cloned into the SmaI site to yield pGL3-IVLpromoter-GW. The 923 enhancer region was amplified from human gDNA using primers 5'-GGGGACCACTTTGTA-CAAGAAAGCTGGGTGAAGAACAGTGAATTT-TACGAC C (SEQ ID NO: 13)/5'-GGGGACAAGTTTGTA-CAAAAAAGCAGGCTAGACATTCTGCTGCTGGACA (SEQ ID NO: 14) and introduced into pDONR221 by BP recombination using BP Clonase II (Invitrogen, Thermo Fisher Scientific). Haplotype-specific variants were confirmed by Sanger sequencing. Enhancer alleles were then introduced into pGL3-IVLpromoter-GW by LR recombination using LR Clonase II (Invitrogen, Thermo Fisher Scientific) to yield pGL3-IVLpromoter-923. Enhancer alleles were then introduced to pGL3 by LR recombination. Luciferase reporter assays were performed in the mouse SP-1 keratinocyte cell line with measurements performed at 48 and 72 h post-differentiation for proliferating and differentiated cells, respectively, using a Glomax luminometer (Promega). Significance was determined using one-way ANOVA followed by Tukey's HSD.

Transcription Factor Binding Predictions

Transcription factor binding prediction was determined using transcription factor motifs considering the position and weight of the nucleotide for a given binding motif and evidence of transcription factor expression in keratinocytes (Human Protein Atlas) and ENCODE ChIP-seq binding (where possible). Both reference and alternate nucleotides for a given SNP were rigorously queried and centered at position 25 in a 50 bp window were analyzed with PROMO 3.0 and ConSite (http://consite.genereg.net/cgi-bin/consite). PROMO 3.0 with TRANSFAC version 8.3 considered only human sites and human factors with 15% maximum matrix dissimilarity rate and ConSite utilized the option for all transcription factor profiles with a minimum specificity of 10 bits and transcription factor score cutoff of 80% in a single sequence. JASPAR with a relative profile score threshold of 80% was used to analyze each SNP allele (reference and alternate independently) centered at position 15 in a 30 bp window. HAPLOREG v.4 was queried for a given SNP rsID. ENCODE ChIP-seq matrix considered *Homo sapiens* transcription factors that were present at the SNP location in skin cell lines, keratinocyte or foreskin keratinocyte primary cell lines, or suprapubic skin tissue. Transcription factors predicted were checked for positive antibody staining in keratinocytes from primary data in the Human Protein Atlas. We interpreted transcription factor binding that satisfied JASPAR plus either ConSite, PROMO 3.0, or HAPLOREG predictions.

Allele-Specific ChIP-Seq Analysis

All ChIP-Seq data, including IDR thresholded peaks bed and bam alignment files were downloaded from ENCODE. Variant calls in vcf format were downloaded from ENCODE (HepG2: ENCSR319QHO, K562: ENCSR053AXS), the Platinum Genomes project, and the HEK293 genome project (http://hek293genome.org/v2/) and if necessary converted to hg38 using liftOver. Variants were further filtered to only include heterozygous variants. Sequences for each ChIP-seq peak were extracted using bedtools and the hg38 UCSC genome reference. Motifs for each TF from JASPAR 2020 (MAZ: MA1522.1, NFIC: MA0161.1, SPI1: MA0080.1, ZNF263: MA0528.2) and used FIMO (part of the MEME suite v5.3.3) were downloaded to search for occurrences of each motif with max-stored-scores set to 1 E-8. Since the appropriate p-value threshold is dependent on the motif length and information content, p-values were scanned for each motif search across the values 1 E-5, 5E-4, 1 E-4, 5E-3, and 1 E-3. For each motif, the p-value was set based on whether there was an average of 0.5-1 motifs found per ChIP-seq peak across each of the datasets for a given TF (TABLE 13). Bedtools (v2.26.0, https://bedtools.readthedocs.io/) was used to overlap identified motifs with heterozygous SNPs using the variant calls (.vcf file) from the appropriate cell line. Samtools (v1.3.1, http://www.htslib.org/) view with the –L flag was used next to extract all alignments that overlapped identified ChIP-seq peaks. Aligned reads were overlapped to identify each SNP, manually curated to ensure the SNP corresponded to the queried variant, and counted for the number of reads supporting each base. Further, only SNPs with coverage≥5 and within 50 bp of the peak center were retained. Results from IRF1 and RELA are not included since no SNPs met these criteria.

Tables

TABLE 1

CEU-IVL SNPs identified by CMS/iSAFE and iSAFE alone are also GTEx eQTLs (V8) found in sun exposed and not sun exposed skin. Chi-Square P-value was calculated based on Mahalanobis distance and Bonferroni corrected. Normalized effect size = NES.

| | | | | Skin-Sun Exposed | | | | | | Skin-Not Sun Exposed | | | | | |
|---|---|---|---|---|---|---|---|---|---|---|---|---|---|---|---|
| | Position | | Ref | IVL | | LCE1E | | LCE1D | | IVL | | LCE1E | | LCE1D | |
| rsID | Chr | (hg19) | (CEU) Alt | NES | P value | NES | P value | NES | P value | NES | P value | NES | P value | NES | P value |
| rs4845327 | 1 | 152879512 | G T | −0.28 | 4.0E−15 | −0.23 | 2.8E−05 | None | None | −0.26 | 2.3E−09 | −0.29 | 1.5E−06 | −0.33 | 2.4E−11 |
| rs1854779 | 1 | 152880672 | T C | −0.29 | 6.8E−16 | −0.24 | 5.7E−06 | −0.23 | 2.4E−04 | −0.26 | 9.0E−10 | −0.32 | 1.1E−07 | −0.35 | 4.5E−07 |
| rs7539232 | 1 | 152881802 | G A | −0.29 | 6.8E−16 | −0.24 | 5.7E−06 | −0.23 | 2.4E−04 | −0.26 | 9.0E−10 | −0.32 | 1.1E−07 | −0.35 | 4.5E−07 |
| rs11205132 | 1 | 152882135 | A G | −0.29 | 6.8E−16 | −0.24 | 5.7E−06 | −0.23 | 2.4E−04 | −0.26 | 9.0E−10 | −0.32 | 1.1E−07 | −0.35 | 4.5E−07 |
| rs2229496 | 1 | 152882610 | A G | −0.29 | 6.8E−16 | −0.24 | 5.7E−06 | −0.23 | 2.4E−04 | −0.26 | 9.0E−10 | −0.32 | 1.1E−07 | −0.35 | 4.5E−07 |
| rs7535306 | 1 | 152883680 | A G | −0.29 | 6.8E−16 | −0.24 | 5.7E−06 | −0.23 | 2.4E−04 | −0.26 | 9.0E−10 | −0.32 | 1.1E−07 | −0.35 | 4.5E−07 |
| rs7545520 | 1 | 152883711 | G C | −0.29 | 6.8E−16 | −0.24 | 5.7E−06 | −0.23 | 2.4E−04 | −0.26 | 9.0E−10 | −0.32 | 1.1E−07 | −0.35 | 4.5E−07 |

TABLE 2

Offspring genotype distribution from heterozygous $923^{del}$ as well as $923^{large}$ parental crosses. Chi-squared test calculations included

| Genotype | Observed | Expected | |
|---|---|---|---|
| $923^{del}$ Het Intercrosses | | | |
| +/+ | 22 | 18.75 | |
| +/− | 40 | 37.5 | |
| −/− | 13 | 18.78 | Chi-sqr test = 0.287461 |
| $923^{large}$ Het Intercrosses | | | |
| +/+ | 21 | 19.25 | |
| +/− | 38 | 38.5 | |
| −/− | 18 | 19.25 | Chi-sqr test = 0.883931 |

TABLE 3

Ranked list of differentially expressed genes between $923^{del/del}$ and WT mice whole skin from RNA-seq. List ranked by log2FC. Statistical analysis using Limma's generalized linear model moderated two-sided t-tests with 22 degrees of freedom and FDR (Benjamen-Hochberg, adj. p val) <0.05 and logFC <|2| cutoffs were used.

| Feature ID | entrez gene | external gene name | gene biotype | description | logFC | adj. p val |
|---|---|---|---|---|---|---|
| ENSMUSG00000049128 | 16447 | Ivl | protein coding | involucrin [Source:MGI Symbol; Acc:MGI:96626] | −5.119 | 1.98E−06 |
| ENSMUSG00000028081 | 20091 | Rps3a1 | protein coding | ribosomal protein S3A1 [Source:MGI Symbol; Acc:MGI:1202063] | −4.879 | 9.60E−14 |
| ENSMUSG00000081355 | NA | Gm15264 | unprocessed pseudogene | predicted gene 15264 [Source:MGI Symbol; Acc:MGI:3705845] | 2.482 | 3.18E−03 |
| ENSMUSG00000081303 | NA | Gm16011 | processed pseudogene | predicted gene 16011 [Source:MGI Symbol; Acc:MGI:3801796] | 4.155 | 3.46E−02 |
| ENSMUSG00000091383 | NA | Hist1h2al | processed pseudogene | histone cluster 1, H2al [Source:MGI Symbol; Acc:MGI:3646032] | 7.650 | 8.65E−10 |
| ENSMUSG00000059751 | NA | Rps3a3 | processed pseudogene | ribosomal protein S3A3 [Source:MGI Symbol; | 8.451 | 5.17E−11 |

TABLE 3-continued

Ranked list of differentially expressed genes between 923$^{del/del}$ and WT mice whole skin from RNA-seq. List ranked by log2FC. Statistical analysis using Limma's generalized linear model moderated two-sided t-tests with 22 degrees of freedom and FDR (Benjamen-Hochberg, adj. p val) <0.05 and logFC <|2| cutoffs were used.

| Feature ID | entrez gene | external gene name | gene biotype | description | logFC | adj. p val |
|---|---|---|---|---|---|---|
| | | | | Acc:MGI: 3643406 | | |

TABLE 4

Ranked list of differentially expressed genes between 923del/+ and WT mice whole skin from RNA-seq. List ranked by log2FC. Statistical analysis using Limma's generalized linear model moderated two-sided t-tests with 22 degrees of freedom and FDR (Benjamini-Hochberg, adj. p val) <0.05 and logFC <|2| cutoffs were used.

| Feature ID | entrez gene | external gene name | gene biotype | description | logFC | adj. p val |
|---|---|---|---|---|---|---|
| ENSMUSG00000040852 | 213556 | Plekhh2 | Protein coding | pleckstrin homology domain containing, family H (with MyTH4 domain) member 2 [Source:MGI Symbol; Acc:MGI:2146813] | −4.544 | 1.78E−02 |
| ENSMUSG00000078122 | NA | F630028O10Rik | Antisense | RIKEN cDNA F630028O10 gene [Source:MGI Symbol; Acc:MGI:3641813] | −2.150 | 4.04E−02 |
| ENSMUSG00000111912 | NA | Gm48521 | lincRNA | predicted gene, 48521 [Source:MGI Symbol; Acc:MGI:6098057] | −2.142 | 3.65E−02 |
| ENSMUSG00000074634 | 633640 | Tmem267 | Protein coding | transmembrane protein 267 [Source:MGI Symbol; Acc:MGI:3648543] | −2.009 | 2.05E−02 |
| ENSMUSG00000049103 | 12772 | Ccr2 | Protein coding | chemokine (C-C motif) receptor 2 [Source:MGI Symbol; Acc:MGI:106185] | −2.000 | 3.65E−02 |
| ENSMUSG00000049128 | 16447 | Ivl | Protein coding | involucrin [Source:MGI Symbol; Acc:MGI:96626] | −1.827 | 2.59E−03 |
| ENSMUSG00000039252 | 246316 | Lgi2 | Protein coding | leucine-rich repeat LGI family, member 2 [Source:MGI Symbol; Acc:MGI:2180196] | 2.104 | 3.85E−02 |
| ENSMUSG00000035769 | 102448 | Xylb | Protein coding | xylulokinase homolog (*H. influenzae*) [Source:MGI Symbol; Acc:MGI:2142985] | 2.602 | 3.67E−02 |
| ENSMUSG00000035184 | 629059 | Fam124a | Protein coding | family with sequence similarity 124, member A [Source:MGI Symbol; Acc:MGI:3645930] | 2.621 | 4.72E−02 |
| ENSMUSG00000040289 | 15213 | Hey1 | Protein coding | hairy/enhancer-of-split related with YRPW motif 1 [Source:MGI Symbol; Acc:MGI:1341800] | 2.711 | 1.78E−02 |

TABLE 4-continued

Ranked list of differentially expressed genes between 923del/+ and WT mice whole skin from RNA-seq. List ranked by log2FC. Statistical analysis using Limma's generalized linear model moderated two-sided t-tests with 22 degrees of freedom and FDR (Benjamini-Hochberg, adj. p val) <0.05 and logFC <|2| cutoffs were used.

| Feature ID | entrez gene | external gene name | gene biotype | description | logFC | adj. p val |
|---|---|---|---|---|---|---|
| ENSMUSG00000016346 | 16536 | Kcnq2 | Protein coding | potassium voltage-gated channel, subfamily Q, member 2 [Source:MGI Symbol; Acc:MGI:1309503] | 2.924 | 3.21E−02 |
| ENSMUSG00000066191 | 75691 | Anks6 | Protein coding | ankyrin repeat and sterile alpha motif domain containing 6 [Source:MGI Symbol; Acc:MGI:1922941] | 2.976 | 1.20E−02 |
| ENSMUSG00000039137 | 73750 | Whrn | Protein coding | whirlin [Source:MGI Symbol; Acc:MGI:2682003] | 3.023 | 6.02E−04 |
| ENSMUSG00000069227 | 26913 | Gprin1 | Protein coding | G protein-regulated inducer of neurite outgrowth 1 [Source:MGI Symbol; Acc:MGI:1349455] | 3.505 | 3.65E−02 |
| ENSMUSG00000006538 | 16147 | Ihh | Protein coding | Indian hedgehog [Source:MGI Symbol; Acc:MGI:96533] | 3.882 | 3.02E−02 |
| ENSMUSG00000027517 | 70065 | Ankrd60 | Protein coding | ankyrin repeat domain 60 [Source:MGI Symbol; Acc:MGI:1917315] | 3.939 | 4.36E−02 |
| ENSMUSG00000092675 | NA | Gm25262 | miRNA | predicted gene, 25262 [Source:MGI Symbol; Acc:MGI:5455039] | 3.974 | 1.76E−02 |
| ENSMUSG00000098973 | NA | Mir6236 | miRNA | microRNA 6236 [Source:MGI Symbol; Acc:MGI:5530929] | 4.119 | 4.04E−02 |
| ENSMUSG00000033948 | 74464 | Zswim5 | Protein coding | zinc finger SWIM-type containing 5 [Source:MGI Symbol; Acc:MGI:1921714] | 4.237 | 1.76E−02 |
| ENSMUSG00000076258 | NA | Gm23935 | miRNA | predicted gene, 23935 [Source:MGI Symbol; Acc:MGI:5453712] | 4.258 | 1.15E−02 |
| ENSMUSG00000092909 | NA | Gm25732 | miRNA | predicted gene, 25732 [Source:MGI Symbol; Acc:MGI:5455509] | 4.613 | 2.32E−02 |
| ENSMUSG00000112365 | NA | Gm49782 | lincRNA | predicted gene, 49782 [Source:MGI Symbol; Acc:MGI:6215301] | 4.871 | 3.21E−02 |
| ENSMUSG00000044518 | 30923 | Foxe3 | Protein coding | forkhead box E3 [Source:MGI Symbol; Acc:MGI:1353569] | 5.296 | 3.21E−02 |
| ENSMUSG00000091383 | NA | Hist1h2al | Processed psuedogene | histone cluster 1, H2al [Source:MGI Symbol; Acc:MGI:3646032] | 7.024 | 7.31E−09 |
| ENSMUSG00000059751 | NA | Rps3a3 | Processed psuedogene | ribosomal protein S3A3 [Source:MGI Symbol; Acc:MGI:3643406] | 7.605 | 9.56E−10 |

TABLE 5

Ranked list of differentially accessible regions between 923$^{del/del}$ and WT mice epidermis from ATAC-seq. List ranked by FC. FDR <0.05 and FC <|2| cutoffs used.

| Chromosome | start | end | Fold | FDR |
|---|---|---|---|---|
| chrX | 169993996 | 169994243 | −4.64 | 2.21E−02 |
| chrX | 169996914 | 169998486 | −3.70 | 2.66E−02 |
| chr3 | 93176662 | 93176984 | −2.76 | 4.62E−02 |
| chr3 | 93814593 | 93815096 | −2.56 | 8.59E−03 |
| chr3 | 79242295 | 79242558 | 2.89 | 4.62E−02 |
| chrX | 60591524 | 50591728 | 3.78 | 3.78E−02 |
| chrX | 50611756 | 50611998 | 4.19 | 3.78E−02 |
| chr3 | 78966708 | 78967396 | 4.34 | 3.81E−07 |
| chr3 | 92978570 | 92978806 | 4.39 | 1.04E−03 |
| chr3 | 93630562 | 93630842 | 4.82 | 3.81E−07 |

TABLE 6

Ranked list of differentially accessible regions between 923large/large and WT mice epidermis from ATAC-seq. List ranked by FC. FDR <0.05 and FC <|2| cutoffs used.

| Chromosome | start | end | Fold | FDR |
|---|---|---|---|---|
| chrX | 169993996 | 169994243 | −5.41 | 9.91E−05 |
| chrX | 169996914 | 169998486 | −3.83 | 4.87E−04 |
| chr8 | 119234019 | 119234204 | −3.66 | 2.97E−02 |
| chr7 | 118642175 | 118642353 | −3.63 | 4.64E−02 |
| chr12 | 118918105 | 118918297 | −3.59 | 4.41E−02 |
| chr8 | 86904158 | 86904360 | −3.47 | 2.43E−02 |
| chr15 | 88995738 | 88995926 | −3.45 | 1.59E−02 |
| chr14 | 37306986 | 37307136 | −3.43 | 4.31E−02 |
| chr14 | 7972236 | 7972440 | −3.41 | 7.92E−03 |
| chr5 | 38901570 | 38901772 | −3.23 | 3.23E−02 |
| chr3 | 93780248 | 93780977 | −2.73 | 7.28E−03 |
| chr3 | 93814593 | 93815096 | −2.53 | 7.28E−03 |
| chr13 | 21172295 | 21172487 | 2.99 | 4.31E−02 |
| chr3 | 92978570 | 92978806 | 3.64 | 4.31E−02 |
| chr3 | 92586198 | 92586460 | 3.64 | 4.71E−02 |
| chrX | 52243896 | 52244124 | 3.72 | 1.04E−02 |
| chr3 | 78966708 | 78967396 | 3.99 | 1.19E−04 |
| chr5 | 123127103 | 123127309 | 4.00 | 1.86E−02 |
| chr3 | 92579546 | 92579913 | 4.54 | 4.87E−04 |
| chr3 | 92583166 | 92583453 | 4.61 | 9.91E−05 |
| chr3 | 93530552 | 93530842 | 4.84 | 8.89E−06 |
| chr3 | 92609764 | 92610128 | 5.50 | 5.05E−07 |
| chr1 | 24613142 | 24615948 | 5.69 | 1.04E−02 |

TABLE 7

SNPs in JPT/CHB allele are GTEx eQTLs for IVL (V8) in sun exposed and not sun exposed skin. Chi-Square P-value was calculated based on Mahalanobis distance and Bonferroni corrected. Normalized effect size = NES.

| rsID | Chr | Position (hg38) | Ref (CEU) | Alt (JPT/CHB cloned allele) | Skin-Sun Exposed IVL | | Skin-Not Sun Exposed IVL | |
|---|---|---|---|---|---|---|---|---|
| | | | | | NES | P value | NES | P value |
| rs1974141 | 1 | 152907036 | A | G | −0.85 | 8.00E−11 | −1.0 | 3.3E−09 |
| rs12036697 | 1 | 152906433 | A | G | −0.85 | 8.00E−11 | −1.0 | 3.3E−09 |
| rs16834746 | 1 | 152906620 | T | C | −0.85 | 8.00E−11 | −1.0 | 3.3E−09 |
| rs4845327 | 1 | 152907036 | G | T | −0.25 | 4.00E−15 | −0.26 | 2.30E−09 |
| rs1854779 | 1 | 152908196 | T | C | −0.29 | 6.80E−16 | −0.25 | 9.00E−09 |
| rs16834751 | 1 | 152908735 | A | C | −0.43 | 9.90E−07 | −0.51 | 3.90E−06 |
| rs4523473 | 1 | 152908964 | T | C | −0.28 | 1.90E−15 | −0.24 | 2.90E−08 |
| rs11205130 | 1 | 152909173 | T | C | −0.85 | 8.00E−11 | −1.0 | 3.30E−09 |
| rs11205131 | 1 | 152909202 | G | A | −0.53 | 1.10E−07 | −0.52 | 2.00E−05 |
| rs7528862 | 1 | 152909213 | A | G | −0.29 | 6.80E−10 | −0.26 | 9.00E−10 |
| rs7517188 | 1 | 152909270 | C | G | −0.29 | 6.80E−16 | −0.26 | 9.00E−10 |
| rs7539232 | 1 | 152909326 | G | A | −0.29 | 6.80E−16 | −0.26 | 9.00E−10 |
| rs11206132 | 1 | 152909669 | A | G | −0.29 | 6.80E−16 | −0.26 | 9.00E−10 |

TABLE 8

Transcription factor binding predictions for IVL eQTLs (V8).

| IVL eQTL | Regulatory Element | Hg38 position Chr1 | Reference (CEU; major) | Alternate (Minor) | Conserved in Mouse |
|---|---|---|---|---|---|
| rs1974141 | enhancer | 152905746 | A | G | No |
| rs12036697 | enhancer | 152906433 | A | G | No |
| rs16834746 | enhancer | 152906620 | T | C | Yes (T) |
| rs4845327 | enhancer | 152907036 | G | T | Yes (T) |
| rs1854779 | promoter | 152908196 | T | C | Yes (T) |
| rs16834751 | intron | 152908735 | A | C | No |
| rs4523473 | intron | 152908954 | T | C | No |
| rs11205130 | intron | 152909173 | T | C | Yes (T) |
| rs11205131 | intron | 152909202 | G | A | No |
| rs7528862 | intron | 152909213 | A | G | Yes (A) |
| rs7517189 | intron | 152909270 | C | G | Yes (T) |
| rs7539232 | intron | 152909326 | G | A | Yes (C) |
| rs11205132 | intron | 152909659 | A | G | Yes (G) |

TABLE 8-continued

| IVL eQTL | Effect size for minor (sun-exposed skin GTEX v8) | Effect size for minor (Not sun-exposed skin GTEX v8) | TFBS (Ref) | TFBS (Alt) |
|---|---|---|---|---|
| rs1974141 | −0.85 | −1.0 | ZNF263 | MAZ |
| rs12036697 | −0.85 | −1.0 | AP-1 | AP-1 |
| rs16834746 | −0.85 | −1.0 | None | None |
| rs4845327 | −0.28 | −0.26 | IRF1 | SOX10 |
| rs1854779 | −0.29 | −0.26 | NFIC | SPI1 |
| rs16834751 | −0.43 | −0.51 | None | None |
| rs4523473 | −0.28 | −0.24 | CTCF | CTCF |
| rs11205130 | −0.85 | −1.0 | TFAP2A | TFAP2A |
| rs11205131 | −0.53 | −0.52 | MZF1 | MZF1 |
| rs7528862 | −0.29 | −0.26 | IRF1 | IRF1 |
| rs7517189 | −0.29 | −0.26 | REL | GATA3 |
| rs7539232 | −0.29 | −0.26 | None | None |
| rs11205132 | −0.29 | −0.26 | FOXC1 | FOXC1 |

TABLE 9

Preferential binding in vivo for ZNF263 (A), MAZ (G), NFIC (T), and SPI1 (C) to predict alleles at polymorphic sites in ENCODE ChIP-seq datasets. FIMO computes a log-likelihood ratio score for each motif at each position and converts these scores to P-values using dynamic programming.

| Cell line | Replicate | TF | P value | Chrom | Motif Position (hg38) | SNP position (hg38) | strand | Ref | Alt |
|---|---|---|---|---|---|---|---|---|---|
| HepG2 | 1 | ZNF263 | 1.00E−05 | Chr1 | 44031571 | 44031577 | − | T | C |
| HepG2 | 1 | ZNF263 | 1.00E−05 | Chr9 | 136251492 | 136251499 | + | A | G |
| K562 | 1 | ZNF263 | 1.00E−05 | Chr1 | 44031571 | 44031577 | − | T | C |
| GM12878 | 1 | MAZ | 1.00E−05 | Chr11 | 20610306 | 20610313 | − | G | A |
| HEK293 | 1 | MAZ | 1.00E−05 | Chr1 | 11934650 | 11934657 | − | G | A |
| HepG2 | 1 | MAZ | 1.00E−05 | Chr5 | 150449741 | 150449748 | − | G | A |
| HepG2 | 1 | MAZ | 1.00E−05 | Chr20 | 62144533 | 62144538 | + | C | T |
| HepG2 | 2 | MAZ | 1.00E−05 | Chr3 | 187740026 | 187740033 | − | G | A |
| HepG2 | 2 | MAZ | 1.00E−05 | Chr5 | 150449741 | 150449748 | − | G | A |
| HepG2 | 2 | MAZ | 1.00E−05 | Chr9 | 95876019 | 95876024 | + | C | T |
| K562 | 1 | MAZ | 1.00E−05 | Chr11 | 20610306 | 20610313 | − | G | A |
| K562 | 2 | MAZ | 1.00E−05 | Chr11 | 20610306 | 20610313 | − | G | A |
| K562 | 2 | MAZ | 1.00E−05 | Chr15 | 40565034 | 40565041 | − | G | A |
| GM12878 | 1 | NFIC | 5.00E−04 | Chr1 | 247407515 | 247407517 | + | T | C |
| K562 | 1 | NFIC | 5.00E−04 | Chr8 | 3183715 | 3183717 | + | T | C |
| GM12878 | 1 | SPI1 | 5.00E−04 | Chr14 | 89882066 | 89882071 | − | C | T |
| GM12878 | 1 | SPI1 | 5.00E−04 | Chr19 | 47435401 | 47435406 | − | C | T |
| GM12878 | 1 | SPI1 | 5.00E−04 | Chr2 | 11754812 | 11754817 | − | C | T |
| GM12878 | 1 | SPI1 | 5.00E−04 | Chr20 | 17961089 | 17961094 | − | C | T |
| GM12878 | 1 | SPI1 | 5.00E−04 | Chr8 | 41713910 | 41713915 | − | C | T |
| GM12878 | 1 | SPI1 | 5.00E−04 | Chr12 | 120698927 | 120698929 | + | G | A |
| GM12878 | 1 | SPI1 | 5.00E−04 | Chr18 | 2641047 | 2641049 | + | G | A |
| GM12878 | 1 | SPI1 | 5.00E−04 | Chr5 | 109410410 | 109410412 | + | G | A |
| GM12878 | 1 | SPI1 | 5.00E−04 | Chr7 | 24255372 | 24255374 | + | G | A |
| K562 | 1 | SPI1 | 5.00E−04 | Chr11 | 124339876 | 124339881 | − | C | T |
| K562 | 1 | SPI1 | 5.00E−04 | Chr7 | 27400396 | 27400401 | − | C | T |
| K562 | 1 | SPI1 | 5.00E−04 | Chr18 | 46711454 | 46711456 | + | G | A |

| Cell line | Rel pos in Motif | Coverage | A | C | G | T | Dist to center | Ref cnt | Alt cnt | Ref freq |
|---|---|---|---|---|---|---|---|---|---|---|
| HepG2 | 6 | 106 | 0 | 6 | 3 | 97 | 20.5 | 97 | 6 | 0.942 |
| HepG2 | 7 | 9 | 7 | 0 | 2 | 0 | 36 | 7 | 2 | 0.778 |
| K562 | 6 | 5 | 0 | 0 | 0 | 5 | 22.5 | 5 | 0 | 1.000 |
| GM12878 | 7 | 12 | 8 | 0 | 4 | 0 | 25 | 4 | 8 | 0.333 |
| HEK293 | 7 | 145 | 41 | 0 | 104 | 0 | 27.5 | 104 | 41 | 0.717 |
| HepG2 | 7 | 43 | 19 | 0 | 24 | 0 | 1 | 24 | 19 | 0.558 |
| HepG2 | 5 | 29 | 0 | 23 | 0 | 6 | 0 | 23 | 6 | 0.793 |
| HepG2 | 7 | 7 | 7 | 0 | 0 | 0 | 13 | 0 | 7 | 0.000 |
| HepG2 | 7 | 14 | 4 | 0 | 10 | 0 | 5 | 10 | 4 | 0.714 |
| HepG2 | 5 | 15 | 0 | 7 | 0 | 8 | 27 | 7 | 8 | 0.467 |
| K562 | 7 | 55 | 19 | 0 | 36 | 0 | 15 | 36 | 19 | 0.655 |
| K562 | 7 | 48 | 18 | 0 | 30 | 0 | 20 | 30 | 18 | 0.625 |

TABLE 9-continued

Preferential binding in vivo for ZNF263 (A), MAZ (G), NFIC (T), and SPI1 (C) to predict alleles at polymorphic sites in ENCODE ChIP-seq datasets. FIMO computes a log-likelihood ratio score for each motif at each position and converts these scores to P-values using dynamic programming.

| K562 | 7 | 31 | 18 | 0 | 13 | 0 | 50 | 13 | 17 | 0.419 |
|---|---|---|---|---|---|---|---|---|---|---|
| GM12878 | 2 | 15 | 0 | 6 | 0 | 9 | 0 | 9 | 6 | 0.600 |
| K562 | 2 | 173 | 0 | 14 | 0 | 159 | 7 | 159 | 14 | 0.919 |
| GM12878 | 5 | 27 | 0 | 24 | 0 | 3 | 17.5 | 24 | 3 | 0.889 |
| GM12878 | 5 | 40 | 0 | 39 | 0 | 1 | 4 | 39 | 1 | 0.975 |
| GM12878 | 5 | 21 | 0 | 9 | 0 | 12 | 6.5 | 9 | 12 | 0.429 |
| GM12878 | 5 | 14 | 0 | 11 | 0 | 3 | 22 | 11 | 3 | 0.786 |
| GM12878 | 5 | 7 | 0 | 4 | 0 | 3 | 48 | 4 | 3 | 0.571 |
| GM12878 | 2 | 10 | 2 | 0 | 8 | 0 | 11 | 8 | 2 | 0.800 |
| GM12878 | 2 | 11 | 2 | 0 | 9 | 0 | 13 | 9 | 2 | 0.818 |
| GM12878 | 2 | 6 | 1 | 0 | 5 | 0 | 6 | 5 | 1 | 0.833 |
| GM12878 | 2 | 12 | 3 | 0 | 9 | 0 | 34 | 9 | 3 | 0.750 |
| K562 | 5 | 31 | 0 | 28 | 0 | 3 | 12 | 28 | 3 | 0.903 |
| K562 | 5 | 21 | 0 | 11 | 0 | 10 | 12 | 11 | 10 | 0.524 |
| K562 | 2 | 26 | 18 | 0 | 8 | 0 | 45 | 8 | 18 | 0.308 |

TABLE 10

CRISPR/Cas9 editing strategy reagents and mouse allele sequences.

a. Small Guide RNA (sgRNA) targeting sequences

| | | |
|---|---|---|
| Upstream 5' sgRNA | 5'-GAATACATCCCAGGAACAT-3' | SEQ ID NO: 15 |
| Downstream 3' sgRNA | 5'-CAGTAAGCTAGCGCTAGAC-3' | SEQ ID NO: 16 | b. ssODN sequences: SphI restriction site, LoxP site, HindIII restriction site, Homology arms

| | | |
|---|---|---|
| Upstream 5' ssODN | 5'-AGAAGTTTTTCAGTTCCCCATAGTTGTCCTGAGGAGCATATAATCTTTGTCTTAAGCAGATTTGTTTACAATAATTCCCTATAACTTCGTATAGCATACATTATACGAAGTTATGCATGCTTTAAAGAGATAGAGGACTGACATGACCCTCTGTCCTCTAAAACAAGTTTGCCAGGATTTCTCCATTCCCAGAGCCATGA-3' | SEQ ID NO: 17 |
| Downstream 3' ssODN | 5'-TCTCTGTTGTTAGAGTCCATCTCCTACACCGATAGAGACTGATTCTGAAAAAAAAGGAAGCTCCCACTGTCCAAGTTCTAAAGCTTATAACTTCGTATAGCATACATTATACGAAGTTATTGGAAACCAGACACCCTGGCTGCTGCTCTGAAGGCAACTCTTCCCTATCAGGCTCCTTAATAGGATTTGATCAGTGTGAC-3' | SEQ ID NO: 18 | c. 923 WT

| | |
|---|---|
| TCTTTAGTGCTCAGTTAACAGCTTATTTTATGGAGTTCATCATTAACACTTTTTTATGAGATCATACAAAATAATATAGTAAAATAATGGAAAGATAAAACTCATTTCTAATTAGTCTTGAGAAGTTTTTCAGTTCCCCATAGTTGTCCTGAGGAGCATATAATCTTTGTCTTAAGCAGATTTGTTTACAATAATTCCCTATGTTCCTGGGATGTATTCTTTAAAGAGATAGAGGACTGACATGACCCTCTGTCCTCTAAAACAAGTTTGCCAGGATTTCTCCATTCCCAGAGCCATGAGGCATCCTGAACACTACTCTGAACTATATTTCTTTCTTCCTTTCTTTCTTCCTTCCTTCCTTCCTTCCTTCCTTCCTTCCTTCCTTCCTTCCTTCCTTCCTTCCTTCCTTCTTTTCTTTTCTTTCTTTCTTTCTTTCTTTTCTTTCTTTCTTTCTTTCTTTCTTTTCTCTTTTTCTTTTTTTGCTTTTATTTATTTTTTTTCTTTTTCTATTAGATATTTTCTTCATTTACATTTCAAATGTTATCCCCAAGCCCCCTATACCCTCCCCCAGTCCTGATCCCCAACCCACCCACACCCACTTCCTGGCCCTGGCACTACTTTC | SEQ ID NO: 19 |

TABLE 10-continued

CRISPR/Cas9 editing strategy reagents and mouse allele sequences.

TATACCAAAGAAAGCATTCCCCACCCCACCA
GAAGAAGTAAGCAAGCATTCTCACATGAGCAC
TTATGCTCCACTTCTGACTTCACATGGGAAG
AATCTGACTCTCCTCAACCTGTGACAGTGCCA
GGGCAGCAGACTGGTCAAAAAGTCACACTG
GTCTTATGGGTTCCCAGAGGCTCAGTATCTG
CTCAATCTGTTTCCCACCAGCTGATTCAGAG
TATGATAAGAATTCAGAAATGATACTGTGTGT
GCGTGAGTGTTTGAGCACTGGGAAAAGCTA
AGGTGTGGGAATGAGGGCATAGGATAGAGCC
CAGAAACCTGTGTGTAGTTGAAGGAGGGGTT
GAAGAAGCTCCAGACTTCTAATGCTCAAAGG
TCACATATTTTGCCCTAGGATTATCCCACTTAG
CGACTGGGAATGCATGTCAATTTGGCATTT
TTTTTTCAGTGTGCTGTGTGACTGACTTTATAA
GTCTCAGATCCTTGTGATGAATCCAAGAAA
CTATGCAATGCAAATTATACAAATTCTCCAGTG
TAATGAAGGTAACCTTTCCCATAACCCATGA
AGAGGCCTTGACCCAGCTCGGCCTCAGTGTTT
AGGAGGATAAGAGAAGGTGAAGGGATGAA
TATGACCAGAATGTGTGAAATTGGCAGAGAAT
GAATTATTTCTGAAAACTTGCCTTTGAAGAG
TTTAGAGTGCTGCAGCTTCTTCAGAGAACATC
ATCTCTGTTGTTAGAGTCCATCTCCTACAC
CGATAGAGACTGATTCTGAAAAAAAAGGAAGC
TCCCACTGTCCAAGTTCTACAGTAAGCTA
GCGCTAGACTGGAAACCAGACACCCTGGCTGC
TGCTCTGAAGGCAACTCTTCCCTATCAG
GCTCCTTAATAGGATTTGATCAGTGTGACAGGTT
TCACTACATGACTACAGAGACATCCTCT
AAGTCCAATAAGTTCCTGTGAGAATTTGGT
GAGGCA d. 923del TCTTTAGTGCTCAGTTAACAGCTTATTTTATGGA    SEQ ID
GTTCATCATTAACACTTTTTTATGAGA           NO: 20
TCATACAAAATAATATAGTAAAATAATGGAAAG
ATAAAACTCATTTCTAATTAGTCTTGAG
AAGTTTTTCAGTTCCCCATAGTTGTCCTGAGG
AGCATATAATCTTTGTCTTAAGCAGA
TTTGTTTACAATAATTCCCACTGTCCACTAAA
GCTTATAACTTCGTATAGCATACATTAT
ACGAAGTTATTGGAAACCAGACACCCTGGCTG
CTGCTCTGAAGGCAACTCTTCCCTA
TCAGGCTCCTTAATAGGATTTGATCAGTGTGAC
AGGTTTCACTACATGACTACAGAGA
CATCCTCTAAGTCCAATAAGTTCCTGTGAGA
ATTTGGTGAGGCAA e. 923large TCCTCTGAATGCCCTAACTATCAGATTGTNTTC    SEQ ID
AGCTTTAATTAACTAATAAATTTTAGTT         NO: 21
ATTCTATCTATATTTATTTCATATTATTTATCT
GTCTTCCACTGAAAAACAAGTTATATTTT
GAGAGAAATATTCTGGGTGTGCTTTCCATTGTC
TCAAGGACCTATCAAAGTCACTCCAT
ACACTAAAACACTATCAGTATTAATTAAAAGAA
TAAATGACAGCAAATCTCATACCTACA
GACAACAACTTCCTAATATTTTAATGTCAAAC
AATCTTCATGTGTTTGAAAATGTGTGTG
CTAGGAAAATAAAGCTGAATTGTGGCTTATTTT
TGTCTTTAGTGCTCAGTTAACAGCTTAT
TTTATGGAGTTCATCATTAACACTTTTTTATGAG
ATCATACAAAATAATATAGTAAAATAAT
GGAAAGATAAAACTCATTTCTAATTAGTCTTG
AGAAGTTTTTCAATTTCCCATAGTTGTC
CTGAGGAGCATATAATCTTTGTCTTAAGCAGA
TTTGTTTACAATAATTCCCTATAACTT
CGTATAGCATACATTATACGAAGTTATGCATGC
TTTAAAGAGATAGAGGACTGATCAT
GGACTTGGTAAATAGCCATATAAAATAGGAGCA
GGTGGAAAAAAACATTTTCATTTCTG
ATTCTGAAAAAAAAGGAAGCTCCCACTGTCCAAG
TTCTAAAGCTTATAACTTCGTATA
GCATACATTATACGAAGTTATTGGAAACCAGACA

TABLE 10-continued

CRISPR/Cas9 editing strategy reagents and mouse allele sequences.

CCCTGGCTGCTGCTCTGAAGGCA
ACTCTTCCCTATCAGGCTCCTCAATAGGTGTTCTA
CATGAATGTATTGCTATGAAGCTA
CAGAGAACTGAAATACAAATTCCCAGAAATCTGTC
CCTGAGAGGAGAAGAACCCACTT
GAGGGTCCTCTGCACTTCTGATCAGGGTCTCAAG
AACTCACAGAAATCACAGTTATGC
ACCATGATCAATTTTATTGTTGTTGAACTGAAAGG
TAGGCTAAAGAAAGAAACAAGAAAT
GTTTTTCTAGCCAAGAGAGGTGGAGGG

TABLE 11

Primers and Allele-Specific Amplicons. Amplicon sequences with SNPs bolded and primers underlined.

| Primer Name | Primer Sequence | Experiment | |
|---|---|---|---|
| Ivl For | TGGGTCAGTCACTTAAGCAAGA | Allele-specific expression of Ivl in mouse | SEQ ID NO: 22 |
| Ivl Rev | TTCTGCTGCTGCTTCTCTGT | | SEQ ID NO: 23 |
| 2210017I01Rik For | GGTCCCCAGGTTCCTACTTC | Allele-specific expression of 2210017I01Rik in mouse | SEQ ID NO: 24 |
| 2210017I01Rik Rev | TCAAAGCTTATCCTGGGCCA | | SEQ ID NO: 25 |
| Lce6a For | TCCAGAACACTGTCAGCCAT | Allele-specific expression of Lce6a in mouse | SEQ ID NO: 26 |
| Lce6a Rev | GCACCATGATCAATTTTATTGTTG | | SEQ ID NO: 27 |
| PCR primer1 | AATGATACGGCGACCACCGAGAT CTACACTCTTTCCCTACACGACGC TCTTCCGATCT | RNA-seq | SEQ ID NO: 28 |
| PCR primer2 | GTGACTGGAGTTCAGACGTGTGC TCTTCCGATCT | | SEQ ID NO: 29 |
| Index Primer1 | CAAGCAGAAGACGGCATACGAGA TAACCTCAGTGACTGGAGTTCAG ACGTGTGCTCTTCCGA | | SEQ ID NO: 30 |
| Index Primer2 | CAAGCAGAAGACGGCATACGAGA TTCTAAGCGTGACTGGAGTTCAGA CGTGTGCTCTTCCGA | | SEQ ID NO: 31 |
| Index Primer3 | CAAGCAGAAGACGGCATACGAGA TCTGTCATGTGACTGGAGTTCAGA CGTGTGCTCTTCCGA | | SEQ ID NO: 32 |
| Index Primer4 | CAAGCAGAAGACGGCATACGAGAT GGAGGTGGTGACTGGAGTTCAGAC GTGTGCTCTTCCGA | | SEQ ID NO: 33 |
| Index Primer5 | CAAGCAGAAGACGGCATACGAGAT GCTCGATGTGACTGGAGTTCAGAC GTGTGCTCTTCCGA | | SEQ ID NO: 34 |
| Index Primer6 | CAAGCAGAAGACGGCATACGAGAT TAGAGTAGTGACTGGAGTTCAGAC GTGTGCTCTTCCGA | | SEQ ID NO: 35 |

TABLE 11-continued

Primers and Allele-Specific Amplicons. Amplicon sequences with SNPs bolded and primers underlined.

| Name | Sequence | Purpose | SEQ ID |
|---|---|---|---|
| Index Primer7 | CAAGCAGAAGACGGCATACGAGATTCAGTCTGTGACTGGAGTTCAGACGTGTGCTCTTCCGA | | SEQ ID NO: 36 |
| Index Primer8 | CAAGCAGAAGACGGCATACGAGATTTCCAAGGTGACTGGAGTTCAGACGTGTGCTCTTCCGA | | SEQ ID NO: 37 |
| Index Primer9 | CAAGCAGAAGACGGCATACGAGATTAATCGGGTGACTGGAGTTCAGACGTGTGCTCTTCCGA | | SEQ ID NO: 38 |
| Index Primer10 | CAAGCAGAAGACGGCATACGAGATCGCTGCCGTGACTGGAGTTCAGACGTGTGCTCTTCCGA | | SEQ ID NO: 39 |
| Index Primer11 | CAAGCAGAAGACGGCATACGAGATATGATGGGTGACTGGAGTTCAGACGTGTGCTCTTCCGA | | SEQ ID NO: 40 |
| Index Primer12 | CAAGCAGAAGACGGCATACGAGATCTTGTTAGTGACTGGAGTTCAGACGTGTGCTCTTCCGA | | SEQ ID NO: 41 |
| m923-cas9-del-F | CAGTTCCCCATAGTTGTCCTG | Detect CRISPR/Cas9 deletion in mouse | SEQ ID NO: 42 |
| m923-cas9-del-R | GGAAGAGTTGCCTTCAGAGC | | SEQ ID NO: 43 |
| m923.5'screenF | TCTTTAGTGCTCAGTTAACAGCT | Detect 5' loxP insertion in mouse | SEQ ID NO: 44 |
| m923-5'LONG-lox-sph1-rev6 | AGTCCTCTATCTCTTTAAAGCATGCATAAC | | SEQ ID NO: 45 |
| m923-3'lox-F2 | GTTCTAAAGCTTATAACTTCGTATAGCA | Detect 3' loxP insertion in mouse | SEQ ID NO: 46 |
| m923-3'screen-R2 | TGCCTCACCAAATTCTCACA | | SEQ ID NO: 47 |
| m9235'screenF | TCTTTAGTGCTCAGTTAACAGCT | Genotype 923WT | SEQ ID NO: 48 |
| m923_5'WTR | AGAGTAGTGTTCAGGATGCCT | | SEQ ID NO: 49 |
| m923-cas9-del-F | CAGTTCCCCATAGTTGTCCTG | Genotype 923del | SEQ ID NO: 50 |
| m923-cas9-del-R | GGAAGAGTTGCCTTCAGAGC | | SEQ ID NO: 51 |
| m923-cas9-del-F | CAGTTCCCCATAGTTGTCCTG*** | Genotype 923large | SEQ ID NO: 52 |
| m923-cas9-del-R | GGAAGAGTTGCCTTCAGAGC | | SEQ ID NO: 53 |
| AD1_noMX | AAT GAT ACG GCG ACC ACC GAG ATC TAC ACT CGT CGG CAG CGT CAG ATG TG | ATAC-seq Forward Primer | SEQ ID NO: 54 |
| Ad2.I_TAAGGCGA | CAAGCAGAAGACGGCATACGAGATTCGCCTTAGTCTCGTGGGCTCGGAGATGT | ATAC-seq Index Reverse Primer | SEQ ID NO: 55 |

TABLE 11-continued

Primers and Allele-Specific Amplicons. Amplicon sequences with SNPs bolded and primers underlined.

| | | | |
|---|---|---|---|
| Ad2.2_CGTACTAG | CAAGCAGAAGACGGCATACGAGAT CTAGTACGGTCTCGTGGGCTCGGA GATGT | ATAC-seq Index Reverse Primer | SEQ ID NO: 56 |
| Ad2.3_AGGCAGAA | CAAGCAGAAGACGGCATACGAGAT TTCTGCCTGTCTCGTGGGCTCGGA GATGT | ATAC-seq Index Reverse Primer | SEQ ID NO: 57 |
| Ad2.4_TCCTGAGC | CAAGCAGAAGACGGCATACGAGAT GCTCAGGAGTCTCGTGGGCTCGG AGATGT | ATAC-seq Index Reverse Primer | SEQ ID NO: 58 |
| Ad2.5_GGACTCCT | CAAGCAGAAGACGGCATACGAGAT AGGAGTCCGTCTCGTGGGCTCGGA GATGT | ATAC-seq Index Reverse Primer | SEQ ID NO: 59 |
| Ad2.6_TAGGCATG | CAAGCAGAAGACGGCATACGAGAT CATGCCTAGTCTCGTGGGCTCGGA GATGT | ATAC-seq Index Reverse Primer | SEQ ID NO: 60 |
| Ad2.7_CTCTCTAC | CAAGCAGAAGACGGCATACGAGAT GTAGAGAGGTCTCGTGGGCTCGGA GATGT | ATAC-seq Index Reverse Primer | SEQ ID NO: 61 |
| Ad2.8_CAGAGAGG | CAAGCAGAAGACGGCATACGAGAT CCTCTCTGGTCTCGTGGGCTCGGA GATGT | ATAC-seq Index Reverse Primer | SEQ ID NO: 62 |
| AD2.0563_ATGTAATGG | CAAGCAGAAGACGGCATACGAGATC CATTACATGTCTCGTGGGCTCGGAG ATGT | ATAC-seq Index Reverse Primer | SEQ ID NO: 63 |
| AD2.0564_CTGTGCGTA | CAAGCAGAAGACGGCATACGAGATT ACGCACAGGTCTCGTGGGCTCGGA GATGT | ATAC-seq Index Reverse Primer | SEQ ID NO: 64 |
| AD2.0565_TGAGTAAGT | CAAGCAGAAGACGGCATACGAGATA CTTACTCAGTCTCGTGGGCTCGGAG ATGT | ATAC-seq Index Reverse Primer | SEQ ID NO: 65 |
| AD2.0566_CTACCCACC | CAAGCAGAAGACGGCATACGAGATG GTGGGTAGGTCTCGTGGGCTCGGAG ATGT | ATAC-seq Index Reverse Primer | SEQ ID NO: 66 |
| AD2.0567_GTCACACGT | CAAGCAGAAGACGGCATACGAGATA CGTGTGACGTCTCGTGGGCTCGGAG ATGT | ATAC-seq Index Reverse Primer | SEQ ID NO: 67 |
| AD2.0568_ACTTTGCGT | CAAGCAGAAGACGGCATACGAGATA CGCAAAGTGTCTCGTGGGCTCGGA GATGT | ATAC-seq Index Reverse Primer | SEQ ID NO: 68 |

| Amplicon | Sequence | rsID | C57B6 | BALB | |
|---|---|---|---|---|---|
| Ivl | TGGGTCAGTCACTTAAGCAAGA GAAAGCTTCAAGGAAACAGCAG CTAGATTACTCACATCTAGAA CAGGAGAAGGAGCTCTCAGACC AGCCACTGGATCAAGCACTAGTA AAGAAGGGTAAACAACTGG AAAGGAAGAAACACGAATTGGA GAACCGGACACAGCAGGAGAAG TAGatagagcaattagtaccaagcact | rs3299 0753 | A | G | SEQ ID NO: 69 |

TABLE 11-continued

Primers and Allele-Specific Amplicons. Amplicon sequences with SNPs bolded and primers underlined.

| | | | | | |
|---|---|---|---|---|---|
| | Gactaagccagtccaaccagtgaaaggag acgtgctcactacagagaagcagcagcagaa | | | | |
| | | rs3299 0750 | T | C | |
| Lce6a | TCCAGAACACTGTCAGCCATAAG GAAATTCATCACCCACAACCTCG CTGTCTTAGGGGTAGTAC CACCTACCACTGCAAAGAAGAAG AGTGCTAAgaaactgggcacaaacgagg gtaaatagctacaacaaccttccaga taaactcatgaatttcaccaggaaggccaggcc ctccacctctcttggctagaaaaacat-ttcttgtttc tttctttagcctacccttcagttcaac aacaataaaattgatcatggtgc | rs3122 2976 | T | C | SEQ ID NO: 70 |
| | | rs314 17097 | C | T | |

***Primer doesn't exactly match sanger sequence..(CAATTTCCCATAGTTGTCCTG)

TABLE 12

ATAC-seq library statistics. Included statistics reported as recommended by ENCODE guidelines.

| Sample | Sex | Total Reads pairs | Post filtering read pairs | Alignment rate | Library complexity | | | NFR? |
|---|---|---|---|---|---|---|---|---|
| | | | | | NFR | PBC1 | PBC2 | |
| WT_1 | M | 44,104,640 | 39,024,826 | 79.13 | 0.829 | 0.835 | 6.167 | ✓ |
| WT_3 | F | 29,518,179 | 32,720,098 | 95.79 | 0.856 | 0.864 | 7.539 | ✓ |
| WT_4 | F | 33,796,509 | 36,502,990 | 95.37 | 0.831 | 0.831 | 6.434 | ✓ |
| Del_1 | M | 58,966,233 | 28,521,337 | 92.66 | 0.760 | 0.765 | 4.254 | ✓ |
| Del_2 | M | 43,934,578 | 21,294,165 | 96.73 | 0.779 | 0.786 | 4.774 | ✓ |
| Del_3 | M | 26,577,482 | 14,366,531 | 96.92 | 0.842 | 0.859 | 7.341 | ✓ |
| Del_4 | M | 26,880,711 | 14,383,001 | 97 | 0.820 | 0.837 | 6.303 | ✓ |
| Large_1 | M | 74,101,870 | 39,840,266 | 99.46 | 0.837 | 0.841 | 6.105 | ✓ |
| Large_2 | M | 60,641,676 | 39,482,578 | 99.43 | 0.962 | 0.967 | 31.580 | ✓ |
| Large_4 | M | 47,393,679 | 39,766,656 | 82 | 0.799 | 0.809 | 5.320 | ✓ |

| Sample | Mono-nucleosome peak? | FRiP | TSS enrichment | Reproducibility | IDR Values | | Naïve overlap peaks | IDR peaks |
|---|---|---|---|---|---|---|---|---|
| WT_1 | ✓ | 0.036 | 8.214 | Per Genotype | Rescue | Self consistency | | |
| WT_3 | ✓ | 0.052 | 9.760 | WT | 1.1506 | 1.3738 | 169158 | 78032 |
| WT_4 | ✓ | 0.059 | 11.093 | 923$^{del/del}$ | 1.3075 | 1.5896 | 126285 | 51601 |
| Del_1 | ✓ | 0.088 | 14.844 | 923$^{large/large}$ | 1.2698 | 2.0893 | 190190 | 98605 |
| Del_2 | ✓ | 0.026 | 6.913 | | | | | |
| Del_3 | ✓ | 0.106 | 14.729 | | | | | |
| Del_4 | ✓ | 0.092 | 13.897 | | | | | |
| Large_1 | ✓ | 0.033 | 7.750 | | | | | |
| Large_2 | ✓ | 0.042 | 9.260 | | | | | |
| Large_4 | ✓ | 0.027 | 7.650 | | | | | |

TABLE 13

Transcription Factor Motif (FIMO) hit analyses for ChIP-seq peaks for relevant ENCODE cell lines. FIMO computes a log-likelihood ratio score for each motif at each position and converts these scores to P-values using dynamic programming.

| TF | Cell line | Rep | Peaks | Ref | Alt | P value | FIMO Hits | Hits/Peak | ENCODE Experiment |
|---|---|---|---|---|---|---|---|---|---|
| MAZ | GM12878 | 1 | 23951 | C | T | 1.00E−05 | 11872 | 0.50 | ENCSR903MVU |
| MAZ | GM12878 | 2 | 23391 | C | T | 1.00E−05 | 11647 | 0.50 | ENCSR000DZA |

TABLE 13-continued

Transcription Factor Motif (FIMO) hit analyses for ChIP-seq peaks for relevant ENCODE cell lines. FIMO computes a log-likelihood ratio score for each motif at each position and converts these scores to P-values using dynamic programming.

| TF | Cell line | Rep | Peaks | Ref | Alt | P value | FIMO Hits | Hits/Peak | ENCODE Experiment |
|---|---|---|---|---|---|---|---|---|---|
| MAZ | HEK293 | 1 | 42805 | C | T | 1.00E−05 | 41649 | 0.97 | ENCSR290SSQ |
| MAZ | HepG2 | 1 | 27513 | C | T | 1.00E−05 | 17233 | 0.63 | ENCSR700PNE |
| MAZ | HepG2 | 2 | 15481 | C | T | 1.00E−05 | 8451 | 0.55 | ENCSR000EDN |
| MAZ | K562 | 1 | 32781 | C | T | 1.00E−05 | 15428 | 0.47 | ENCSR163IUV |
| MAZ | K562 | 2 | 26881 | C | T | 1.00E−05 | 13727 | 0.51 | ENCSR643JRH |
| ZNF263 | HEK293 | 1 | 43445 | A | G | 1.00E−05 | 33451 | 0.77 | ENCSR000EVD |
| ZNF263 | HepG2 | 1 | 27777 | A | G | 1.00E−05 | 14140 | 0.51 | ENCSR313MMD |
| ZNF263 | K562 | 1 | 4005 | A | G | 1.00E−05 | 4856 | 1.21 | ENCSR000EWN |
| NFIC | GM12878 | 1 | 38795 | A | G | 5.00E−04 | 22757 | 0.59 | ENCSR000BRN |
| NFIC | K562 | 1 | 48550 | A | G | 5.00E−04 | 38504 | 0.79 | ENCSR796ITY |
| SPI1 | GM12878 | 1 | 43950 | G | A | 5.00E−04 | 27129 | 0.62 | ENCSR000BGQ |
| SPI1 | K562 | 1 | 32589 | G | A | 5.00E−04 | 22472 | 0.69 | ENCSR000BGW |

Example 2: Loss of Nuclear Localization of the Vitamin D Receptor in Involucrin Knockout Keratinocytes The following example describes functional in vitro data to show loss of nuclear localization of the vitamin D receptor in Involucrin knockout keratinocytes.

Figure 14:
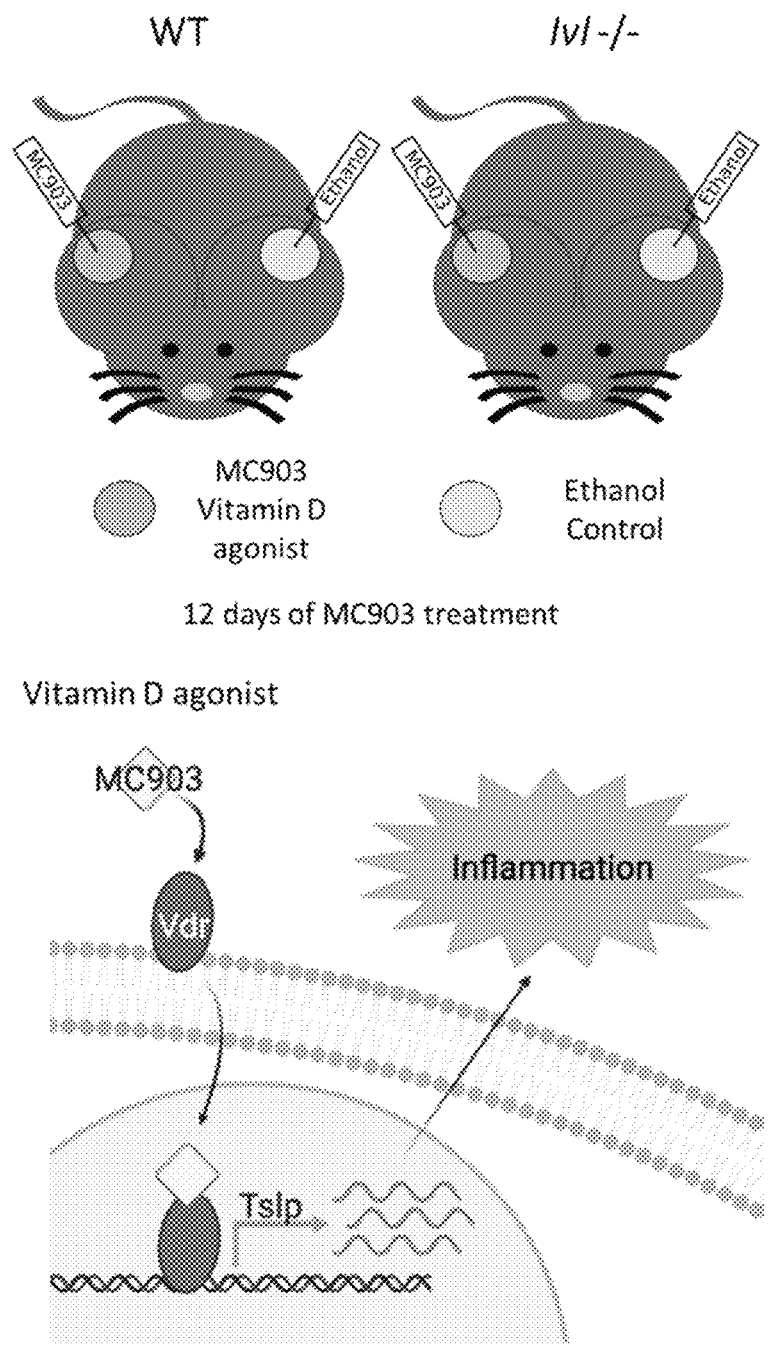
FIG. 14 is a series of illustrations showing the induction of vitamin D receptor-mediated skin inflammation in involucrin (lvl) -/- mice and determination of vitamin D receptor function in the epidermis.
Figure 15:
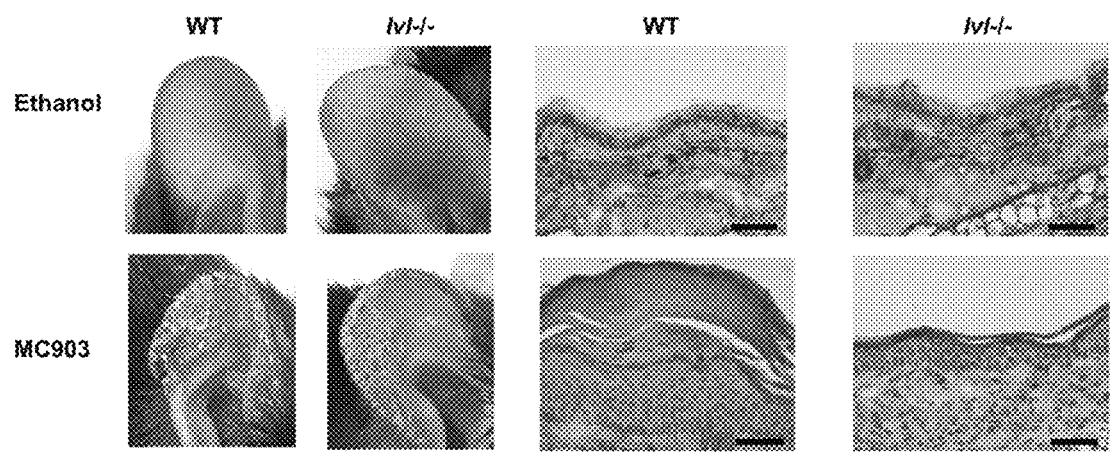
FIG. 15 is a series of images showing vitamin D receptor-induced inflammation is reduced in lvl$^{-/-}$ skin.
Figure 16:
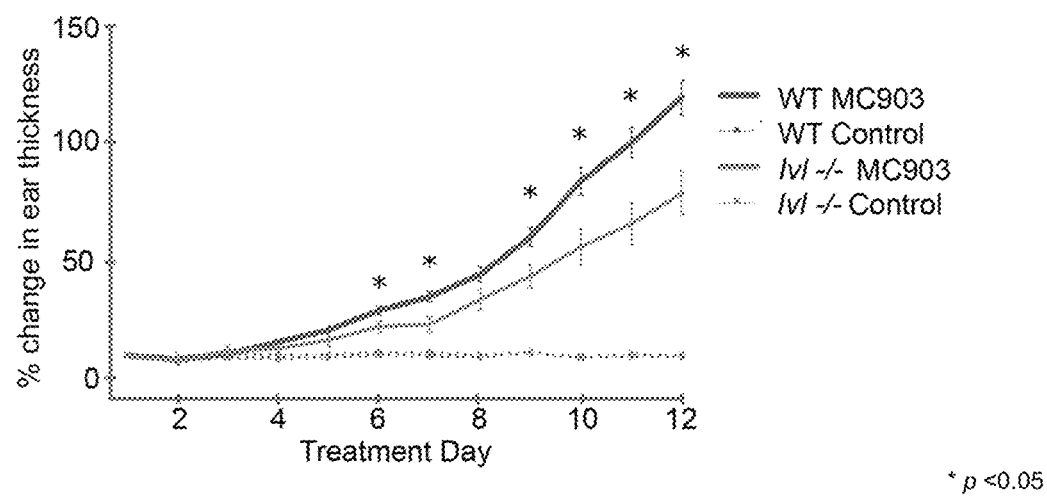
FIG. 16 is a graph showing vitamin D receptor induced inflammation is significantly reduced as early as day 6 MC903 in lvl$^{-/-}$ skin.
Figure 17:
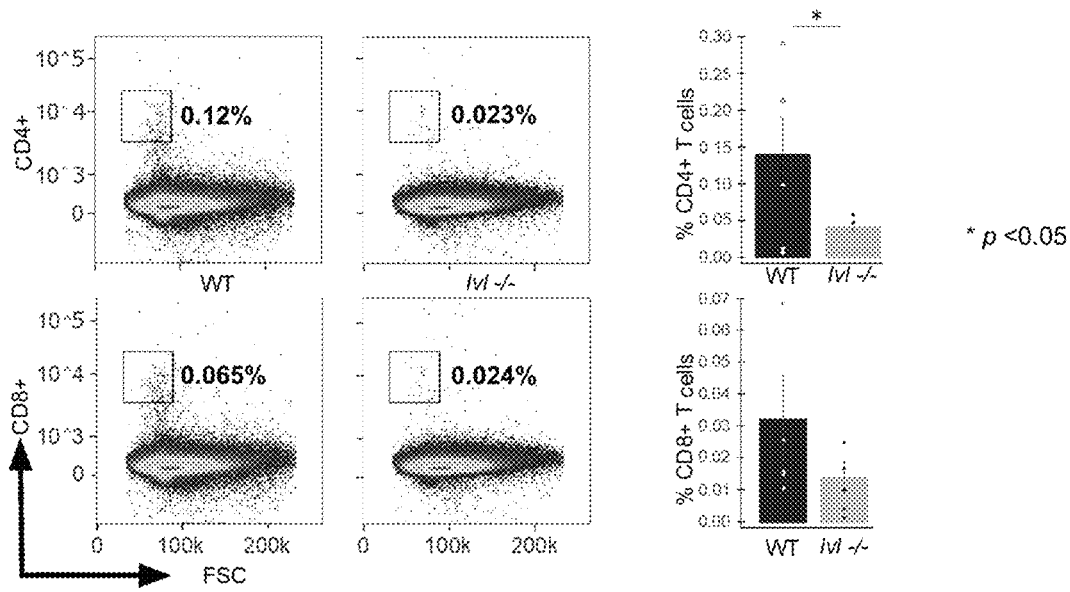
FIG. 17 shows CD4+ T cells are significantly decreased in MC903-treated lvl$^{-/-}$ skin.
Figure 18:
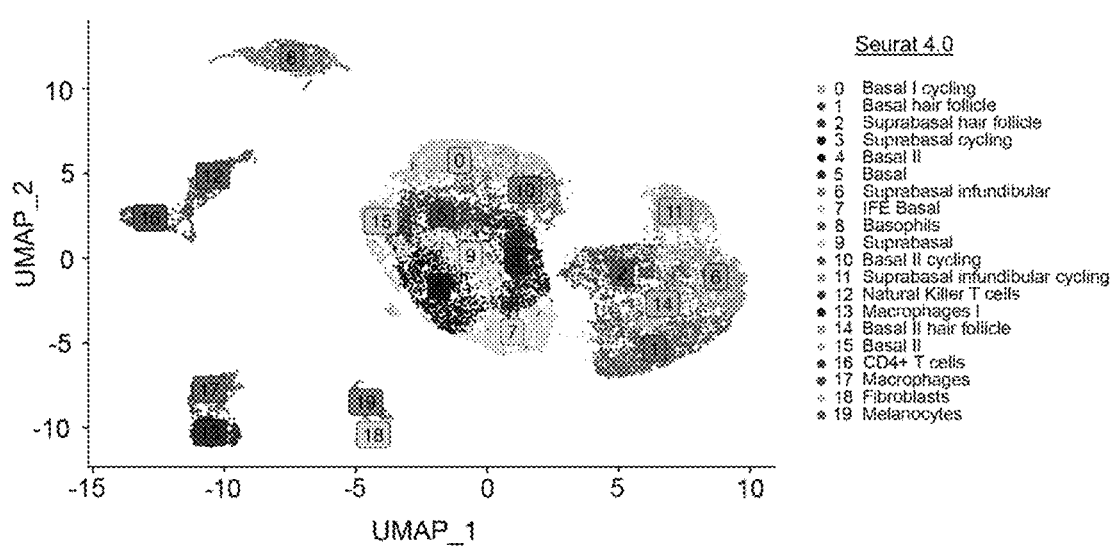
FIG. 18. scRNA-seq identifies 20 cell type clusters in MC903-treated skin.
Figure 19:
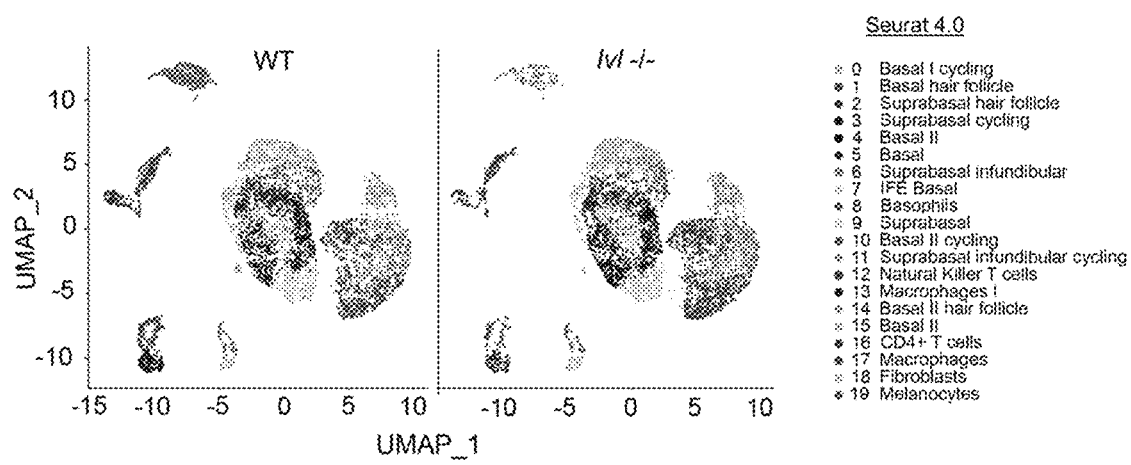
FIG. 19. 20 cell type clusters in both MC903-treated WT and lvl$^{-/-}$ skin.
Figure 20:
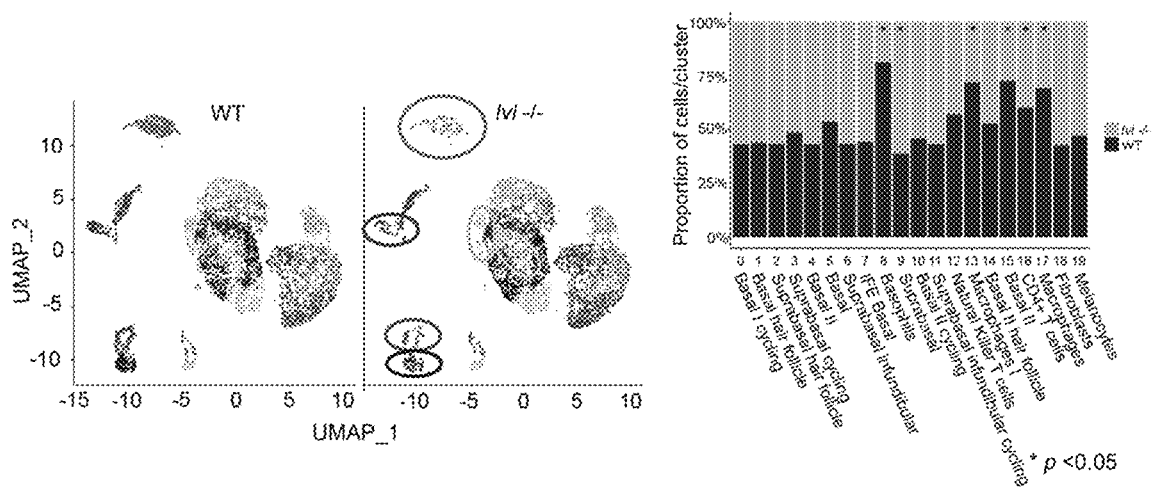
FIG. 20. Decreased Basophils, Macrophages, CD4+ T cells, and Basal II keratinocytes and increased Suprabasal keratinocytes in MC903-treated lvl$^{-/-}$ skin.
Figure 21:
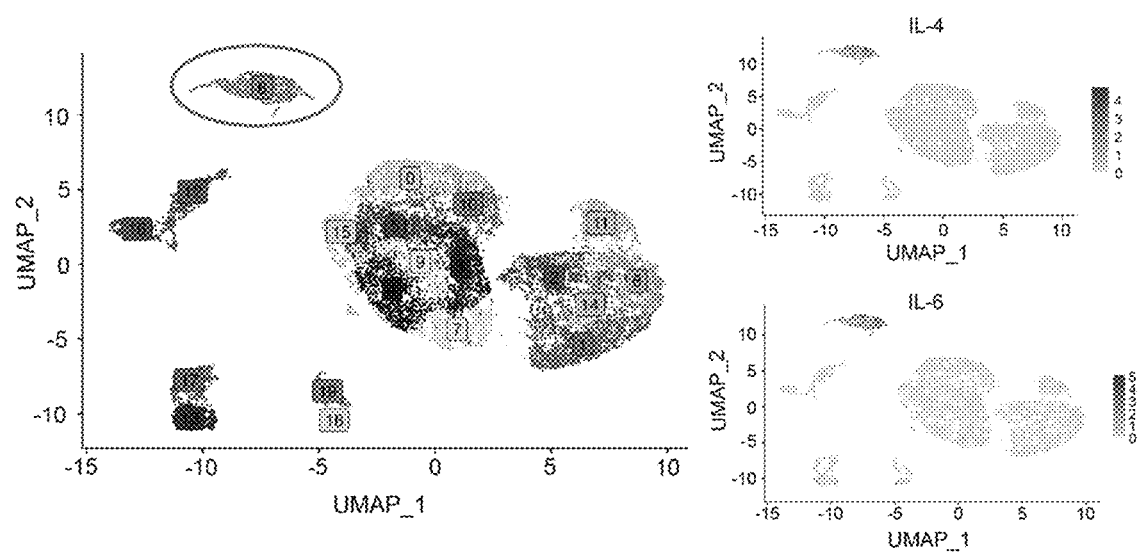
FIG. 21. Basophils are a major source of IL-4 and IL-6 expression that drives skin inflammation.
Figure 22:
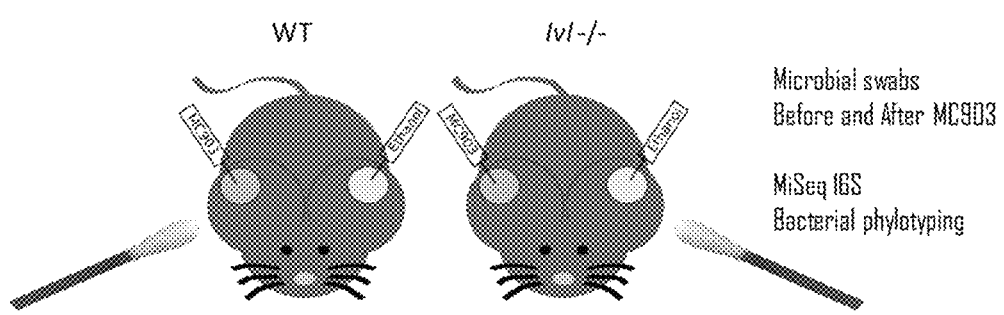
FIG. 22. 16S bacterial phylotyping in MC903-treated WT and Involucrin (lvl) -/- mice.

Here, vitamin D receptor-mediated skin inflammation was induced in Involucrin (lvl) -/- mice and vitamin D receptor function in the epidermis was evaluated (see e.g., FIG. 14). It was shown that vitamin D receptor-induced inflammation is reduced in $lvl^{-/-}$ skin (see e.g., FIG. 15). It was shown that vitamin D receptor induced inflammation is significantly reduced as early as day 6 MC903 treatment in $lvl^{-/-}$ skin (see e.g., FIG. 16). It was observed that CD4+ T cells are significantly decreased in MC903-treated lvl-/- skin (see e.g., FIG. 17). scRNA-seq identified 20 cell type clusters in MC903-treated skin (see e.g., FIG. 18). 20 cell type clusters were observed in both MC903-treated WT and lvl-/- skin (see e.g., FIG. 19). Decreased basophils, macrophages, CD4$^+$ T cells, and basal II keratinocytes, and increased suprabasal keratinocytes were observed in MC903-treated $lvl^{-/-}$ skin (see e.g., FIG. 20). Basophils are a major source of IL-4 and IL-6 expression that drives skin inflammation (see e.g., FIG. 21).

Figure 23:
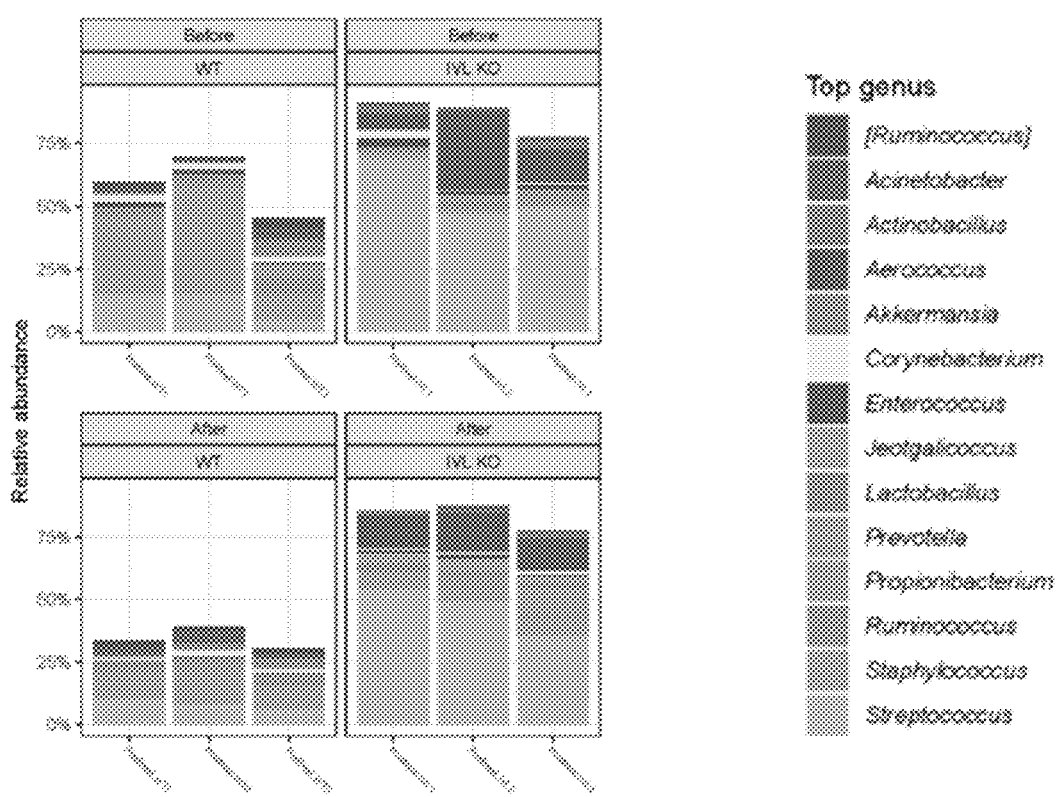
FIG. 23. Dysbiosis in lvl$^{-/-}$ baseline skin marked by increased *Aerococcus* and *Streptococcus*.
Figure 24:
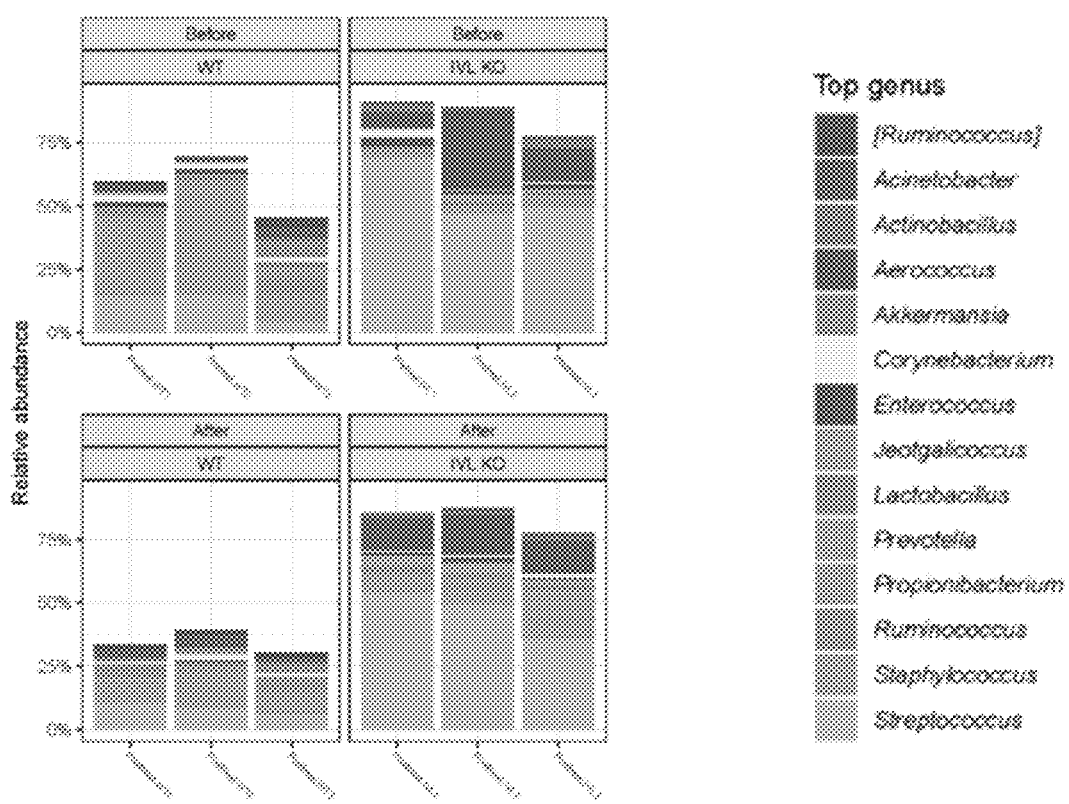
FIG. 24. Dysbiosis is sustained in lvl$^{-/-}$ skin after MC903 treatment.
Figure 25:
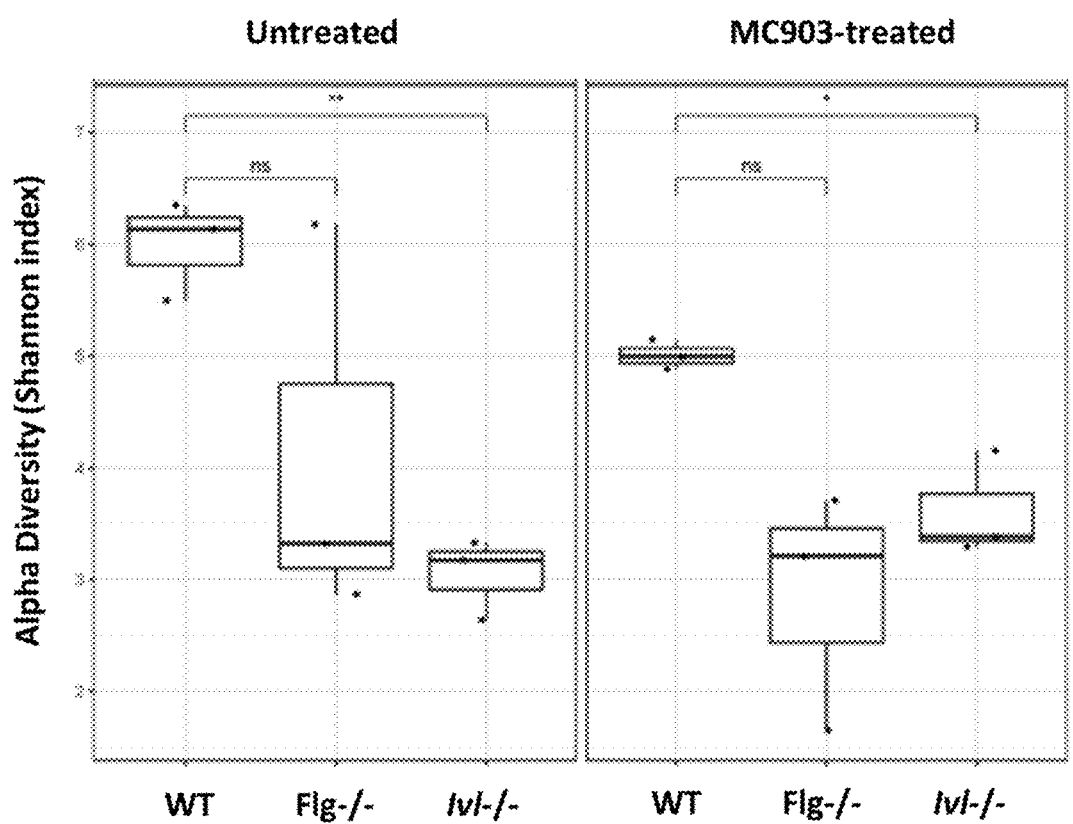
FIG. 25. Alpha diversity is significantly decreased in Untreated and MC903-treated lvl$^{-/-}$ skin.
Figure 26:
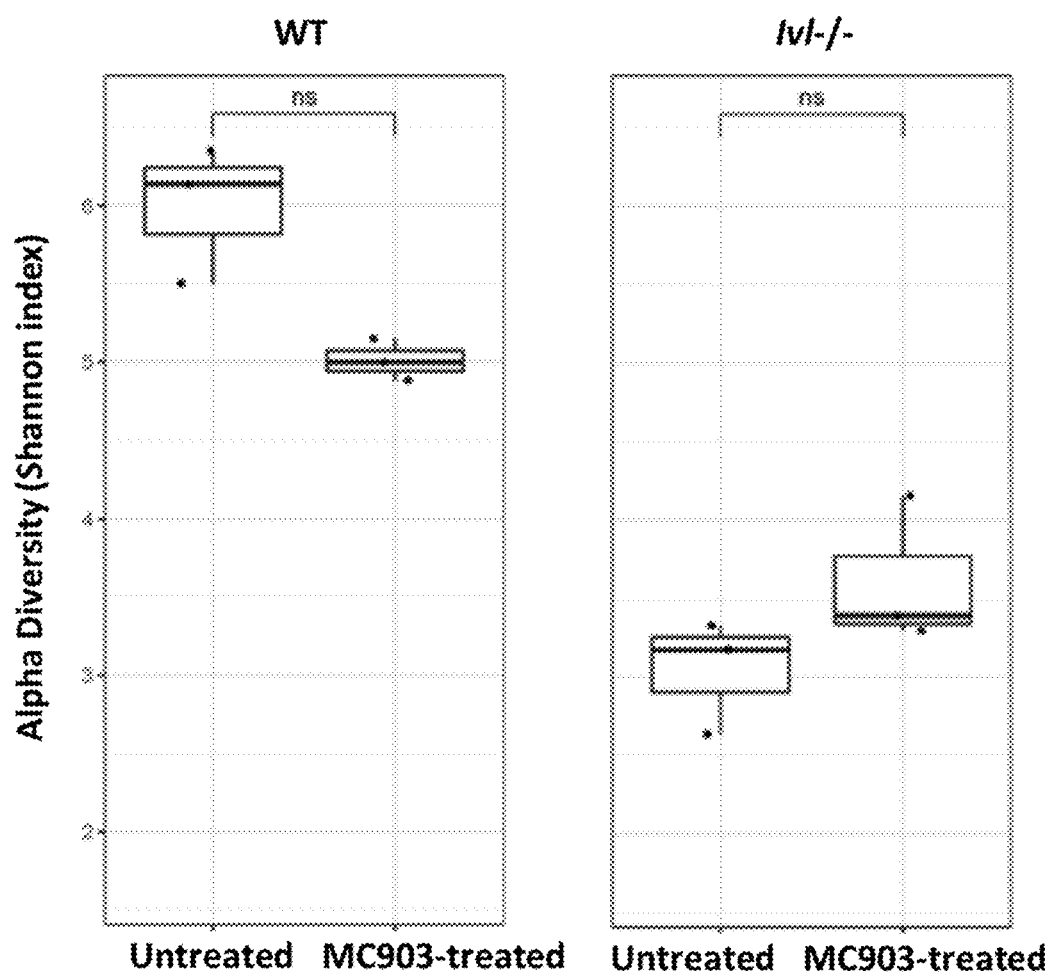
FIG. 26. Alpha diversity is decreased in MC903-treated WT but not in lvl$^{-/-}$ skin.

Next, the skin microbiome of lvl-/- mice were investigated. The impact of MC903 on the skin microbiome in WT and lvl-/- mice was also investigated. 16S bacterial phylotyping was performed in MC903-treated WT and Involucrin (lvl) -/- mice. Dysbiosis in $lvl^{-/-}$ baseline skin was marked by increased *Aerococcus* and *Streptococcus* (see e.g., FIG. 23). Dysbiosis is sustained in $lvl^{-/-}$ skin after MC903 treatment (see e.g., FIG. 24). Alpha diversity is significantly decreased in untreated and MC903-treated $lvl^{-/-}$ skin (see e.g., FIG. 25). Alpha diversity is decreased in MC903-treated WT but not in $lvl^{-/-}$ skin (see e.g., FIG. 26).

Figure 27:
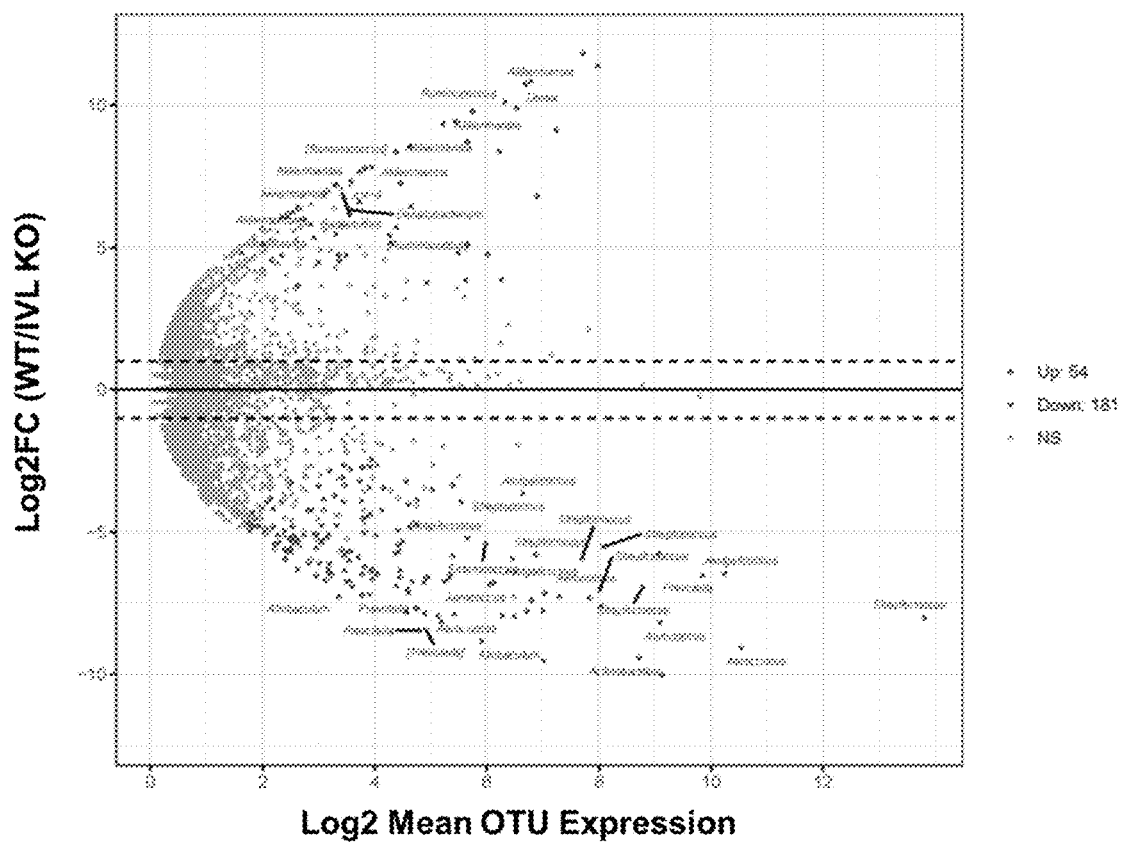
FIG. 27. Significant enrichment of *Aerococcus, Streptococcus, Prevotella,* and *Jeotgallicoccus* Differentially Expressed Operational Taxonomic Units (DE-OTUs) in lvl$^{-/-}$ skin.

Significant enrichment of *Aerococcus, Streptococcus, Prevotella*, and *Jeotgallicoccus* Differentially Expressed Operational Taxonomic Units (DE-OTUs) in $lvl^{-/-}$ skin (see e.g., FIG. 27).

Figure 28:
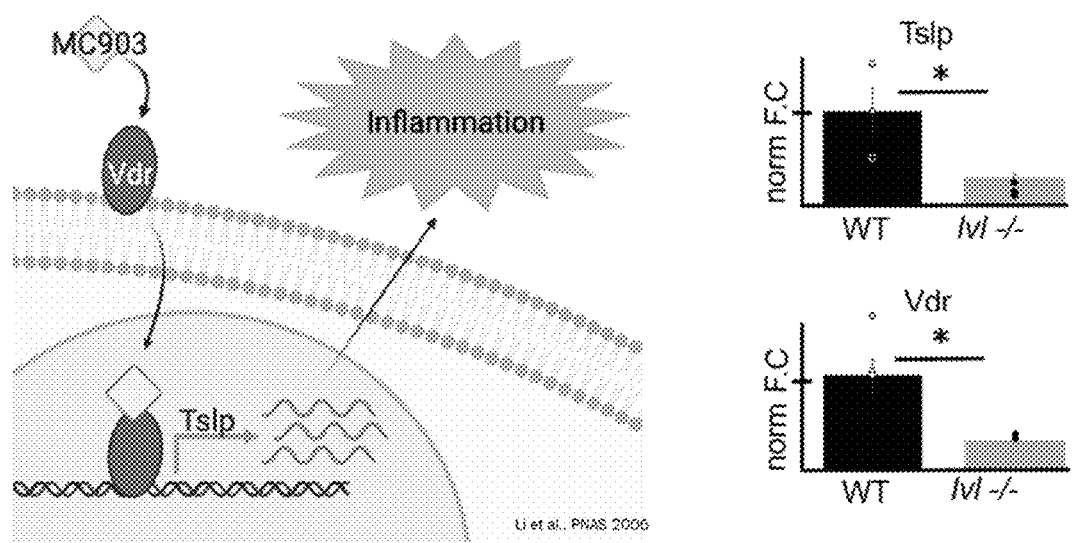
FIG. 28. TSLP and vitamin D receptor expressions are reduced in lvl$^{-/-}$ skin.
Figure 29:
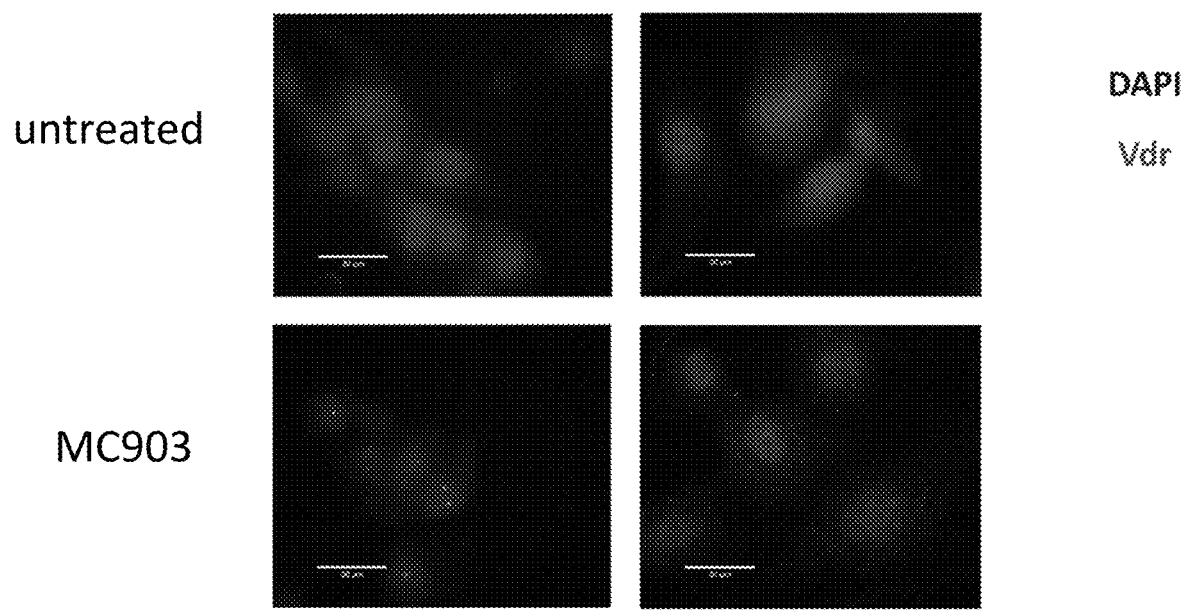
FIG. 29. MC903 treated lvl$^{-/-}$ keratinocytes exhibit loss of nuclear localization of vitamin D receptor (VDR).

It was observed that TSLP and vitamin D receptor expressions are reduced in $lvl^{-/-}$ skin (see e.g., FIG. 28). MC903 treated $lvl^{-/-}$ keratinocytes exhibited loss of nuclear localization of vitamin D receptor (see e.g., FIG. 29).

Figure 30:
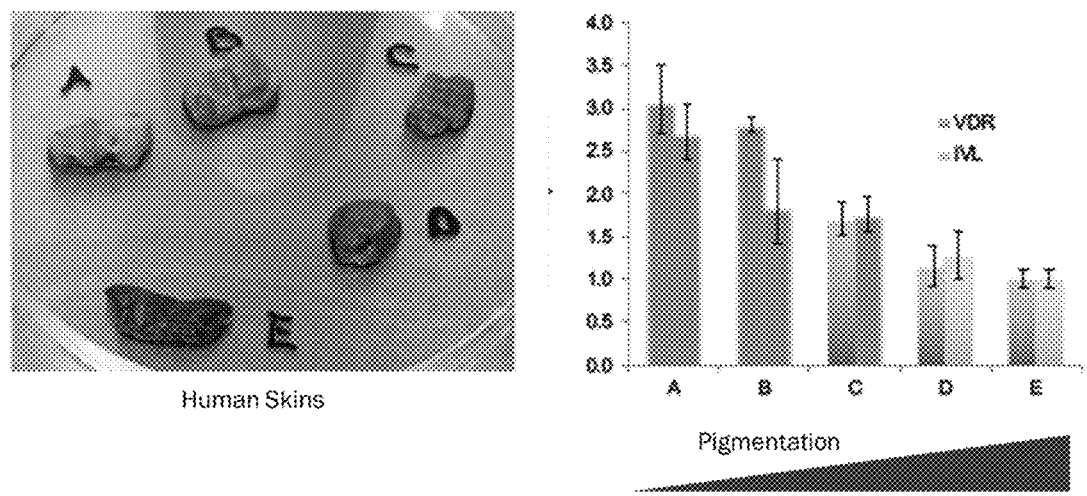
FIG. 30. Decreased IVL & VDR expression in human skin with increase in pigmentation.

Involucrin and vitamin D receptor expression and pigmentation were measured in human non-sun exposed skins (see e.g., FIG. 30). It was shown that there is an increase in IVL & VDR expression in human skin with increase in pigmentation (inverse relationship for both IVL and VDR with pigmentation).

SUMMARY

Involucrin knockout mice exhibit decreased Vitamin D receptor-mediated inflammatory response compared to WT mice. A decrease in basophils, macrophages, basal II keratinocytes, and an increase in suprabasal keratinocytes was observed in MC903-treated $lvl^{-/-}$ skin. Dysbiosis and decreased alpha diversity in $lvl^{-/-}$ skin were marked by increased *Aerococcus* and *Streptococcus*.

Decreased vitamin D receptor function in $lvl^{-/-}$ epidermis was evidenced by low Vdr and decreased Tslp expression. Loss of nuclear localization of vitamin D receptor in MC903-treated $lvl^{-/-}$ keratinocytes was observed. Decreased Involucrin and Vitamin D receptor expression observed in human skin with increased pigmentation (VDR and IVL inverse relationship with pigmentation).

Example 3: IVL Peptide Treatment

Figure 31:
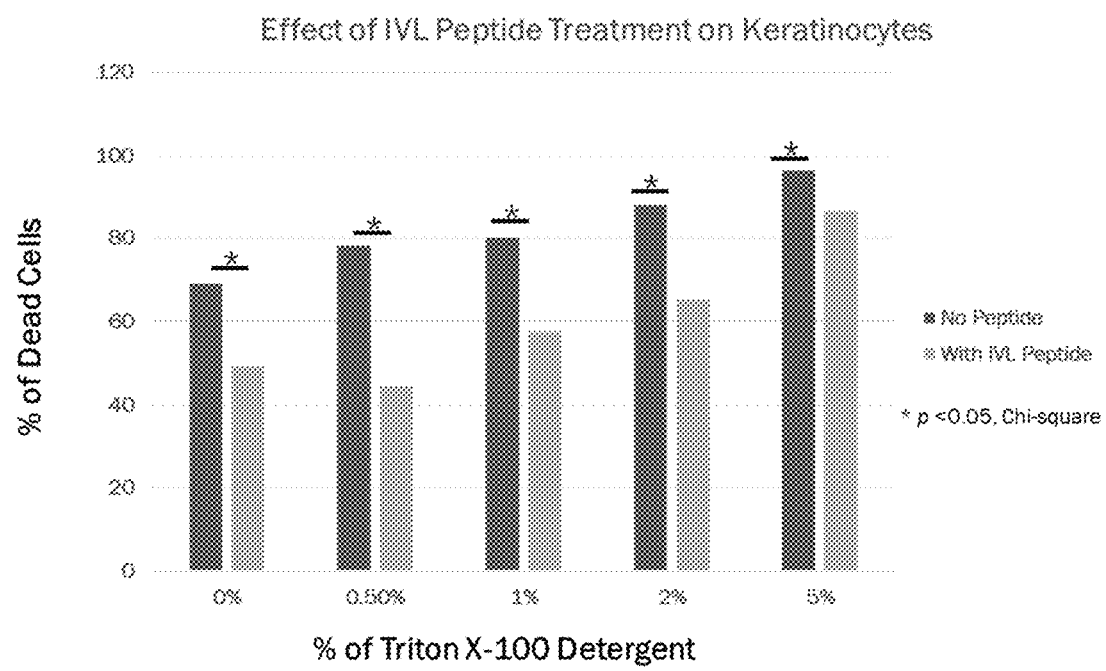
FIG. 31. IVL peptide protects against keratinocyte cell lysis and improves keratinocyte barrier function.
Figure 32:
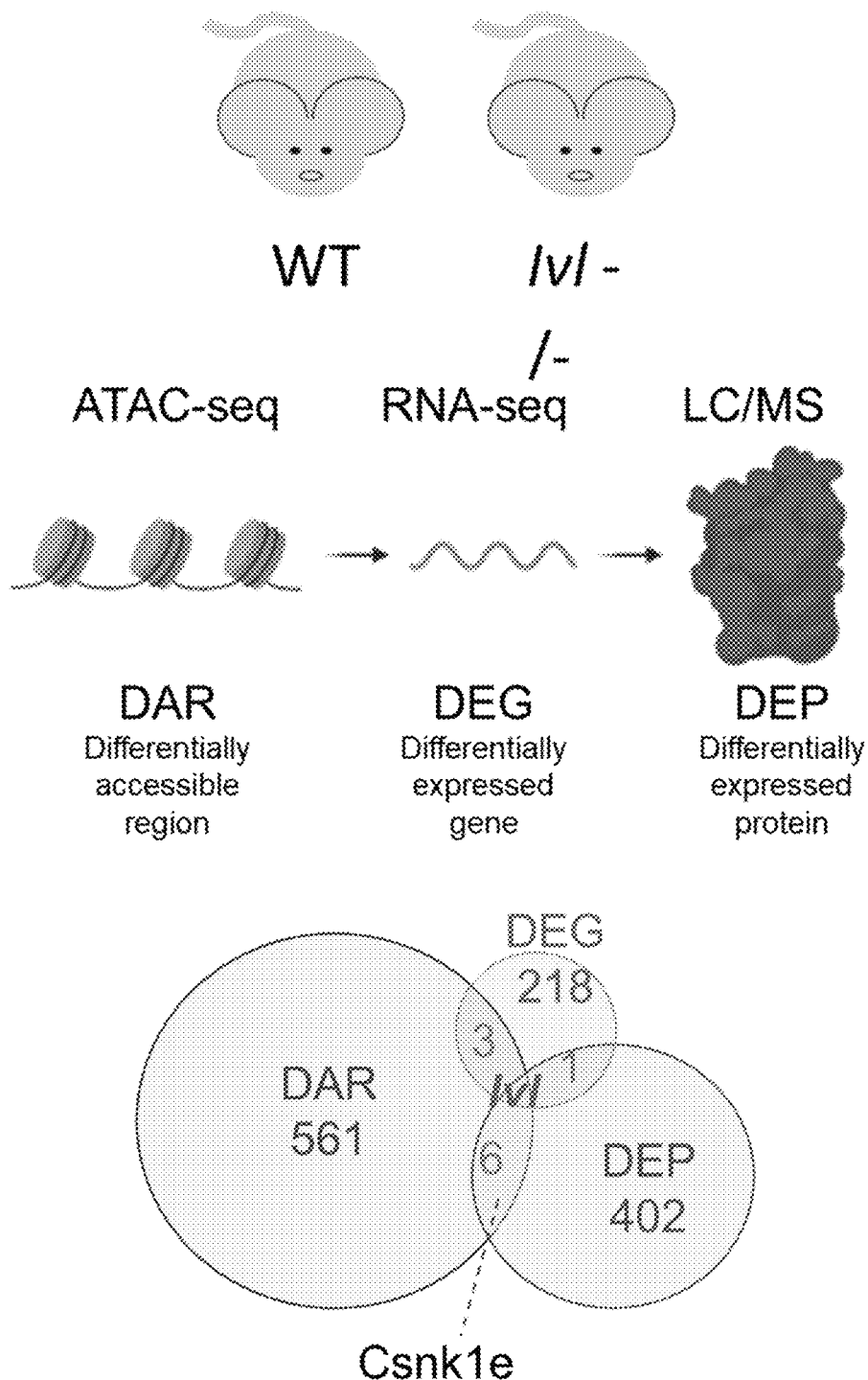
FIG. 32. Multi-omics approach to identify candidate mechanism linking Involucrin with Vitamin D receptor.

This example shows functional in vivo data to support involucrin regulates vitamin D receptor function in the epidermis. Here, it is shown that an IVL peptide protects against keratinocyte cell lysis and improves keratinocyte barrier function (see e.g., FIG. 31). In some peptides, one or more A can be substituted with one or more Q.

```
Exemplary LVL peptides:
ELPEQQEGQL (SEQ ID NO: 1) - IVL 10aa late

ELPEQAEGQL (SEQ ID NO: 2) - IVL 10aa 2nd A

ELPEAQEGQL (SEQ ID NO: 3) - IVL 10aa 1st A

ELPEQQEGAL (SEQ ID NO: 4) - IVL 10aa 3rd A

ELPEAAEGAL (SEQ ID NO: 5) - IVL 10aa all A

EQQEGQ (SEQ ID NO: 6) - IVL 6 aa late
```

```
EQAEGQ (SEQ ID NO: 7) - IVL 6 aa late 2nd A

EAQEGQ (SEQ ID NO: 8) - IVL 6 aa late 1st A

EQQEGA (SEQ ID NO: 9) - IVL 6 aa late 3rd A

EAAEGA (SEQ ID NO: 10) - IVL 6 aa all A
```

Peptide N-terminus: Amine N-terminus

Peptide C-terminus: Amide (Blocked)C-terminus

Example 4: IVL Regulation of Csnk1E

This example shows involucrin to regulate Csnk1e (casein kinase 1e) based on chromatin accessibility, gene expression, and proteomics studies.

Figure 33:
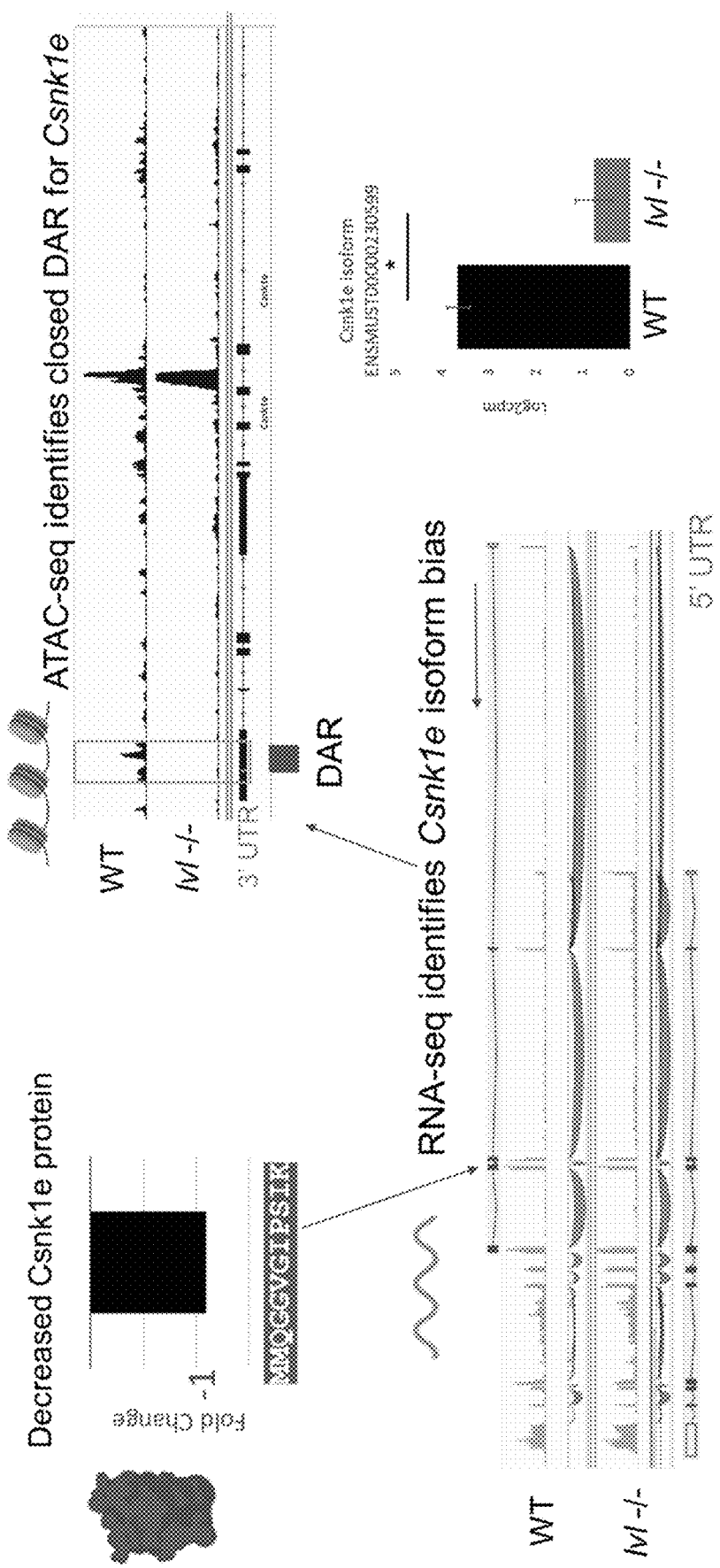
FIG. 33. lvl-/- mice exhibit decreased Csnk1e with isoform bias and preferential 3'UTR closed chromatin.
Figure 34:
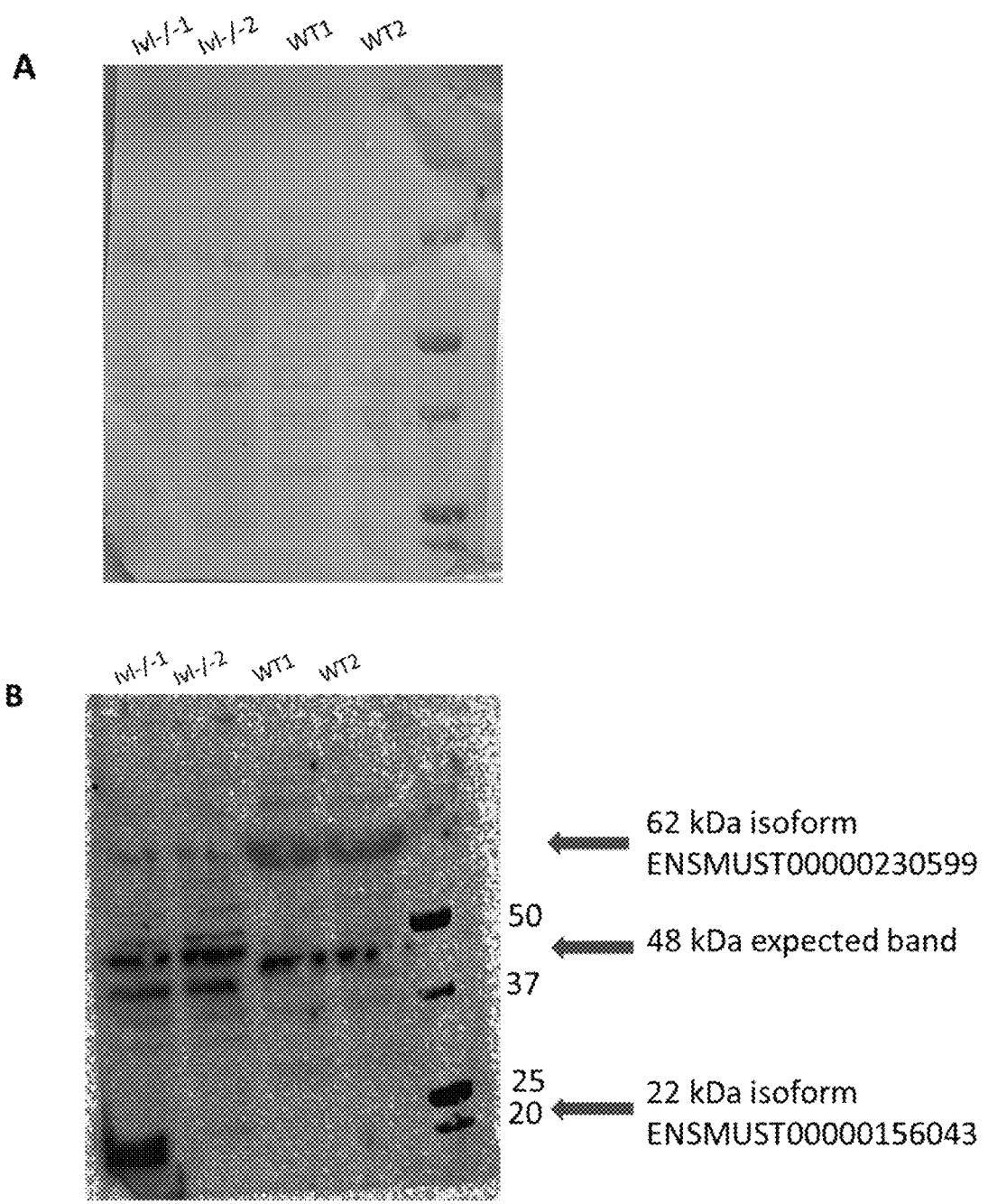
FIG. 34. Western blot confirms Csnk1e isoform protein bias in lvl-/- skin. Equivalent loading of 40 μg of neonatal skin in lvl-/- and WT mice shown by Ponceau S staining (a) and probed with Csnke1 (also Ck1e) rabbit antibody (Thermo Fisher cat #487600) at 1:250 dilution (b).

A multi-omics approach was used to identify candidate mechanism linking Involucrin with Vitamin D receptor. It was found that Ivl-/- mice exhibit decreased Csnk1e with isoform bias and preferential 3'UTR closed chromatin (see e.g., FIG. 33). The Csnk1e isoform protein bias Ivl-/- skin was confirmed in a Western blot (see FIG. 34).

What is claimed is:

1. A method of increasing skin barrier or epidermis integrity to a subject in need thereof, the method comprising: topically administering to the subject a therapeutically effective amount of an involucrin (IVL) late region repeat peptide selected from the group consisting of SEQ ID NO: 1 (ELPEQQEGQL) and a fragment of SEQ ID NO: 1, wherein the fragment of SEQ ID NO: 1 is selected from the group consisting of:

|  | |
|---|---|
| ELPEQQ; | (SEQ ID NO: 71) |
| LPEQQE; | (SEQ ID NO: 72) |
| PEQQEG; | (SEQ ID NO: 73) |
| EQQEGQ; | (SEQ ID NO: 6) |
| QQEGQL; | (SEQ ID NO: 74) |
| ELPEQQE; | (SEQ ID NO: 75) |
| LPEQQEG; | (SEQ ID NO: 76) |
| PEQQEGQ; | (SEQ ID NO: 77) |
| EQQEGQL; | (SEQ ID NO: 78) |
| ELPEQQEG; | (SEQ ID NO: 79) |
| LPEQQEGQ; | (SEQ ID NO: 80) |
| PEQQEGQL; | (SEQ ID NO: 81) |
| ELPEQQEGQ; and | (SEQ ID NO: 82) |
| LPEQQEGQL. | (SEQ ID NO: 83) |

2. The method of claim 1, wherein the therapeutically effective amount of the IVL peptide is an amount effective to
   regulate or increase vitamin D receptor function;
   regulate or increase Csnk1e (casein kinase 1e);
   increase involucrin expression;
   improve keratinocyte barrier function;
   protect against keratinocyte cell lysis; or
   improve epithelial barrier function.

3. The method of claim 1, wherein the IVL peptide comprises an amine N-terminus.

4. The method of claim 1, wherein the IVL peptide comprises an amide C-terminus.

5. The method of claim 1, further comprising administering a vitamin D receptor agonist or vitamin D.

6. The method of claim 5, wherein the vitamin D receptor agonist is MC903.

7. A method of treating atopic dermatitis in a subject in need thereof, the method comprising: topically administering to the subject a therapeutically effective amount of an involucrin (IVL) late region repeat peptide selected from the group consisting of SEQ ID NO: 1 (ELPEQQEGQL) and a fragment of SEQ ID NO: 1, wherein the fragment of SEQ ID NO: 1 is selected from the group consisting of:

|  | |
|---|---|
| ELPEQQ; | (SEQ ID NO: 71) |
| LPEQQE; | (SEQ ID NO: 72) |
| PEQQEG; | (SEQ ID NO: 73) |
| EQQEGQ; | (SEQ ID NO: 6) |
| QQEGQL; | (SEQ ID NO: 74) |
| ELPEQQE; | (SEQ ID NO: 75) |
| LPEQQEG; | (SEQ ID NO: 76) |
| PEQQEGQ; | (SEQ ID NO: 77) |
| EQQEGQL; | (SEQ ID NO: 78) |
| ELPEQQEG; | (SEQ ID NO: 79) |
| LPEQQEGQ; | (SEQ ID NO: 80) |
| PEQQEGQL; | (SEQ ID NO: 81) |
| ELPEQQEGQ; and | (SEQ ID NO: 82) |
| LPEQQEGQL. | (SEQ ID NO: 83) |

8. The method of claim 7, wherein the therapeutically effective amount of the IVL peptide is an amount effective to
   regulate or increase vitamin D receptor function;
   regulate or increase Csnk1e (casein kinase 1e);
   increase involucrin expression;
   improve keratinocyte barrier function;
   protect against keratinocyte cell lysis; or
   improve epithelial barrier function.

9. The method of claim 7, wherein the IVL peptide comprises an amine N-terminus.

10. The method of claim 7, wherein the IVL peptide comprises an amide C-terminus.

11. The method of claim 7, further comprising administering a vitamin D receptor agonist or vitamin D.

12. The method of claim 11, wherein the vitamin D receptor agonist is MC903.

13. A pharmaceutical composition for topical administration comprising an involucrin (IVL) peptide selected from the group consisting of SEQ ID NO: 1 (ELPEQQEGQL) and a fragment of SEQ ID NO: 1 in a cream, gel, liposome, or ointment carrier, wherein the IVL peptide is a late region repeat peptide, wherein the fragment of SEQ ID NO: 1 is selected from the group consisting of:

ELPEQQ; (SEQ ID NO: 71)

LPEQQE; (SEQ ID NO: 72)

PEQQEG; (SEQ ID NO: 73)

EQQEGQ; (SEQ ID NO: 6)

QQEGQL; (SEQ ID NO: 74)

ELPEQQE; (SEQ ID NO: 75)

LPEQQEG; (SEQ ID NO: 76)

PEQQEGQ; (SEQ ID NO: 77)

EQQEGQL; (SEQ ID NO: 78)

ELPEQQEG; (SEQ ID NO: 79)

LPEQQEGQ; (SEQ ID NO: 80)

PEQQEGQL; (SEQ ID NO: 81)

ELPEQQEGQ; and (SEQ ID NO: 82)

LPEQQEGQL. (SEQ ID NO: 83)

14. The pharmaceutical composition of claim 13, wherein the IVL peptide comprises an amine N-terminus.

15. The pharmaceutical composition of claim 13, wherein the IVL peptide comprises an amide C-terminus.

16. The pharmaceutical composition of claim 13, wherein the IVL peptide improves vitamin D receptor function; increases involucrin expression; improves keratinocyte barrier function; protects against keratinocyte cell lysis; or improves epithelial barrier function.

17. The pharmaceutical composition of claim 13, wherein the IVL peptide comprises one or more Q to A substitutions.

18. The pharmaceutical composition of claim 13, further comprising a vitamin D receptor agonist or vitamin D.

19. The pharmaceutical composition of claim 18, wherein the vitamin D receptor agonist is MC903.

* * * * *